US012388164B2

(12) United States Patent
Lee et al.

(10) Patent No.: US 12,388,164 B2
(45) Date of Patent: Aug. 12, 2025

(54) ANTENNA MODULE DISPOSED IN VEHICLE

(71) Applicant: LG ELECTRONICS INC., Seoul (KR)

(72) Inventors: Soyeon Lee, Seoul (KR); Uisheon Kim, Seoul (KR); Kangjae Jung, Seoul (KR); Dongjin Kim, Seoul (KR); Byeongyong Park, Seoul (KR); Ilnam Cho, Seoul (KR); Byungwoon Jung, Seoul (KR); Kukheon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/874,447

(22) PCT Filed: Aug. 9, 2022

(86) PCT No.: PCT/KR2022/011875

§ 371 (c)(1),
(2) Date: Dec. 12, 2024

(87) PCT Pub. No.: WO2024/034702

PCT Pub. Date: Feb. 15, 2024

(65) Prior Publication Data

US 2025/0167424 A1 May 22, 2025

(51) Int. Cl.
*H01Q 1/12* (2006.01)
*H01Q 5/30* (2015.01)
*H01Q 9/04* (2006.01)

(52) U.S. Cl.
CPC ............ *H01Q 1/1271* (2013.01); *H01Q 5/30* (2015.01); *H01Q 9/0407* (2013.01)

(58) Field of Classification Search
CPC .... H01Q 1/1271; H01Q 1/32; H01Q 1/38–48; H01Q 1/24; H01Q 5/30–50; H01Q 9/0407
See application file for complete search history.

(56) References Cited

U.S. PATENT DOCUMENTS 7,061,442 B1 6/2006 Tang et al.
9,270,017 B2 * 2/2016 Villarroel ............ H01Q 1/3275
(Continued)

FOREIGN PATENT DOCUMENTS

| | | |
|---|---|---|
| JP | 2020162120 | 10/2020 |
| WO | 2021201322 | 10/2021 |
| WO | 2022092514 | 5/2022 |

OTHER PUBLICATIONS

PCT International Application No. PCT/KR2022/011875, International Search Report dated May 3, 2023, 4 pages.

*Primary Examiner* — Hasan Islam
(74) *Attorney, Agent, or Firm* — LEE, HONG, DEGERMAN, KANG & WAIMEY

(57) ABSTRACT

A vehicle comprises: vehicular glass including a transparent region and an opaque region; a transparent dielectric substrate disposed in the transparent region of the vehicular glass; a first area including an antenna on one side surface of the transparent dielectric substrate; and a second area including a power supply pattern and a ground conductive pattern electrically connected to the antenna. The antenna may comprise: a first slot formed between a signal pattern and a first ground pattern and configured to radiate a first signal having a circularly polarized wave in a first frequency band; and a second slot formed between the first ground pattern and a second ground pattern and configured to radiate a second signal having a circularly polarized wave in a second frequency band lower than the first frequency band.

20 Claims, 46 Drawing Sheets

(56) References Cited

U.S. PATENT DOCUMENTS

| | | | |
|---|---|---|---|
| 2017/0324142 A1 | 11/2017 | Talty et al. | |
| 2023/0108271 A1* | 4/2023 | Park | H01Q 19/005 343/725 |

* cited by examiner (a)

(b)

(c)

(a)

(b)

(a)

(b)

(a)

(b)

(a)

(b)

(a)

(b)

(a)

(b)

(a)

(b)

(a)

(b)

(a)

(b) (c) (d)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(c)

ANTENNA MODULE DISPOSED IN VEHICLE

CROSS-REFERENCE TO RELATED APPLICATION

This application is the National Stage filing under 35 U.S.C. 371 of International Application No. PCT/KR2022/011875, filed on Aug. 9, 2022, the contents of which are hereby incorporated by reference herein its entirety.

TECHNICAL FIELD

The present specification relates to a transparent antenna disposed in a vehicle. In particular, certain embodiments pertain to an antenna assembly implemented with a transparent material so that the antenna area is not identifiable on the vehicle glass.

BACKGROUND ART

A vehicle can perform wireless communication services with other vehicles, surrounding objects, infrastructure, or base stations. In this context, various communication services can be provided through wireless communication systems applying LTE or 5G communication technologies. Meanwhile, some of the LTE frequency bands may be allocated to provide 5G communication services. Additionally, a GNSS (Global Navigation Satellite System) antenna configured to perform satellite communication can be installed in the vehicle.

However, the vehicle body and roof are often formed of metal materials, which can block radio waves. Accordingly, a separate antenna structure may be disposed on the upper part of the vehicle body or roof. Alternatively, when the antenna structure is placed beneath the vehicle body or roof, the corresponding parts of the vehicle body or roof where the antenna is located can be made of non-metallic materials.

From a design perspective, it is often necessary for the vehicle body or roof to be integrally formed. In such cases, the exterior of the vehicle body or roof may be made of metal materials, which can significantly reduce antenna efficiency due to interference from the vehicle body or roof.

In this regard, to increase communication capacity without altering the vehicle's exterior design, a transparent antenna can be placed on the glass corresponding to the vehicle's windows. However, due to the electrical loss of transparent material antennas, issues such as degradation of antenna radiation efficiency and impedance bandwidth characteristics may arise. Furthermore, when a transparent antenna is placed on the vehicle's glass panel, antenna radiation efficiency can deteriorate at frequencies above 2 GHz due to losses on the glass panel.

To perform wireless communication in a vehicle, it is necessary to form an antenna radiation pattern in a low elevation area within a predetermined angle range based on the vehicle's horizontal plane. On the other hand, a configured GNSS antenna needs to form a radiation pattern toward the vehicle's ceiling to perform satellite communication. Therefore, unlike antennas configured for wireless communication, the radiation pattern of a GNSS antenna should be formed in the vertical direction.

DISCLOSURE OF INVENTION

Technical Problem

The present specification aims to solve the aforementioned and other problems. Another objective is to provide a vehicle GNSS antenna that can be placed on the vehicle glass.

Another objective of this specification is to form the radiation pattern of a vehicle GNSS antenna toward the vehicle's ceiling.

Another objective of this specification is to enable a GNSS antenna placed in a specific area of the vehicle glass to operate in dual bands.

Another objective of this specification is to improve the circular polarization characteristics of a GNSS antenna operating in dual bands and placed in a specific area of the vehicle glass.

Another objective of this specification is to implement a GNSS antenna that operates in dual-band circular polarization on a single layer.

Another objective of this specification is to minimize changes in antenna characteristics caused by vehicle glass when attaching a GNSS antenna implemented as a transparent antenna to the vehicle glass.

Another objective of this specification is to enhance the invisibility of a GNSS antenna implemented as a transparent antenna when attached to vehicle glass so that the antenna pattern is not distinguishable by the naked eye.

Another objective of this specification is to propose a GNSS antenna technology that operates in dual-band circular polarization with a single-layer structure, reducing the influence of vehicle glass using a transparent material.

Solution to Problem

According to one aspect of the present specification for achieving the above or other objectives, a vehicle includes: vehicle glass including transparent and opaque regions; a transparent dielectric substrate disposed in the transparent region of the vehicle glass; a first region on one surface of the transparent dielectric substrate including an antenna; and a second region including a feed pattern and a ground conductive pattern electrically connected to the antenna. The antenna may include: a first slot formed between a signal pattern and a first ground pattern and configured to radiate a first signal having circular polarization in a first frequency band; and a second slot formed between the first ground pattern and a second ground pattern and configured to radiate a second signal having circular polarization in a second frequency band lower than the first frequency band.

In an embodiment, the antenna may further include: a signal pattern connected to the feed pattern of the second region; a first ground pattern connected to the ground conductive pattern of the second region; and a second ground pattern connected to or spaced apart from the ground conductive pattern of the second region and configured to surround the first ground pattern. The length of the second slot formed inside the second ground pattern may be configured within a range of ¾ to one wavelength corresponding to the operating frequency in the second frequency band. The second ground pattern may be formed to surround the first ground pattern. The second ground pattern may prevent the first signal radiated by the first slot from leaking into the vehicle glass outside the second ground pattern, and the radiation patterns of the first and second signals may be formed toward the vehicle's ceiling.

In an embodiment, at least a portion of the outer boundary of the first ground pattern may be formed in a circular shape. The diameter of the outer boundary of the first ground pattern may be configured within a range of ¼ to ½ wavelength corresponding to the operating frequency in the first frequency band.

In an embodiment, a first portion of the inner boundary of the first ground pattern may be formed in a circular shape.

A second portion of the inner boundary of the first ground pattern may be formed with straight lines in one axial direction and another axial direction. The first ground pattern may have a first width in one axial direction and a second width narrower than the first width.

In an embodiment, the width in one axial direction of the second ground pattern may be formed within a range of 11 mm to 14 mm. Accordingly, the axial ratio of the first and second signals having circular polarization can be maintained below a threshold value.

In an embodiment, the ground conductive pattern may include: a first portion connected to the first ground pattern and having upper and lower regions; a second portion connected to the first ground pattern and having upper and lower regions, with the feed pattern formed between the first and second portions of the ground conductive pattern; a third portion connected to the lower region of the first portion of the ground conductive pattern and configured to be spaced apart from the upper region of the first portion; and a fourth portion connected to the lower region of the second portion of the ground conductive pattern and configured to be spaced apart from the upper region of the second portion.

In an embodiment, the widths of the third and fourth portions of the ground conductive pattern, which are spaced apart from the upper regions of the first and second portions, may be formed within a range of 2 mm to 6 mm. Accordingly, the axial ratio of the first and second signals having circular polarization can be maintained below a threshold value.

In an embodiment, the ground conductive pattern may further include: a fifth portion with one end connected to the third portion of the ground conductive pattern and the other end connected to the second ground pattern; and a sixth portion with one end connected to the fourth portion of the ground conductive pattern and the other end connected to the second ground pattern.

In an embodiment, the ground conductive pattern may further include: a fifth portion with one end connected to the third portion of the ground conductive pattern and the other end spaced apart from the second ground pattern by a first gap; and a sixth portion with one end connected to the fourth portion of the ground conductive pattern and the other end spaced apart from the second ground pattern by a first gap. The first gap may be formed as 1.5 mm or less to maintain the axial ratio of the second signal having circular polarization in the second frequency band below a threshold value.

In an embodiment, a second gap between the inner boundary of the second ground pattern and the outer boundary of the first ground pattern may be formed within a range of 3 mm to 6 mm. The second ground pattern with the second gap can prevent the first signal radiated by the first slot from leaking into the vehicle glass outside the second ground pattern and maintain the axial ratio of the second signal having circular polarization in the second frequency band below a threshold value.

In an embodiment, the outer boundary of the upper region of the first ground pattern may be configured in a circular shape. The inner and outer boundaries of a portion of the upper and side regions of the second ground pattern may be configured as straight lines.

In an embodiment, the outer boundary of the upper region of the first ground pattern may be configured in a circular shape. The outer boundary of the upper and side regions of the second ground pattern may be configured as straight lines or circular shapes in the first region.

In an embodiment, the second ground pattern may include: a first sub-pattern connected to or spaced apart from the first ground conductive pattern; a second sub-pattern connected to or spaced apart from the first ground conductive pattern; and a third sub-pattern configured to form the upper region of the second ground pattern and spaced apart from the ends of the first and second sub-patterns by a predetermined gap.

In an embodiment, the signal pattern, first ground pattern, and second ground pattern may be formed in a metal mesh shape with multiple opening areas at their inner and outer boundaries and interconnected internal regions on the transparent dielectric substrate. The signal pattern, first ground pattern, and second ground pattern may be formed in a Coplanar Waveguide (CPW) structure on the transparent dielectric substrate.

In an embodiment, the antenna assembly formed in the first and second regions may include multiple dummy mesh lattice patterns disposed on the outer portions of the conductive patterns in metal mesh radiating areas on the transparent dielectric substrate. The multiple dummy mesh lattice patterns may be formed without being connected to the feed pattern and ground conductive pattern and may be separated from each other.

In an embodiment, the dummy mesh lattice patterns may include: first dummy mesh lattice patterns disposed in the first slot, which is the outer portion of the signal pattern—the first dummy mesh lattice patterns are mutually separated in one axial and another axial direction and separated from the boundaries of the signal pattern and first ground pattern; and second dummy mesh lattice patterns disposed in the second slot, which is the outer portion of the first ground pattern—the second dummy mesh lattice patterns are mutually separated in one axial and another axial direction and separated from the boundaries of the first and second ground patterns.

According to another aspect of the present specification, a vehicle comprises: a glass panel including transparent and opaque regions; and an antenna assembly disposed on the glass panel. The antenna assembly includes: a first transparent dielectric substrate disposed in the transparent region of the glass panel; an antenna pattern disposed in a first region on one surface of the first transparent dielectric substrate—the first region on one surface of the first transparent dielectric substrate is disposed in the transparent region of the glass panel; a connection pattern connected to the antenna pattern and disposed in a second region on one surface of the first transparent dielectric substrate—the second region on one surface of the first transparent dielectric substrate is disposed in the opaque region of the glass panel; a second dielectric substrate disposed in the opaque region of the glass panel; and a ground conductive pattern and feed pattern disposed in the second region on one surface of the second dielectric substrate.

In an embodiment, the antenna pattern may include: a signal pattern connected to the feed pattern of the second region; a first ground pattern connected to the ground conductive pattern of the second region; a first slot formed between the signal pattern and the first ground pattern and configured to radiate a first signal having circular polarization in a first frequency band; a second ground pattern connected to the ground conductive pattern of the second region and configured to surround the first ground pattern; and a second slot formed between the first and second ground patterns and configured to radiate a second signal having circular polarization in a second frequency band lower than the first frequency band.

In an embodiment, the length of the second slot formed inside the second ground pattern may be configured within a range of ¾ to one wavelength corresponding to the operating frequency in the second frequency band. The second ground pattern may be formed to surround the first ground pattern. The second ground pattern may prevent the first signal radiated by the first slot from leaking into the vehicle glass outside the second ground pattern, and the radiation patterns of the first and second signals may be formed toward the vehicle's ceiling.

In an embodiment, at least a portion of the outer boundary of the first ground pattern may be formed in a circular shape. The diameter of the outer boundary of the first ground pattern may be configured within a range of ¼ to ½ wavelength corresponding to the operating frequency in the first frequency band. A first portion of the inner boundary of the first ground pattern may be formed in a circular shape, and a second portion of the inner boundary may be formed with straight lines in one axial and another axial direction. The first ground pattern may have a first width in one axial direction and a second width narrower than the first width.

In an embodiment, the ground conductive pattern may include: a first portion connected to the first ground pattern and having upper and lower regions; a second portion connected to the second ground pattern and having upper and lower regions, with the feed pattern formed between the first and second portions of the ground conductive pattern; a third portion connected to the lower region of the first portion of the ground conductive pattern and configured to be spaced apart from the upper region of the first portion; and a fourth portion connected to the lower region of the second portion of the ground conductive pattern and configured to be spaced apart from the upper region of the second portion. The widths of the third and fourth portions of the conductive pattern, which are spaced apart from the upper regions of the first and second portions in the second region, may be formed within a range of 2 mm to 6 mm.

In an embodiment, the ground conductive pattern may further include: a fifth portion with one end connected to the third portion of the ground conductive pattern and the other end connected to or spaced apart from the second ground pattern by a first gap; and a sixth portion with one end connected to the fourth portion of the ground conductive pattern and the other end connected to or spaced apart from the second ground pattern by a first gap. The first gap may be formed within a range of 1.5 mm to 4.5 mm.

In an embodiment, the width in one axial direction of the second conductive pattern may be formed within a range of 11 mm to 14 mm. A second gap between the inner boundary of the second ground pattern and the outer boundary of the first ground pattern may be formed within a range of 3 mm to 6 mm.

Advantageous Effects of Invention

The technical effects of the transparent antenna disposed in a vehicle as described above are as follows.

According to the present specification, by forming the GNSS antenna disposed in a specific area of the vehicle glass with a dual-slot structure, the GNSS antenna can operate in dual bands.

According to the present specification, the circular polarization characteristics in dual bands of the GNSS antenna disposed in a specific area of the vehicle glass can be improved through optimization of the dual-slot structure and conductive patterns.

According to the present specification, the conductive patterns and ground conductive patterns acting as radiators for the GNSS antenna operating in dual-band circular polarization can be implemented on a single layer.

According to the present specification, when attaching a GNSS antenna implemented as a transparent antenna to the vehicle glass, antenna characteristic changes due to the vehicle glass can be minimized by placing transparent and opaque substrates in the transparent and opaque regions of the vehicle glass, respectively.

According to the present specification, when attaching a GNSS antenna implemented as a transparent antenna to the vehicle glass, invisibility can be enhanced so that the antenna pattern is not distinguishable by the naked eye through the use of dummy metal mesh lattice structures.

According to the present specification, a GNSS antenna structure that operates in dual-band circular polarization with a single-layer structure can be provided, reducing the influence of vehicle glass using transparent materials and enabling satellite communication.

Additional scope of applicability of the present specification will become apparent from the detailed description provided below. However, it should be understood that various modifications and changes can be made by those skilled in the art within the spirit and scope of the present specification, and thus, specific embodiments such as the detailed description and preferred embodiments of this specification are given by way of example only.

MODE FOR THE INVENTION

The following describes the embodiments disclosed in this specification in detail with reference to the accompanying drawings. In the following description, regardless of the reference numbers used, identical or similar components will be assigned the same reference numbers, and redundant descriptions will be omitted. The suffixes “module” and “part” used for components in the description are given only for ease of writing the specification and may be used interchangeably without indicating distinct meanings or functions. Additionally, specific explanations of related well-known technologies may be omitted if they obscure the essence of the embodiments disclosed in this specification. Moreover, the attached drawings are provided only to aid in the understanding of the embodiments disclosed in this specification and should not be construed as limiting the technical ideas disclosed herein. All modifications, equivalents, and substitutions within the spirit and scope of the present invention should be considered as included.

Terms including ordinal numbers such as first and second may be used to describe various components, but these components are not limited by these terms. These terms are used solely to distinguish one component from another.

When a component is referred to as being “connected” or “coupled” to another component, it can be directly connected or coupled to the other component, or there may be intervening components. In contrast, when a component is referred to as being “directly connected” or “directly coupled” to another component, there are no intervening components.

Unless otherwise specified, the singular expressions used herein include plural meanings.

In the present application, terms such as “comprises” or “has” are intended to specify the existence of features, numbers, steps, operations, components, parts, or combinations thereof, but do not preclude the possibility of the existence or addition of one or more other features, numbers, steps, operations, components, parts, or combinations thereof.

The antenna system described in this specification can be mounted on a vehicle. The configuration and operation according to the embodiments disclosed in this specification may also apply to a communication system mounted on a vehicle, that is, the antenna system. In this regard, the antenna system mounted on the vehicle may include multiple antennas and transceiver circuits and processors controlling these antennas.

The following describes an antenna assembly (antenna module) that can be placed on the windows of a vehicle according to the present specification, as well as a vehicle antenna system including the antenna assembly. In this regard, the antenna assembly refers to a structure in which conductive patterns are combined on a dielectric substrate, and it may also be referred to as an antenna module.

Figure 1:
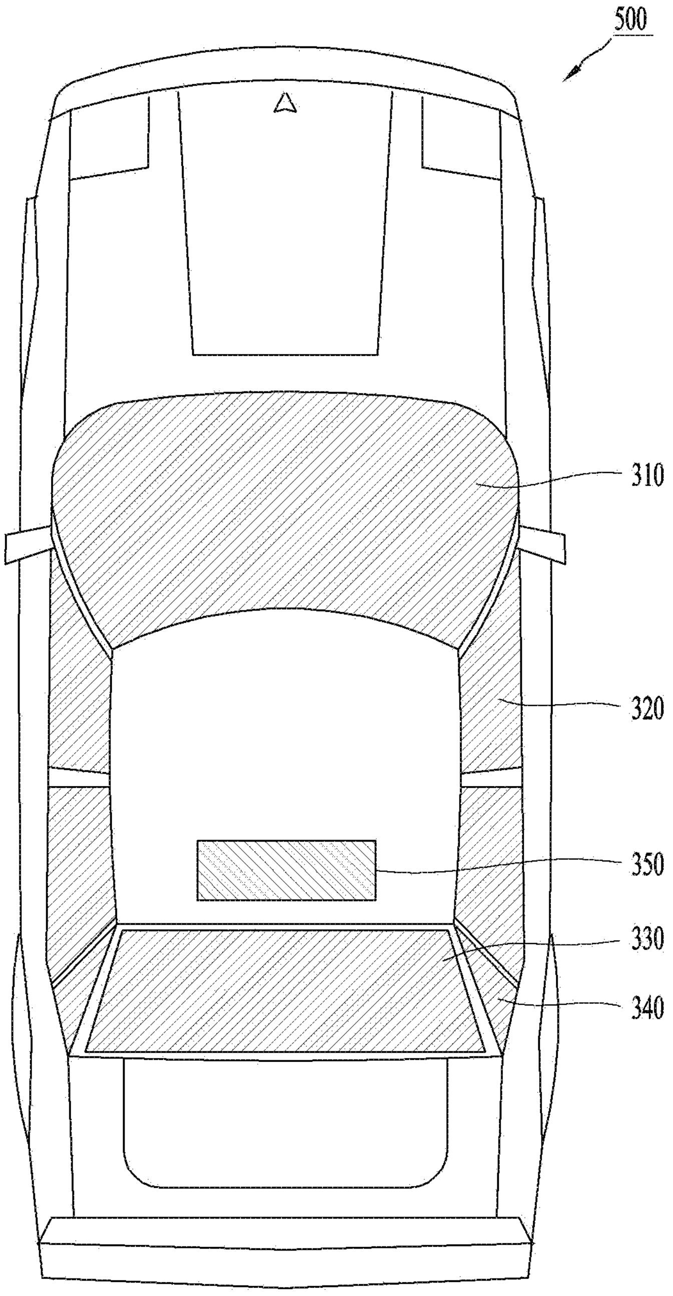
FIG. 1 illustrates vehicle glass on which an antenna structure according to an embodiment of the present specification can be disposed.

FIG. 1 illustrates the glass of a vehicle where the antenna structure according to the embodiment of the present specification can be disposed. Referring to FIG. 1, the vehicle 500 can include a front glass 310, door glass 320, rear glass 330, and quarter glass 340. In addition, the vehicle 500 may also be configured to include upper glass 350 formed on the roof area of the vehicle.

Accordingly, the glass constituting the windows of the vehicle 500 may include front glass 310 located at the front of the vehicle, door glass 320 located in the door area of the vehicle, and rear glass 330 located in the rear area of the vehicle. In addition, the glass constituting the windows of the vehicle 500 may also include quarter glass 340 located in some areas of the vehicle's door. Furthermore, the glass constituting the windows of the vehicle 500 may also include upper glass 350 located in the upper area of the vehicle, separated from the rear glass 330. Accordingly, the glass constituting each window of the vehicle 500 may be referred to as a window.

The front glass 310 prevents wind from entering the vehicle from the front direction, so it may be referred to as a front windshield. The front glass 310 may be formed with a two-layer laminated structure with a thickness of about 5.0 to 5.5 mm. The front glass 310 may be formed with a laminated structure of glass/anti-scattering film/glass.

The door glass 320 may be formed with a two-layer laminated structure or a single-layer tempered glass. The rear glass 330 may be formed with a two-layer laminated structure or a single-layer tempered glass with a thickness of about 3.5 to 5.5 mm. There needs to be a separation distance between the defogger and the AM/FM antenna and the transparent antenna on the rear glass 330. The quarter glass 340 may be formed with single-layer tempered glass with a thickness of about 3.5 to 4.0 mm, though it is not limited to this.

The size of the quarter glass 340 may vary depending on the type of vehicle, and the size of the quarter glass 340 may be smaller than that of the front glass 310 and rear glass 330.

Figure 2A:
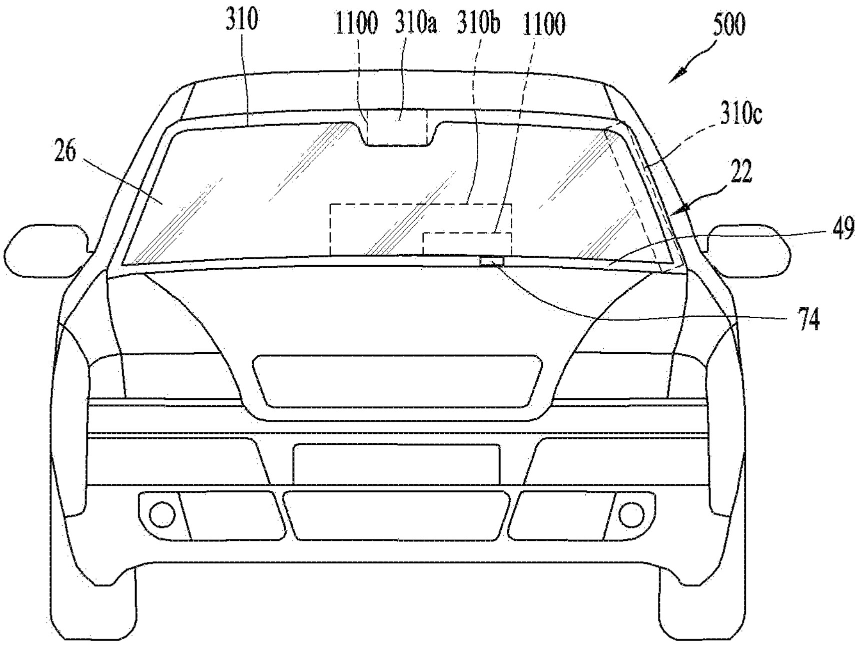
FIG. 2A shows a front view of a vehicle where antenna assemblies are disposed in different regions of the front glass of the vehicle shown in FIG. 1.
Figure 2B:
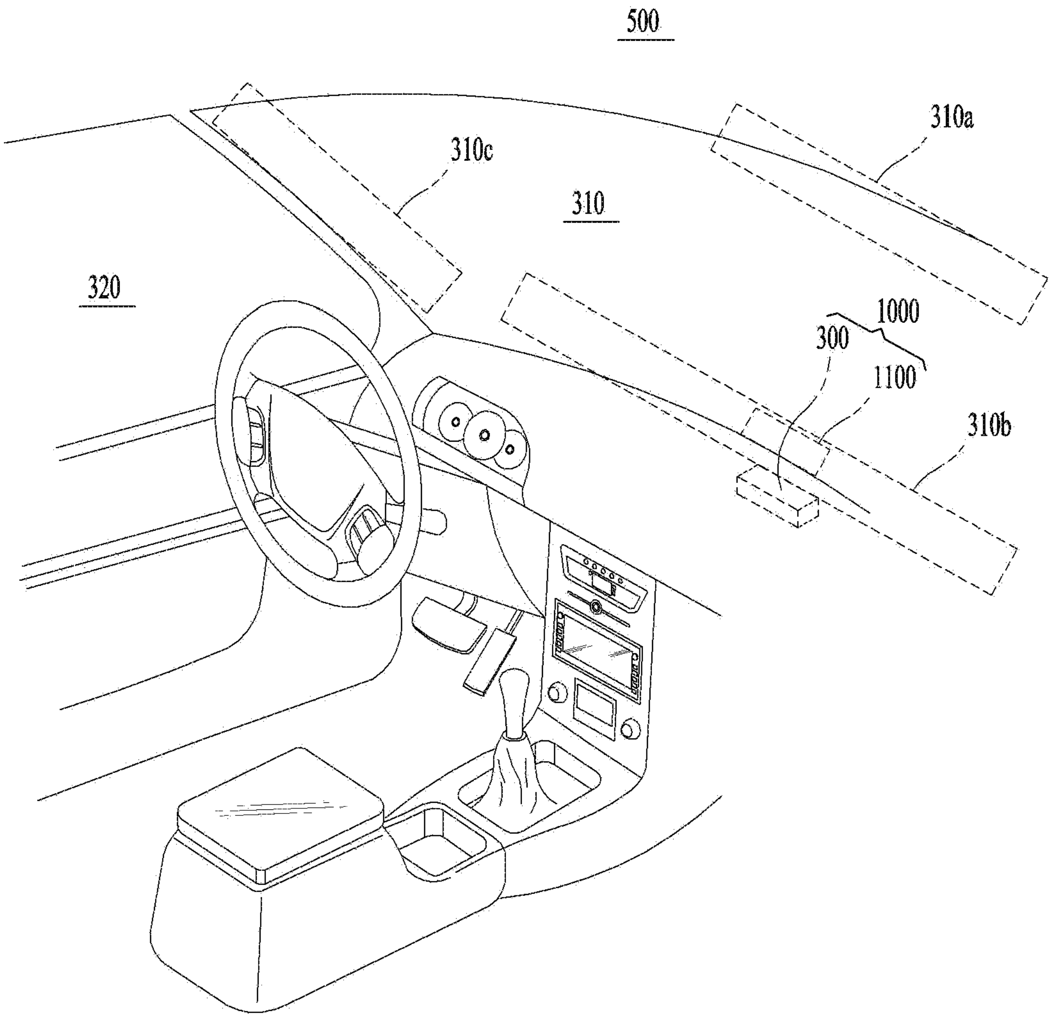
FIG. 2B illustrates an internal front perspective view of a vehicle where antenna assemblies are disposed in different regions of the front glass of the vehicle shown in FIG. 1.
Figure 2C:
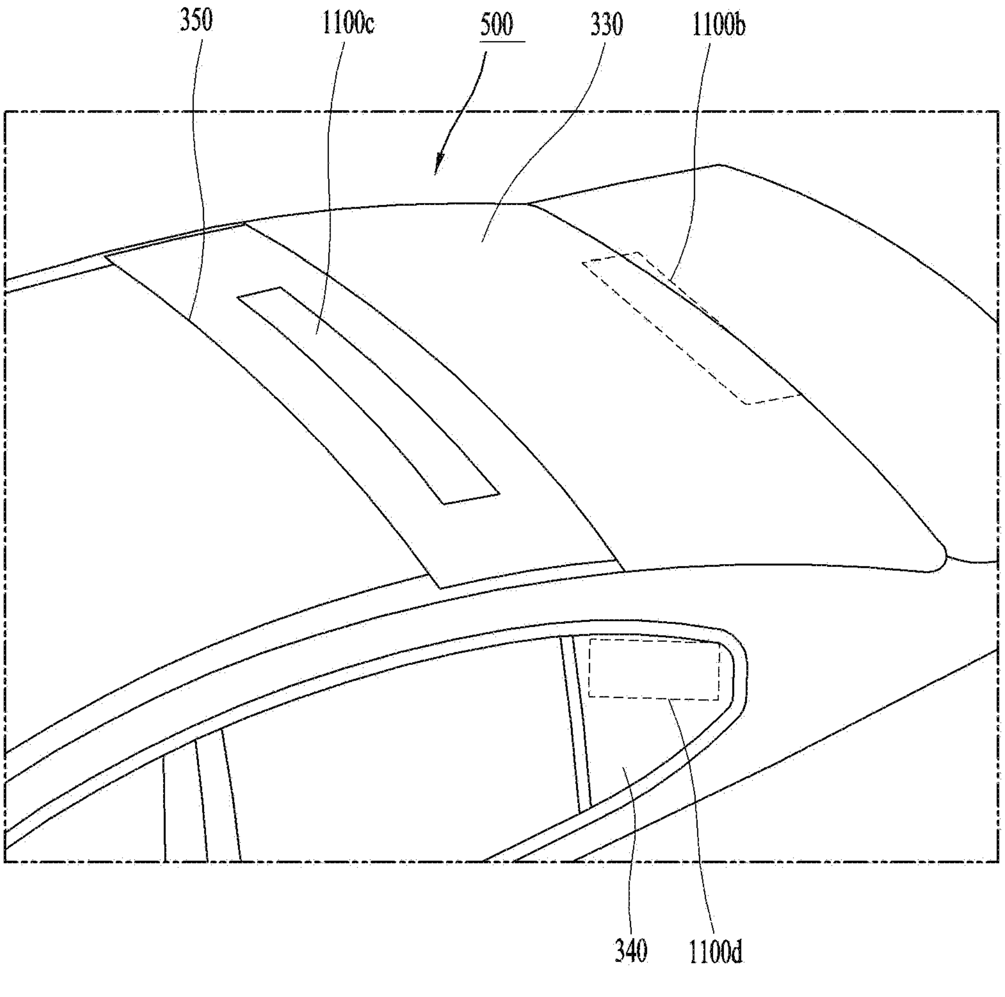
FIG. 2C depicts a side perspective view of a vehicle where an antenna assembly is disposed on the upper glass of the vehicle shown in FIG. 1.

The following describes the structure where the antenna assembly according to the present specification is placed in different regions of the front glass of the vehicle. The antenna assembly attached to vehicle glass may be implemented as a transparent antenna. In this regard, FIG. 2A shows the front view of a vehicle where the antenna assembly is placed in different regions of the front glass of the vehicle shown in FIG. 1. FIG. 2B shows the internal front perspective view of a vehicle where the antenna assembly is placed in different regions of the front glass of the vehicle shown in FIG. 1. FIG. 2*c* shows the side perspective view of a vehicle where the antenna assembly is placed on the upper glass of the vehicle shown in FIG. 1.

Referring to FIG. 2A, the front view of vehicle 500 shows the configuration where the vehicle transparent antenna according to the present specification may be placed. The pane assembly 22 may include an antenna in the upper region 310*a*. The pane assembly 22 may include an antenna in the upper region 310*a*, lower region 310*b*, and/or side region 310*c*. Additionally, the pane assembly 22 may include a translucent pane glass 26 formed from a dielectric substrate. The antennas in the upper region 310*a*, lower region 310*b*, and/or side region 310*c* are configured to support one or more communication systems.

The antenna module 1100 may be implemented in the upper region 310*a*, lower region 310*b*, or side region 310*c* of the front glass 310. When the antenna module 1100 is placed in the lower region 310*b* of the front glass 310, the antenna module 1100 may extend to the body 49 of the lower region of the translucent pane glass 26. The body 49 of the lower region of the translucent pane glass 26 may be implemented with lower transparency than other parts. Part of the feed section or other interface lines may be implemented in the body 49 of the lower region of the translucent pane glass 26. The connector assembly 74 may be implemented in the body 49 of the lower region of the translucent pane glass 26. The body 49 of the lower region may form part of the metal body of the vehicle.

Referring to FIG. 2B, the antenna assembly 1000 may be configured to include a telematics control unit (TCU) 300 and the antenna module 1100. The antenna module 1100 may be placed in different regions of the vehicle glass.

Referring to FIGS. 2A and 2B, the antenna assembly may be placed in the upper region 310*a*, lower region 310*b*, and/or side region 310*c* of the vehicle glass. Referring to FIGS. 2A through 2C, the antenna assembly may be placed in the front glass 310, rear glass 330, quarter glass 340, and upper glass 350 of the vehicle.

Referring to FIGS. 2A through 2C, the antenna in the upper region 310*a* of the front glass 310 of the vehicle may be configured to operate in the low band LB, mid band MB, and high band HB of the 4G/5G communication system, as well as the 5G Sub6 band. The antennas in the lower region 310*b* and/or side region 310*c* may also be configured to operate in the LB, MB, HB, and 5G Sub6 bands of the 4G/5G communication system. The antenna structure 1100*b* on the rear glass 330 of the vehicle may also be configured to operate in the LB, MB, HB, and 5G Sub6 bands of the 4G/5G communication system. The antenna structure 1100*c* on the upper glass 350 of the vehicle may also be configured to operate in the LB, MB, HB, and 5G Sub6 bands of the 4G/5G communication system. The antenna structure 1100*d* on the quarter glass 350 of the vehicle may also be configured to operate in the LB, MB, HB, and 5G Sub6 bands of the 4G/5G communication system.

At least part of the outer area of the front glass 310 of the vehicle may be formed with translucent pane glass 26. The translucent pane glass 26 may include a first part where part of the feed section and the antenna are formed, and a second part where part of the feed section and a dummy structure are formed. Additionally, the translucent pane glass 26 may further include a dummy area where no conductive patterns are formed. For example, the transparent area of the pane assembly 22 may be formed transparently to secure light transmission and a field of view.

Although it is illustrated that conductive patterns can be formed in some areas of the front glass 310, they can be extended to the side glass 320, rear glass 330, or any glass structure in FIG. 1. In the vehicle 500, passengers or the driver can see the road and surrounding environment through the pane assembly 22. Furthermore, passengers or the driver can view the road and surrounding environment without interference from the antenna in the upper region 310*a*, lower region 310*b*, and/or side region 310*c*.

Figure 3:
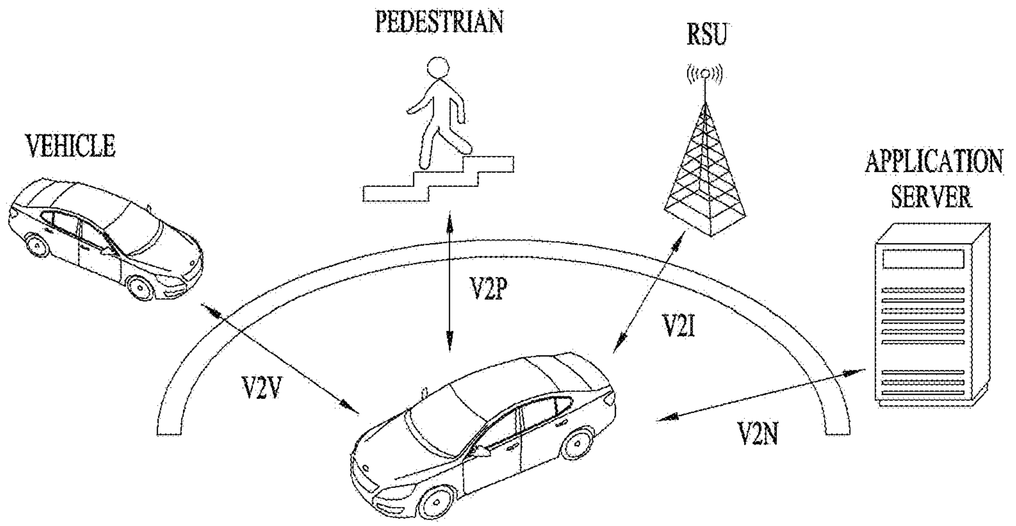
FIG. 3 represents different types of V2X applications.

The vehicle 500 can be configured to communicate not only with nearby vehicles but also with pedestrians, surrounding infrastructure, and/or servers. In this regard, FIG. 3 shows different types of V2X applications. Referring to FIG. 3, V2X (Vehicle-to-Everything) communication includes V2V (Vehicle-to-Vehicle), which refers to communication between vehicles; V2I (Vehicle-to-Infrastructure), which refers to communication between a vehicle and eNB or RSU (Road Side Unit); V2P (Vehicle-to-Pedestrian), which refers to communication between a vehicle and terminals carried by individuals such as pedestrians, cyclists, vehicle drivers, or passengers; and V2N (Vehicle-to-Network), which refers to communication between a vehicle and networks or other entities.

Figure 4:
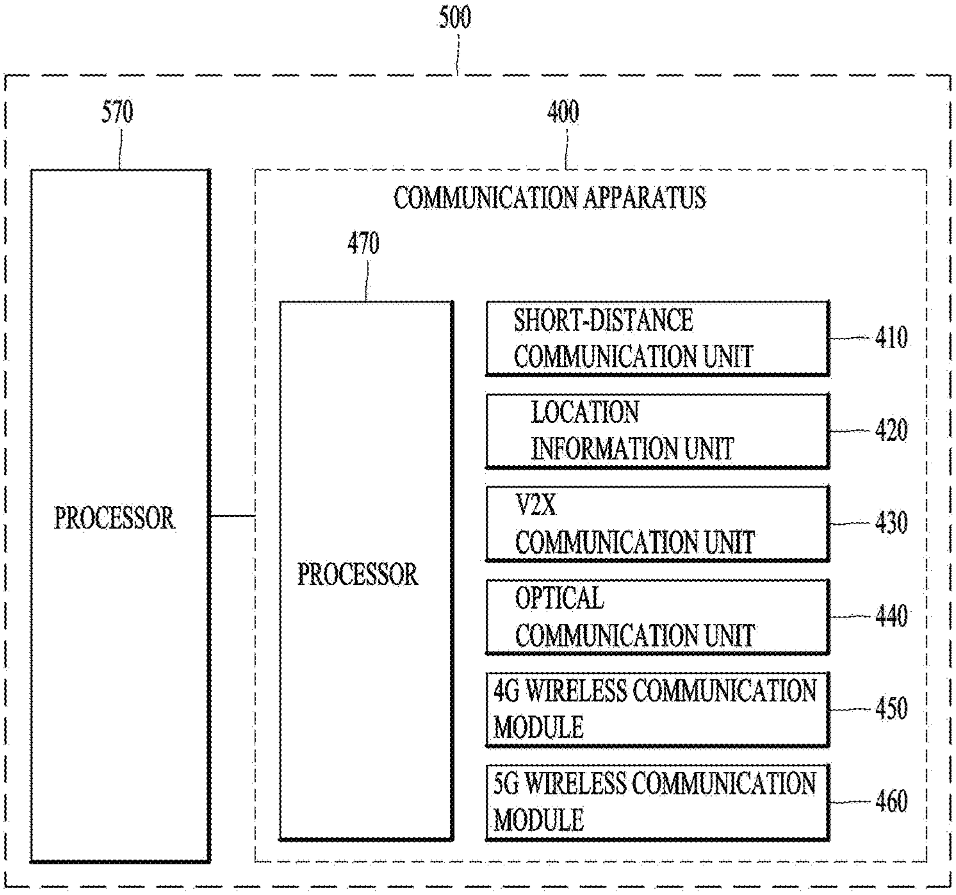
FIG. 4 is a block diagram referred to for explaining a vehicle and an antenna system mounted on the vehicle according to embodiments of the present specification.

Meanwhile, FIG. 4 is a block diagram used to explain the vehicle and the antenna system mounted on the vehicle according to the embodiments of the present specification.

The vehicle 500 can be configured to include a communication device 400 and a processor 570. The communication device 400 may correspond to the telematics control unit of the vehicle 500.

The communication device 400 is a device for performing communication with external devices. Here, external devices may be other vehicles, mobile terminals, or servers. The communication device 400 may include one or more of a transmission antenna, a reception antenna, an RF (Radio Frequency) circuit, and RF components capable of implementing various communication protocols to perform communication. The communication device 400 may include a short-range communication section 410, a location information section 420, a V2X communication section 430, an optical communication section 440, a 4G wireless communication module 450, and a 5G wireless communication module 460. The communication device 400 may include a processor 470. Depending on the embodiment, the communication device 400 may include other components in addition to the components described or exclude some of the components described.

The 4G wireless communication module 450 and the 5G wireless communication module 460 perform wireless communication with one or more communication systems through one or more antenna modules. The 4G wireless communication module 450 can transmit and/or receive signals to devices in the first communication system through the first antenna module. In addition, the 5G wireless communication module 460 can transmit and/or receive signals to devices in the second communication system through the second antenna module. The 4G wireless communication module 450 and the 5G wireless communication module 460 may also be implemented as a single integrated communication module. Here, the first and second communication systems may each be the LTE communication system and the 5G communication system. However, the first and second communication systems are not limited to this and can be extended to any other communication systems.

The processor of the device in the vehicle 500 may be implemented as an MCU (Micro Control Unit) or a modem. The processor 470 of the communication device 400 corresponds to the modem, and the processor 470 may be implemented as an integrated modem. The processor 470 can obtain surrounding information from other nearby vehicles, objects, or infrastructure through wireless communication. The processor 470 can perform vehicle control using the obtained surrounding information.

The processor 570 of the vehicle 500 may correspond to the processor of a CAN (Car Area Network) or ADAS (Advanced Driving Assistance System), but it is not limited to this. In the case of distributed control in the vehicle 500, the processor 570 of the vehicle 500 may be replaced with the processor of each device.

Meanwhile, the antenna module placed inside the vehicle 500 may be configured to include a wireless communication section. The 4G wireless communication module 450 can transmit and receive 4G signals to and from a 4G base station through a 4G mobile communication network. At this time, the 4G wireless communication module 450 can transmit one or more 4G transmission signals to the 4G base station. In addition, the 4G wireless communication module 450 can receive one or more 4G reception signals from the 4G base station. In this regard, MIMO (Multi-Input Multi-Output) may be performed by multiple 4G transmission signals transmitted to the 4G base station for the uplink (UL). In addition, MIMO (Multi-Input Multi-Output) may be performed by multiple 4G reception signals received from the 4G base station for the downlink (DL).

The 5G wireless communication module 460 can transmit and receive 5G signals to and from a 5G base station through a 5G mobile communication network. Here, the 4G and 5G base stations may have a non-standalone (NSA) structure. For example, the 4G and 5G base stations may be deployed in a non-standalone (NSA) structure. Alternatively, the 5G base station may be deployed in a standalone (SA) structure, separate from the 4G base station. The 5G wireless communication module 460 can transmit one or more 5G transmission signals to the 5G base station through the 5G mobile communication network. In addition, the 5G wireless communication module 460 can receive one or more 5G reception signals from the 5G base station. At this time, the 5G frequency band may use the same band as the 4G frequency band, which is referred to as LTE re-farming. Meanwhile, the Sub6 band, a frequency band below 6 GHz, may be used as the 5G frequency band. On the other hand, the millimeter-wave (mmWave) band may be used as the 5G frequency band to perform high-speed broadband communication. When the millimeter-wave (mmWave) band is used, the electronic device may perform beamforming to extend communication coverage with the base station.

Regardless of the 5G frequency band, more MIMO (Multi-Input Multi-Output) can be supported in the 5G communication system to improve transmission speed. In this regard, MIMO can be performed for the uplink (UL) by multiple 5G transmission signals transmitted to the 5G base station. In addition, MIMO can be performed for the downlink (DL) by multiple 5G reception signals received from the 5G base station.

Meanwhile, dual connectivity (DC) may be established between the 4G base station and the 5G base station through the 4G wireless communication module 450 and the 5G wireless communication module 460. This dual connectivity may be referred to as EN-DC (EUTRAN NR DC). If the 4G and 5G base stations are co-located, throughput improvement can be achieved through inter-carrier aggregation (CA). Accordingly, if the 4G base station and the 5G base station are in an EN-DC state, the 4G wireless communication module 450 and the 5G wireless communication module 460 can simultaneously receive 4G reception signals and 5G reception signals. Meanwhile, short-range communication between electronic devices (such as vehicles) can be performed using the 4G wireless communication module 450 and the 5G wireless communication module 460. In one embodiment, wireless communication can be performed between vehicles in a V2V mode without going through a base station after resources are allocated.

Meanwhile, for improving transmission speed and communication system convergence, carrier aggregation (CA) can be performed using at least one of the 4G wireless communication module 450 and the 5G wireless communication module 460 along with the Wi-Fi communication module 113. In this regard, 4G+WiFi carrier aggregation (CA) can be performed using the 4G wireless communication module 450 and the Wi-Fi communication module 113. Alternatively, 5G+WiFi carrier aggregation (CA) can be performed using the 5G wireless communication module 460 and the Wi-Fi communication module.

Meanwhile, the communication device 400 can implement a vehicle display device along with the user interface device. In this case, the vehicle display device may be referred to as a telematics device or an AVN (Audio Video Navigation) device.

Meanwhile, the broadband transparent antenna structure that can be placed on the glass of the vehicle according to the present specification can be implemented on a single dielectric substrate on the same plane as the CPW feed section. Additionally, the broadband transparent antenna structure placed on the vehicle glass according to the present specification can be implemented with a broadband structure where the ground is formed on both sides of the radiator.

Figure 5A:
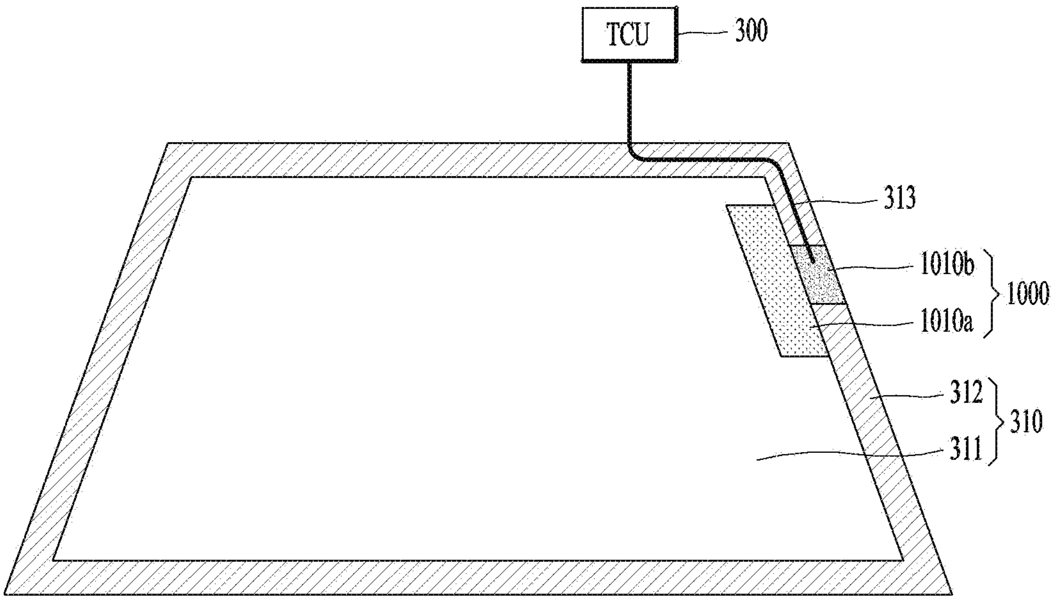
FIGS. 5A to 5C illustrate configurations where an antenna assembly according to the present specification is disposed on vehicle glass.
Figure 5B:
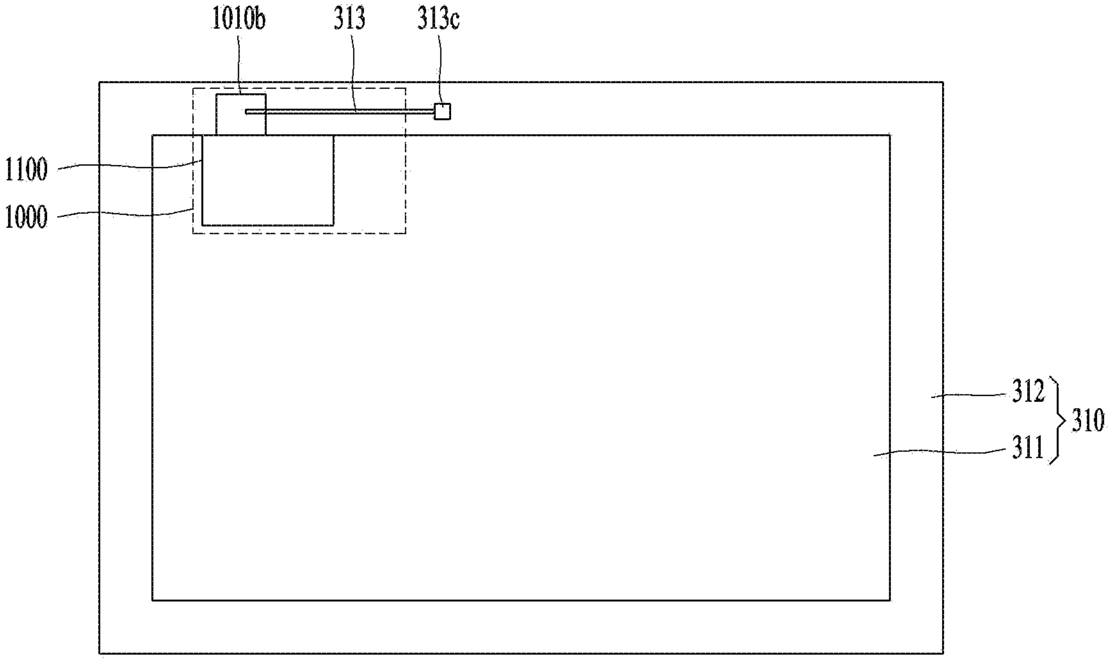
Figure 5C:
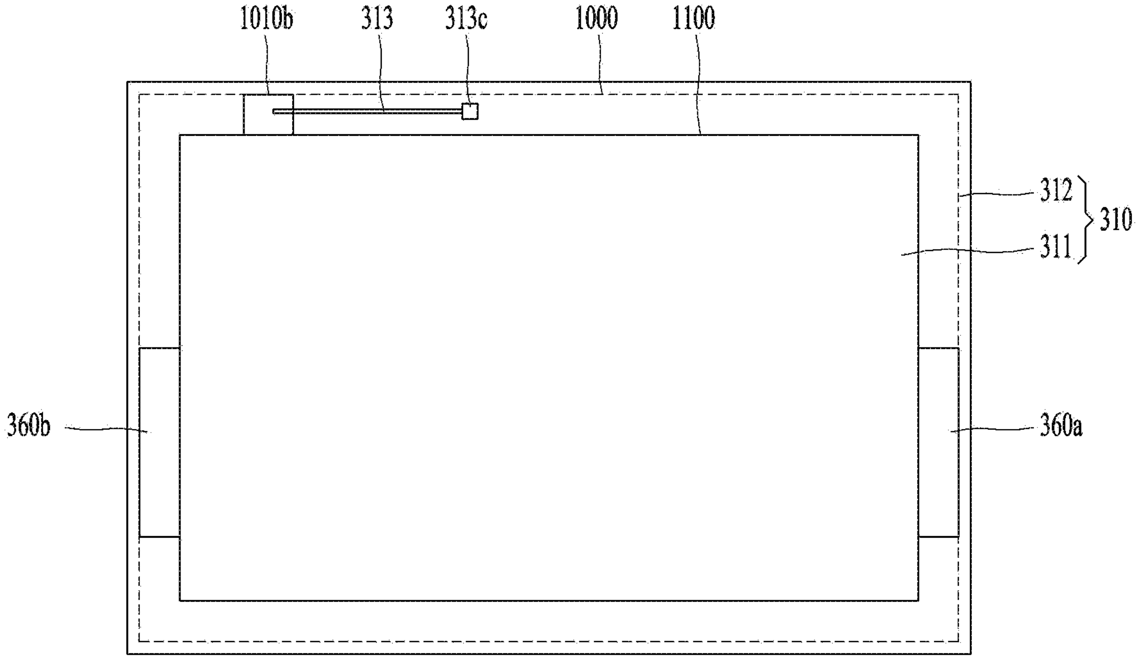

The following describes the antenna assembly associated with the broadband transparent antenna structure according to the present specification. In this regard, FIGS. 5A through 5C illustrate configurations where the antenna assembly according to the present specification is placed on vehicle glass. Referring to FIG. 5A, the antenna assembly 1000 may include a first dielectric substrate 1010*a* and a second dielectric substrate 1010*b*. The first dielectric substrate 1010*a* may be implemented as a transparent substrate and referred to as a transparent substrate 1010*a*. The second dielectric substrate 1010*b* may be implemented as an opaque substrate.

The glass panel 310 may be configured to include a transparent region 311 and an opaque region 312. The opaque region 312 of the glass panel 310 may be a frit layer formed with a frit layer region. The opaque region 312 may be formed to surround the transparent region 311. The opaque region 312 may be formed in the outer area of the transparent region 311. The opaque region 312 may form the boundary area of the glass panel 310.

The signal pattern formed on the dielectric substrate (1010) can be connected to the telematics control unit (TCU) 300 through a connector component 313 such as a coaxial cable. The telematics control unit (TCU) 300 may be placed inside the vehicle, but it is not limited to this. The telematics control unit (TCU) 300 may be placed on the vehicle's dashboard or in the ceiling area inside the vehicle, but it is not limited to this.

FIG. 5B shows a configuration where the antenna assembly 1000 is placed in a part of the glass panel 310. FIG. 5C shows a configuration where the antenna assembly 1000 is placed over the entire area of the glass panel 310.

Referring to FIGS. 5B and 5C, the glass panel 310 may include a transparent region 311 and an opaque region 312. The opaque region 312 may be a non-visible area with a transparency level below a certain threshold and may be referred to as a frit region, BP (Black Printing) region, or BM (Black Matrix) region. The opaque region 312 may be formed to surround the transparent region 311. The opaque region 312 may be formed in the outer area of the transparent region 311. The opaque region 312 may form the boundary area of the glass panel 310. The second dielectric substrate 1010*b*, corresponding to the feed substrate, or defogger pads (360*a*, 360*b*), may be placed in the opaque region 312. The second dielectric substrate 1010*b* placed in the opaque region 312 may be referred to as the opaque substrate. Even when the antenna assembly 1000 is placed over the entire area of the glass panel 310 as shown in FIG. 5C, defogger pads 360*a*, 360*b* may still be placed in the opaque region 312.

Referring to FIG. 5B, the antenna assembly 1000 may include a first transparent dielectric substrate 1010*a* and a second dielectric substrate 1010*b*. Referring to FIGS. 5B and 5C, the antenna assembly 1000 may include an antenna module 1100 formed with conductive patterns and a second dielectric substrate 1010*b*. The antenna module 1100 may be formed with a transparent electrode and implemented as a transparent antenna module. The antenna module 1100 may be implemented with one or more antenna elements. The antenna module 1100 may include MIMO antennas and/or other antenna elements for wireless communication. Other antenna elements may include at least one of GNSS/radio/broadcast/WiFi/satellite communication/UWB, or Remote Keyless Entry (RKE) antennas for vehicle applications.

Referring to FIGS. 5A through 5C, the antenna assembly 1000 can interface with the telematics control unit (TCU) 300 through the connector component 313. The connector component 313 may include a connector (313*c*) formed at the end of a cable and electrically connected to the TCU 300. The signal pattern formed on the second dielectric substrate 1010*b* of the antenna assembly 1000 can be connected to the TCU 300 through connector components such as a coaxial cable. The antenna module 1100 may be electrically connected to the TCU 300 through the connector component 313. Although the TCU 300 may be placed inside the vehicle, it is not limited to this. The TCU 300 may be placed on the vehicle's dashboard or in the ceiling area inside the vehicle, but it is not limited to this.

Meanwhile, when the transparent antenna assembly according to the present specification is attached to the inside or surface of the glass panel 310, the transparent electrode, including the antenna pattern and dummy pattern, can be placed in the transparent region 311. In contrast, the opaque substrate can be placed in the opaque region 312.

Figure 6A:
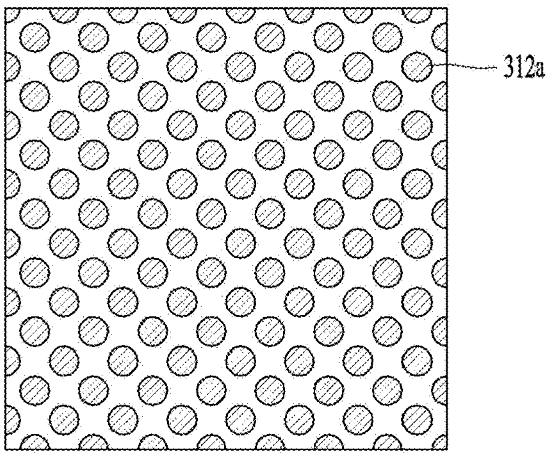
FIG. 6A shows various embodiments of frit patterns according to the present specification.
Figure 6A:
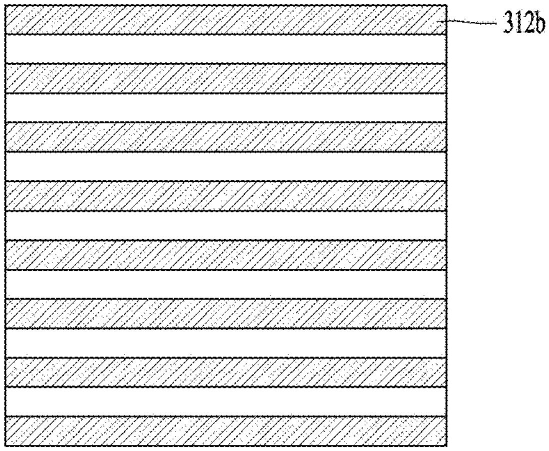
Figure 6A:
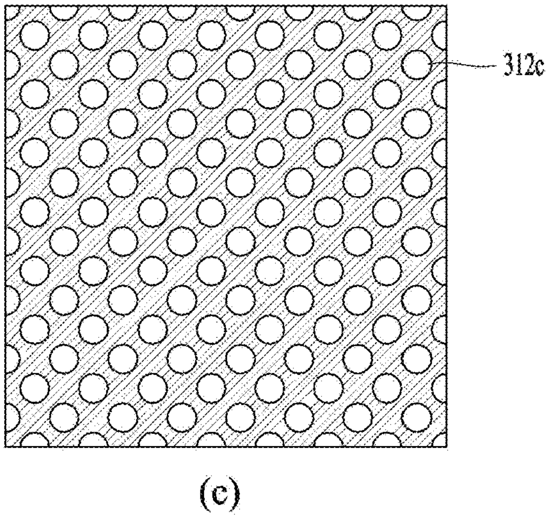
Figure 6B:
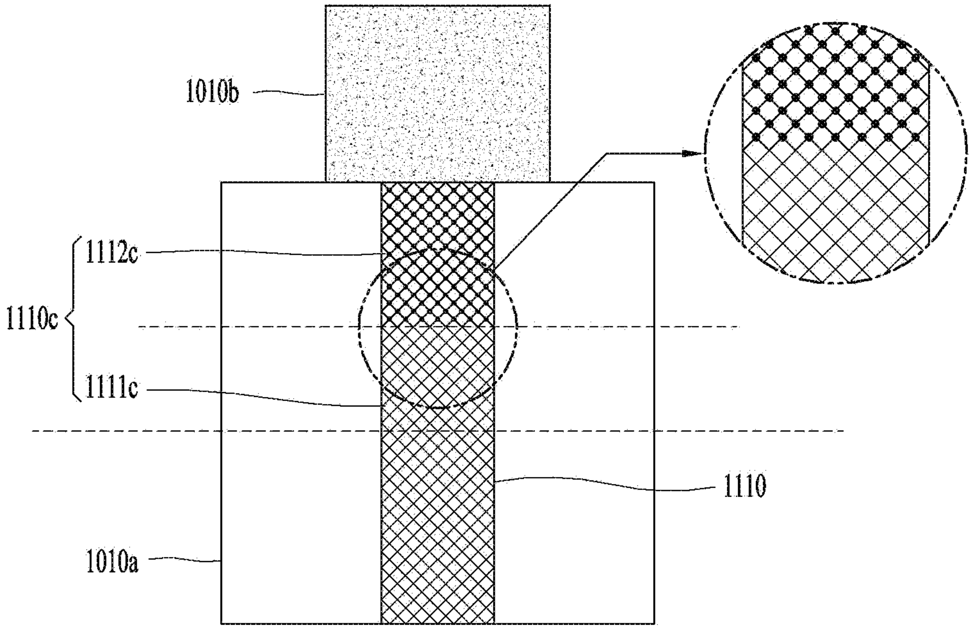
FIGS. 6B and 6C illustrate transparent antenna patterns and structures where transparent antenna patterns are disposed on vehicle glass according to various embodiments.
Figure 6B:
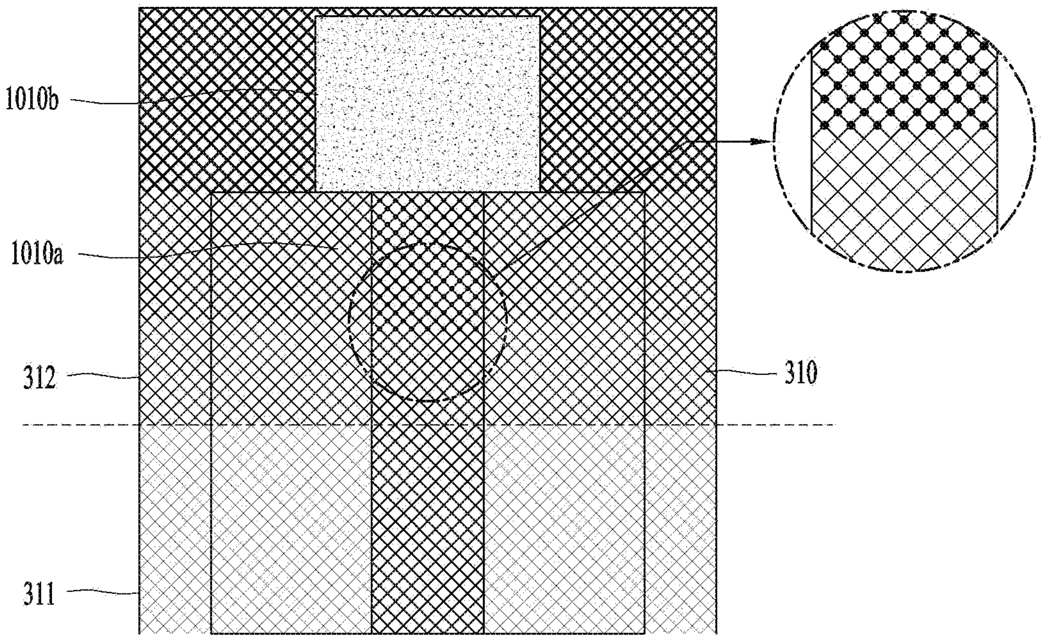
Figure 6C:
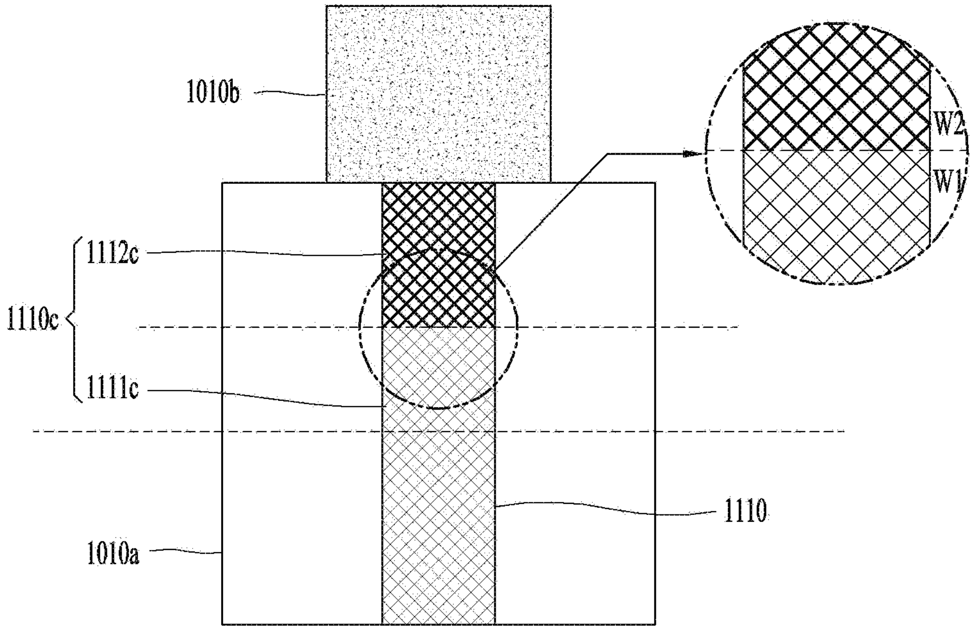
Figure 6C:
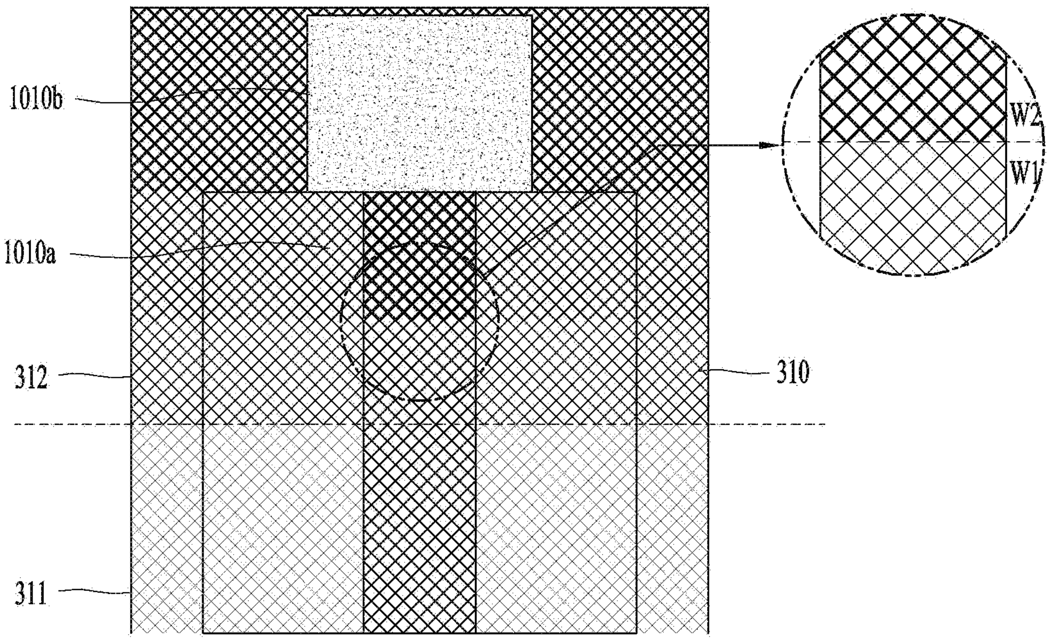

The antenna assembly formed on the vehicle glass according to the present specification may be placed in the transparent region and opaque region. In this regard, FIG. 6A shows various embodiments of frit patterns according to the present specification. FIGS. 6B and 6C illustrate transparent antenna patterns and the structure where transparent antenna patterns are placed on vehicle glass according to the embodiments.

Referring to (a) of FIG. 6A, the frit pattern 312*a* may be formed in a metal pattern with a circular (or polygonal, elliptical) shape with a predetermined diameter. The frit pattern 312*a* may be arranged in a two-dimensional structure along both axes. The frit pattern 312*a* may be formed in an offset structure where the center points of the patterns forming adjacent rows are spaced apart by a predetermined distance.

Referring to (b) of FIG. 6A, the frit pattern 312*b* may be formed as a rectangular pattern in one axial direction. The frit pattern 312*c* may be arranged in a one-dimensional structure in one axial direction or in a two-dimensional structure along both axes.

Referring to (c) of FIG. 6A, the frit pattern 312*c* may be formed as a slot pattern where metal patterns are removed in a circular (or polygonal, elliptical) shape with a predetermined diameter. The frit pattern 312*b* may be arranged in a two-dimensional structure along both axes. The frit pattern 312*c* may be formed in an offset structure where the center points of the patterns forming adjacent rows are spaced apart by a predetermined distance.

Referring to FIGS. 5A through 6C, the opaque substrate 1010*b* and the transparent substrate 1010*a* may be configured to be electrically connected in the opaque region 312. In this regard, a very small dummy pattern may be placed around the antenna pattern to improve invisibility and avoid visually distinguishing the antenna pattern without degrading antenna performance. Accordingly, the surrounding area of the transparent electrode in the antenna pattern can be designed to have a similar light transmittance as the antenna pattern.

The transparent antenna assembly, including the opaque substrate 1010*b* bonded to the transparent electrode, can be mounted on the glass panel 310. In this regard, to ensure invisibility, the opaque substrate 1010*b*, which is connected to the RF connector or coaxial cable, is placed in the opaque region 312 of the vehicle glass. Meanwhile, the transparent electrode is placed in the transparent region 311 of the vehicle glass to ensure invisibility of the antenna from the exterior of the vehicle glass.

Some parts of the transparent electrode may be attached to the opaque region 312 depending on the case. The frit pattern in the opaque region 312 can be formed with a gradient transitioning from the opaque region 312 to the transparent region 311. If the transmittance of the frit pattern and the transparent electrode is matched within a predetermined range, antenna invisibility can be improved while enhancing the transmission efficiency of the transmission line. Meanwhile, the sheet resistance can be reduced while ensuring invisibility with a metal mesh shape similar to the frit pattern. Furthermore, the risk of disconnection in the transparent electrode layer during production and assembly can be reduced by increasing the line width of the metal mesh lattice in the area connected to the opaque substrate 1010*b*.

Referring to (a) of FIG. 6A and FIG. 6B, the conductive pattern 1110 of the antenna module can be composed of metal mesh lattices with the same line width in the opaque region 312. The conductive pattern 1110 may include a connection pattern 1110*c* that connects the transparent substrate 1010*a* and the opaque substrate 1010*b*. The frit patterns with a specific shape may be arranged at regular intervals on both sides of the connection pattern 1110*c* in the opaque region 312. The connection pattern 1110*c* may include a first transmittance section 1111*c* formed with a first transmittance and a second transmittance section 1112*c* formed with a second transmittance.

The frit patterns 312*a* formed in the opaque region 312 may be arranged with metal lattices with a predetermined diameter in one axial and another axial direction. The metal lattices of the frit patterns 312*a* may be placed at the intersections of the metal mesh lattices in the second transmittance section 1112*c* of the connection pattern 1110*c*.

Referring to (b) of FIG. 6A and FIG. 6B, the frit patterns 312*b* formed in the opaque region 312 may be arranged with slot lattices with a predetermined diameter where metal regions are removed, in one axial and another axial direction. The slot lattices of the frit patterns 312*b* may be placed between the metal mesh lattices in the connection pattern 1110*c*. Accordingly, the metal regions of the frit patterns 312*b* without slot lattices may be placed at the intersections of the metal mesh lattices.

Referring to FIGS. 6A and 6C, the connection pattern 1110*c* may be composed of metal mesh lattices with a first line width W1 in the first transmittance section 1111*c* adjacent to the transparent region 311. The connection pattern 1110*c* may be formed with a second line width W2, which is thicker than the first line width W1, in the second transmittance section 1112*c* adjacent to the opaque substrate 1010*b*. In this regard, the first transparency of the first transmittance section 1111*c* may be set higher than the second transparency of the second transmittance section 1112*c*.

When the transparent antenna assembly is attached inside the vehicle glass as shown in FIGS. 5A through 5C, the transparent electrode section can be placed in the transparent region 311, and the opaque substrate 1010*b* can be placed in the opaque region 312. In some cases, the transparent electrode section may also be placed in the opaque region 312.

Part of the metal pattern of the low-transmittance electrode section and high-transmittance electrode section located in the opaque region 312 can be arranged in the gradient region of the opaque area 312. If the transmission lines of the antenna pattern and the low-transmittance electrode section are made of transparent electrodes, antenna gain loss may occur due to reduced transmission efficiency caused by increased sheet resistance. To address this issue, the transmittance of the frit pattern 312 and the transparent electrode can be matched within a certain range to minimize the gain reduction.

By increasing the line width of the transparent electrodes in areas with low transmittance or adding shapes identical to the frit pattern 312*a*, 312*b*, 312*c*, a lower sheet resistance can be achieved. This solution helps maintain transmission efficiency while also ensuring the invisibility of the antenna. The transmittance and patterns of the opaque region 312 are not limited to the structure shown in FIG. 6A and may vary depending on the glass or vehicle manufacturer. Accordingly, the shape and transparency (line width and spacing) of the transparent electrode on the transmission line may be modified in various ways.

Figure 7A:
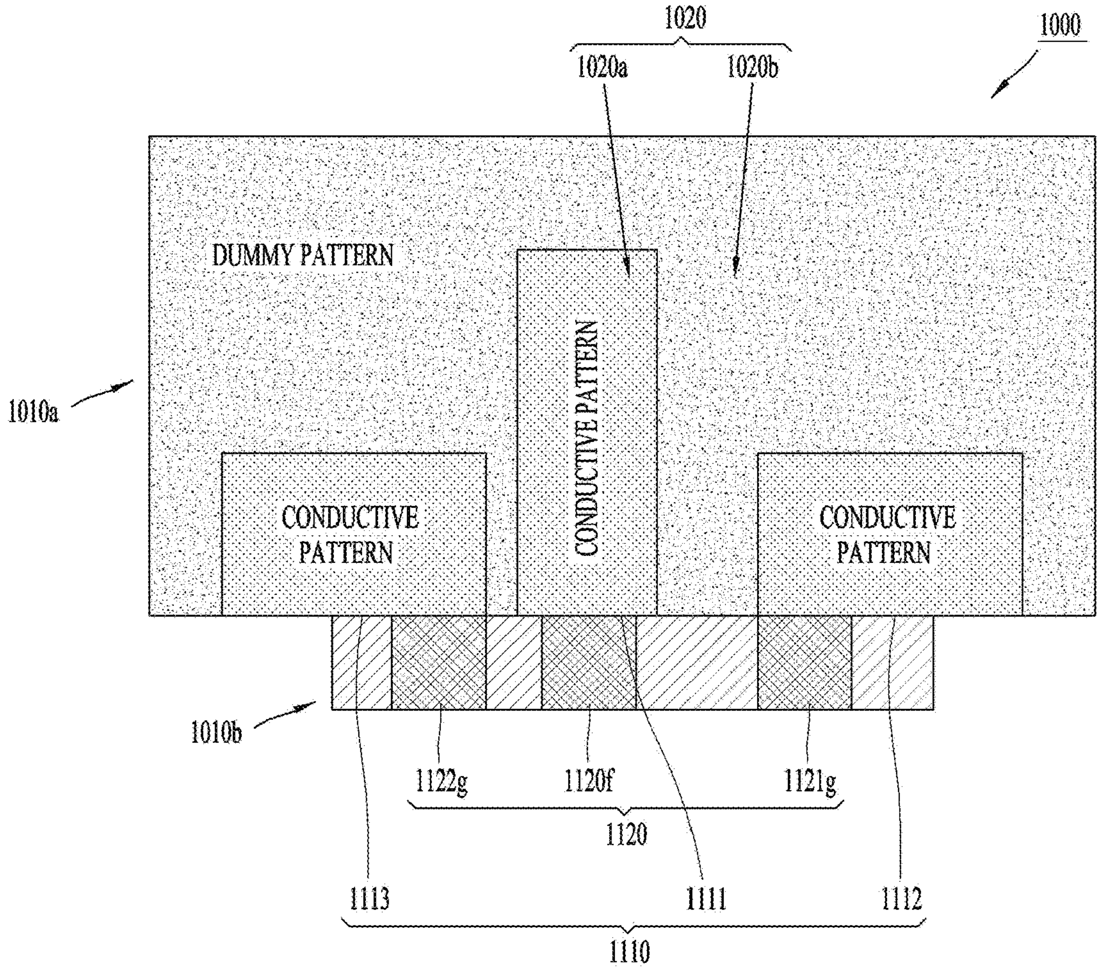
FIG. 7A presents front and cross-sectional views of a transparent antenna assembly according to the present specification.
Figure 7A:
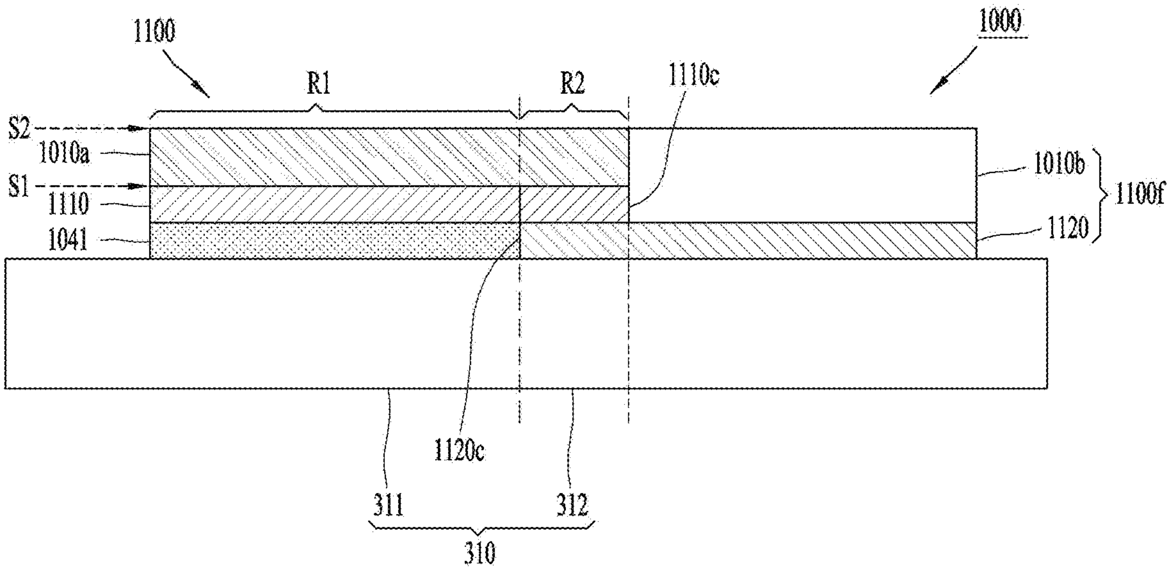
Figure 7B:
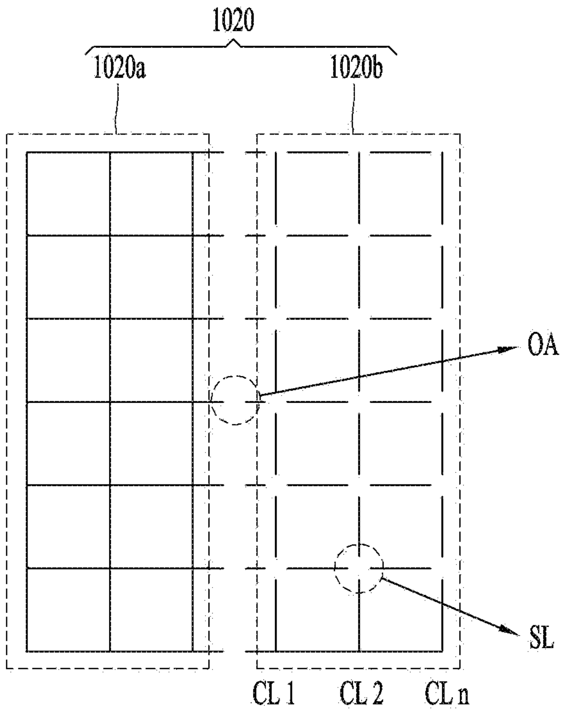
FIG. 7B illustrates lattice structures of metal mesh radiating areas and dummy metal mesh areas according to various embodiments.
Figure 7B:
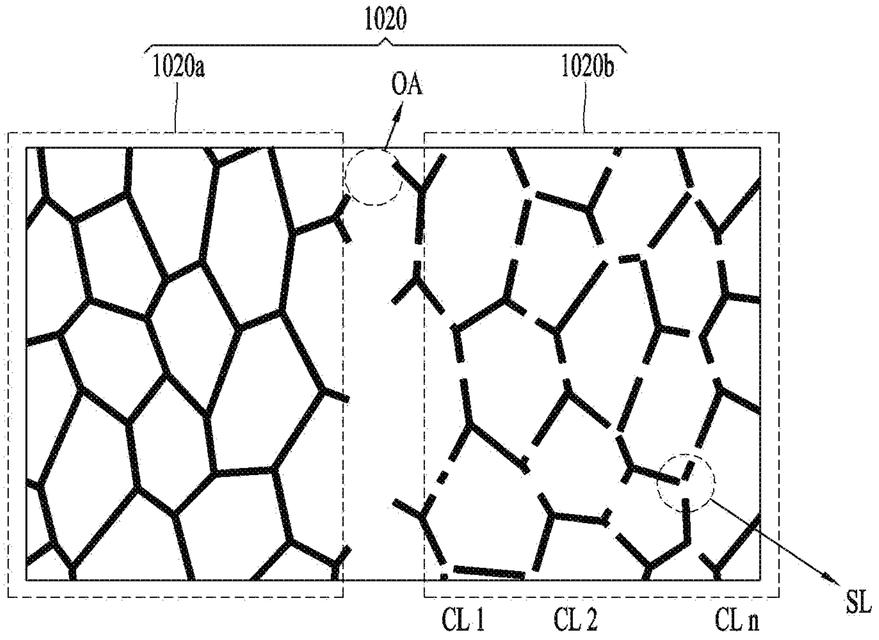

FIG. 7A shows a front and cross-sectional view of the transparent antenna assembly according to this specification. FIG. 7B illustrates the grid structure of the metal mesh radiator and dummy metal mesh areas according to various embodiments.

(a) of FIG. 7A shows a front view of the transparent antenna assembly 1000, and (b) of FIG. 7A shows a cross-sectional view, illustrating the layered structure of the transparent antenna assembly 1000. Referring to FIG. 7A, the antenna assembly 1000 may be configured to include the first transparent dielectric substrate 1010*a* and the second dielectric substrate 1010*b*. On one surface of the first transparent dielectric substrate 1010*a*, conductive patterns 1110 functioning as radiators may be arranged. On one surface of the second dielectric substrate 1010*b*, feed patterns 1120*f* and ground patterns 1121*g*, 1122*g* may be formed. The conductive patterns 1110 functioning as radiators may include one or more conductive patterns. The conductive patterns 1110 may include the first pattern 1111 connected to the feed pattern 1120*f* and the second pattern 1112 connected to the ground pattern 1121*g*. The conductive patterns 1110 may also include a third pattern 1113 connected to the ground pattern (1122*g*).

The conductive patterns 1110 forming the antenna module may be implemented as a transparent antenna. Referring to FIG. 7B, the conductive patterns 1110 may be formed with metal mesh patterns 1020*a* of specific line widths, creating a metal mesh radiator region. Dummy metal mesh patterns 1020*b* may be formed in the inner or outer areas between the first, second, and third patterns 1111, 1112, 1113 to maintain a certain level of transparency. The metal mesh patterns 1020*a* and dummy metal mesh patterns 1020*b* can form a metal mesh layer 1020.

(a) of FIG. 7B illustrates the structure of typical metal mesh patterns 1020*a* and dummy metal mesh patterns 1020*b*. (b) of FIG. 7B shows the structure of atypical metal mesh patterns 1020*a* and dummy metal mesh patterns 1020*b*. As shown in (a) of FIG. 7B, the metal mesh layer 1020 can be formed with a transparent antenna structure composed of multiple metal mesh grids. The metal mesh layer 1020 can be formed in regular shapes such as rectangles, diamonds, or polygons. Multiple metal mesh grids may be configured as conductive patterns that function as feed lines or radiators. The metal mesh layer 1020 forms the transparent antenna area. For example, the metal mesh layer 1020 may have a thickness of approximately 2 mm, but it is not limited to this.

The metal mesh layer 1020 may be configured to include metal mesh patterns 1020*a* and dummy metal mesh patterns 1020*b*. The metal mesh patterns 1020*a* and dummy metal mesh patterns 1020*b* may be designed with opening areas OA where the ends are disconnected to prevent electrical connection. Dummy metal mesh patterns 1020*b* may include slits SL to ensure that the ends of the mesh grids CL1, CL2, . . . , CLn are not connected.

Referring to (b) of FIG. 7B, the metal mesh layer 1020 may be formed with multiple atypical metal mesh grids. The metal mesh layer 1020 may be configured to include metal mesh patterns 1020*a* and dummy metal mesh patterns 1020*b*. The metal mesh patterns 1020*a* and dummy metal mesh patterns 1020*b* may be designed with opening areas OA where the ends are disconnected to prevent electrical connection. Dummy metal mesh patterns 1020*b* may include slits SL to ensure that the ends of the mesh grids CL1, CL2, . . . , CLn are not connected.

Figure 8A:
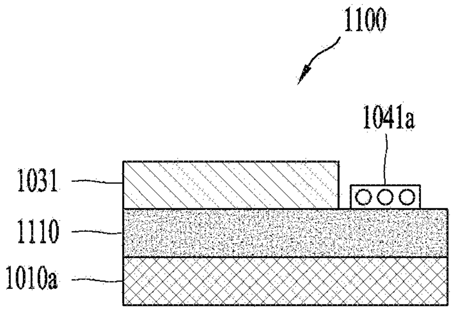
FIG. 8A depicts the layered structure of an antenna module and a feed module.
Figure 8A:
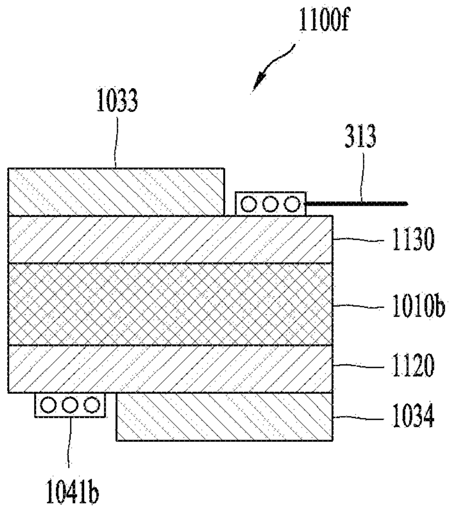
Figure 8B:
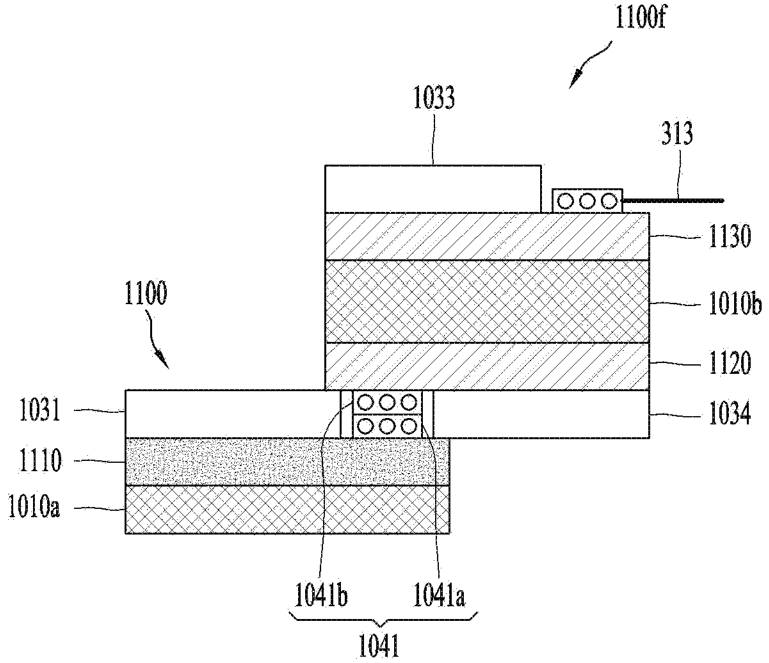
FIG. 8B shows an opaque substrate including a layered structure where the antenna module and feed structure are combined and the coupling region.
Figure 8B:
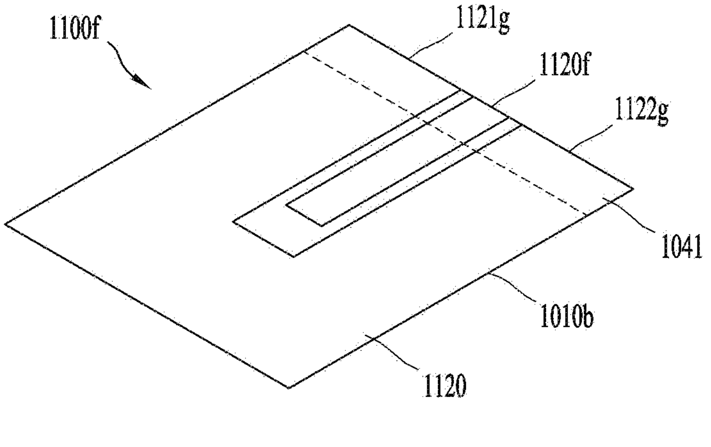

Meanwhile, the transparent substrate with the transparent antenna formed according to this specification may be placed on the glass of the vehicle. In this regard, FIG. 8*a* shows the layered structure of the antenna module and the feed module. FIG. 8B shows the layered structure of the antenna module and feed structure, including the bonding parts, with the opaque substrate.

Referring to (a) of FIG. 8A, the antenna module 1100 may be configured to include the first transparent dielectric substrate 1010*a*, formed in the first layer, and the first conductive pattern 1110, placed in the second layer. The first conductive pattern 1110 may be implemented as a metal mesh layer 1020 that includes metal mesh patterns 1020*a* and dummy metal mesh patterns 1020*b*, as shown in FIG. 7B. The antenna module 1100 may further include a protective layer 1031 and an adhesive layer 1041*a* placed in the second layer.

Referring to (b) of FIG. 8A, the feed structure 1100*f* may include the second dielectric substrate 1010*b*, the second conductive pattern 1120, and the third conductive pattern 1130. The feed structure 1100*f* may further include the first and second protective layers 1033, 1034, stacked on the second and third conductive patterns 1120, 1130, respectively. The feed structure 1100*f* may also include an adhesive layer 1041*b* formed in part of the second conductive pattern 1120.

The second conductive pattern 1120 may be placed on one surface of the second dielectric substrate 1010*b*, and the third conductive pattern 1130 may be placed on the other surface. A first protective layer 1033 may be formed on the upper side of the third conductive pattern 1130. A second protective layer 1034 may be formed on the lower side of the second conductive pattern 1120. The first and second protective layers 1033, 1034 may be configured with low permittivity values below a certain threshold, allowing for low-loss feeding in the transparent antenna area.

Referring to (a) of FIG. 8B, the antenna module 1100 may be combined with the feed structure 1100*f*, implemented as an opaque substrate in the second dielectric substrate 1010*b*. The first conductive pattern 1110, implemented as a transparent electrode layer in a metal mesh layer, may be formed on top of the first transparent dielectric substrate 1010*a*. A protective layer 1031 may be formed on top of the first conductive pattern 1110. An adhesive layer 1041*a* may be formed on top of the protective layer 1031 and the first conductive pattern 1110. An adhesive layer 1041*a* may be formed adjacent to the protective layer 1031.

The first adhesive layer 1041*a*, formed on top of the first conductive pattern 1110, may be bonded to the second adhesive layer 1041*b*, formed below the second conductive pattern 1120. The first transparent dielectric substrate 1010*a* and the second dielectric substrate 1010*b* may be adhered together by bonding the first and second adhesive layers 1041*a*, 1041*b*. Consequently, the metal mesh grid formed on the first transparent dielectric substrate 1010*a* may be electrically connected to the feed pattern formed on the second dielectric substrate 1010*b*.

The second dielectric substrate 1010*b* may form the feed structure 1100*f*, where the second conductive pattern 1120 and the third conductive pattern 1130 are placed on both sides. The feed structure 1100*f* may be implemented as an FPCB (Flexible Printed Circuit Board), but it is not limited to this. The first protective layer 1033 may be placed on the top of the third conductive pattern 1130, and the second protective layer 1034 may be placed on the bottom of the second conductive pattern 1120. The adhesive layer 1041*b* below the third conductive pattern 1130 may be bonded to the adhesive layer 1041*a* of the antenna module 1100. Thus, the feed structure 1100*f* may be combined with the antenna module 1100, and the first and second conductive patterns 1110, 1120 may be electrically connected.

The thickness of the antenna module 1100, implemented with the first transparent dielectric substrate 1010*a*, may be formed to a first thickness. The thickness of the feed structure 1100*f*, implemented with the second dielectric substrate 1010*b*, may be formed to a second thickness. For example, the thickness of the dielectric substrate 1010*a*, the first conductive pattern 1110, and the protective layer 1031 of the antenna module 1100 may be 75 μm, 9 μm, and 25 μm, respectively. The first thickness of the antenna module 1100 may be 109 m. The thickness of the dielectric substrate 1010*b*, the second conductive pattern 1120, and the third conductive pattern 1130 of the feed structure 1100*f* may be 50 μm, 18 μm, and 18 μm, respectively, with the first and second protective layers 1033, 1034 having a thickness of 28 km. Accordingly, the second thickness of the feed structure 1100*f* may be 142 m. Since the adhesive layers 1041*a*, 1041*b* are formed above the first conductive pattern 1110 and below the second conductive pattern 1120, the total thickness of the antenna assembly may be smaller than the sum of the first and second thicknesses. For example, the thickness of the antenna assembly 1000, including the antenna module 1100 and the feed structure 1100*f*, may be formed to 198 km.

Referring to (b) of FIG. 8B, the conductive pattern 1120 may be formed on one surface of the second dielectric substrate 1010*b*, forming the feed structure 1100*f*. The conductive pattern 1120 may be implemented as a CPW structure feed with the ground patterns 1121*g*, 1122*g* formed on both sides of the feed pattern 1120*f*. The feed structure 1100*f* may be combined with the antenna module 1100 through the adhesive layer 1041 formed in the region, as shown in (a) of FIG. 8B.

The antenna module and feed structure forming the antenna assembly according to this specification may be placed on the vehicle glass and combined through a specific bonding structure. In this regard, FIG. 9A shows the bonding structure of the transparent antenna placed in the transparent and frit regions of the vehicle glass.

Figure 9A:
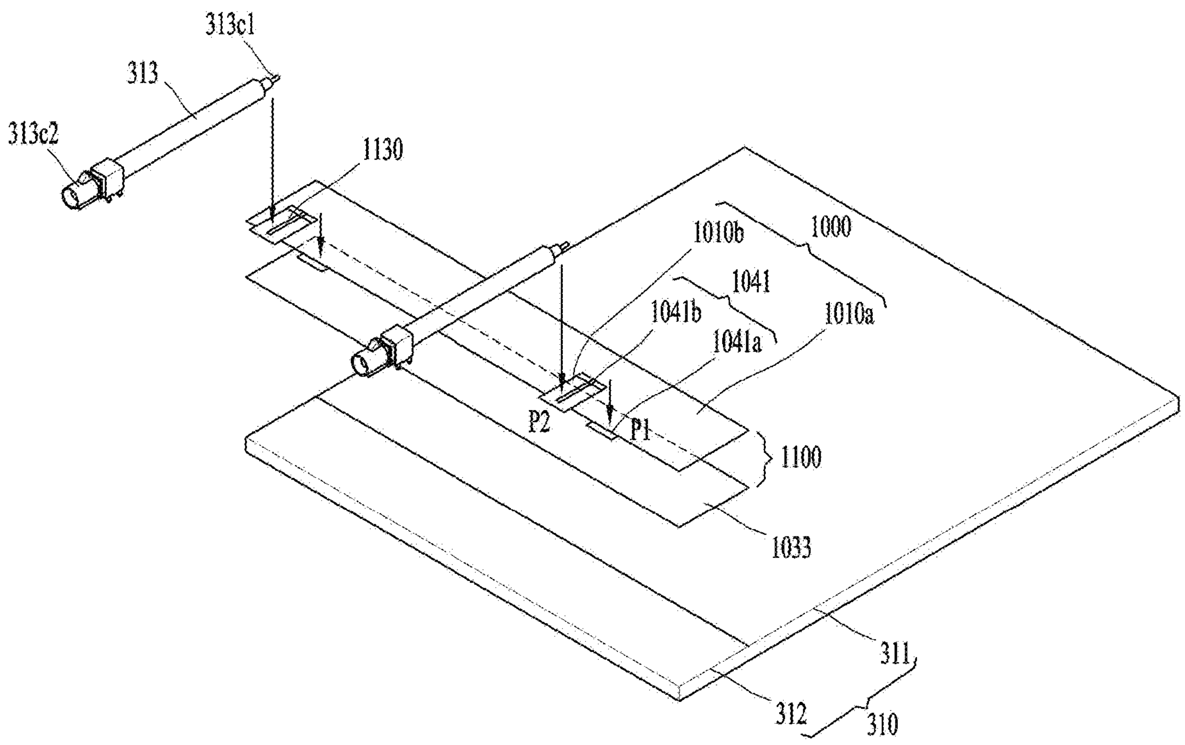
FIG. 9A illustrates the coupling structure of a transparent antenna disposed in the transparent and frit regions of vehicle glass.

Referring to FIG. 9A, the first transparent dielectric substrate 1010*a* may be bonded to the glass panel 310 through the adhesive layer 1041. The conductive pattern on the first transparent dielectric substrate 1010a may be bonded to the conductive pattern 1130 of the second dielectric substrate 1010b through ACF bonding. ACF bonding involves bonding the contact surface with a tape containing metal balls at high temperatures and pressure (e.g., 120 to 150° C., 2 to 5 Mpa) for a few seconds, establishing electrical contact between the electrodes using metal balls. ACF bonding electrically connects the conductive patterns and, at the same time, provides adhesion through heat curing of the adhesive layer 1041.

The first transparent dielectric substrate 1010a and the second dielectric substrate 1010b, implemented as an FPCB, may be bonded using local soldering techniques. The connection pattern of the FPCB and the transparent antenna electrode may be connected through local soldering using coils in a magnetic induction method. During local soldering, the temperature of the soldered area may be raised without deforming the FPCB, maintaining a flat surface. This allows for highly reliable electrical connections between the conductive patterns of the first transparent dielectric substrate 1010a and the second dielectric substrate 1010b through local soldering.

The metal mesh layer 1020, protective layer 1033, and adhesive layer 1041 of the first transparent dielectric substrate 1010a, as shown in FIG. 7A, can form a transparent electrode. The second dielectric substrate 1010b, implemented as an opaque substrate, may be an FPCB, but it is not limited to this. The second dielectric substrate 1010b, implemented as an FPCB with a feed pattern, may be configured to connect to the connector component 313 and the transparent electrode.

The second dielectric substrate 1010b, implemented as an opaque substrate, may be attached to part of the first transparent dielectric substrate 1010a. The first transparent dielectric substrate 1010a may be formed in the transparent region 311 of the glass panel 310. The second dielectric substrate 1010b may be formed in the opaque region 312 of the glass panel 310. Part of the first transparent dielectric substrate 1010a may extend into the opaque region 312, where it is bonded to the feed pattern formed on the second dielectric substrate 1010b and electrically connected to the metal mesh layer of the transparent antenna.

The first transparent dielectric substrate 1010a and the second dielectric substrate 1010b may be bonded together through the adhesion of the adhesive layers 1041a, 1041b. The position where the second dielectric substrate 1010b is bonded to the adhesive layer 1041 may be set as the first position P1. The location where the connector component 313 is soldered to the opaque substrate 1010b may be set as the second position P2.

Figure 9B:
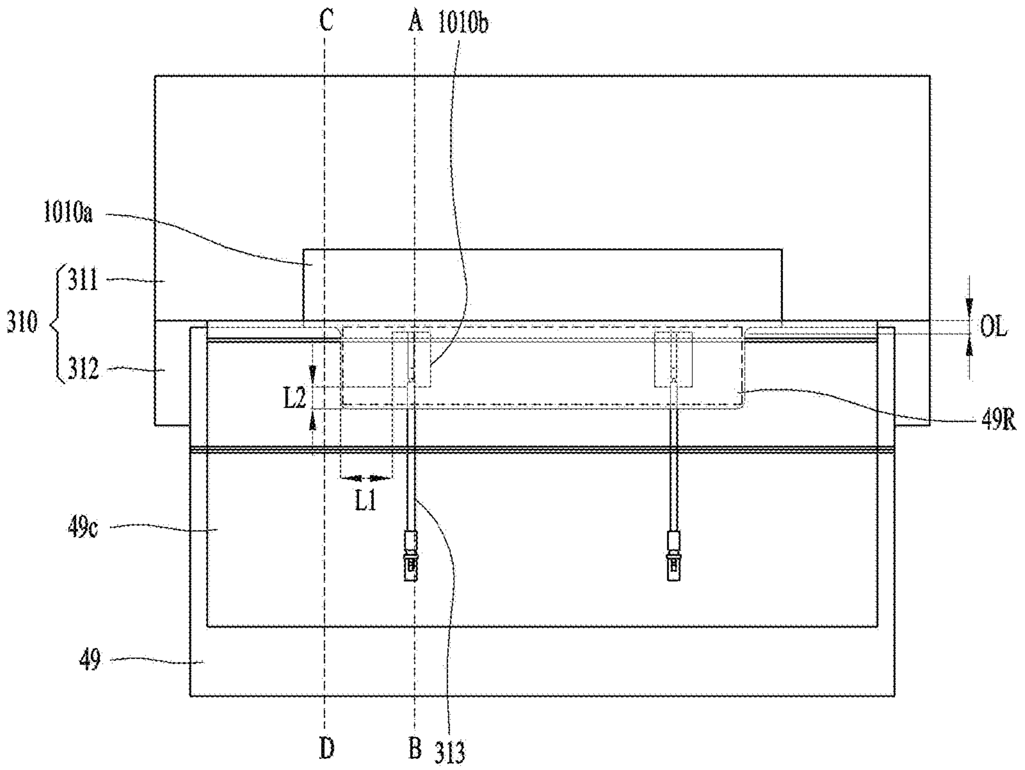
FIG. 9B is an enlarged front view of the area where the glass with the transparent antenna formed as in FIG. 9A is coupled with the vehicle body structure.
Figure 9C:
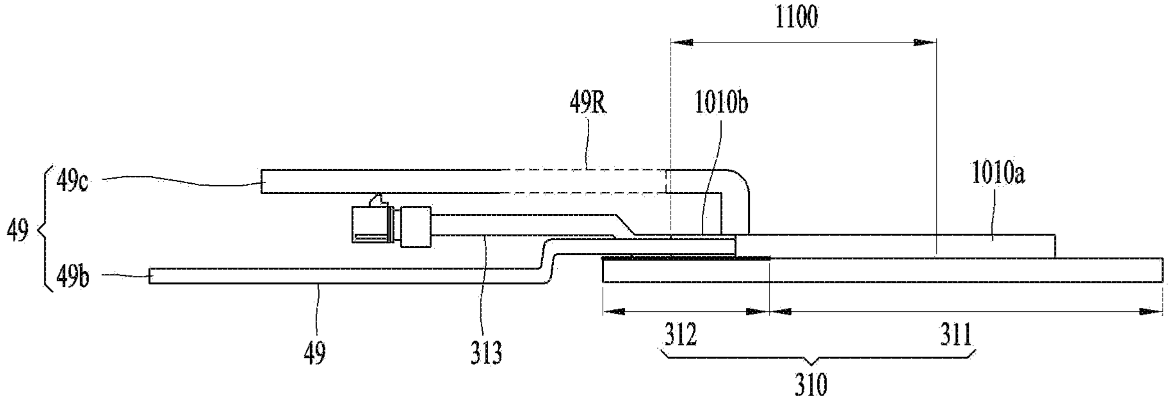
FIG. 9C shows cross-sectional views of the coupling structure between the vehicle glass and body structure of FIG. 9B viewed from different positions.
Figure 9C:
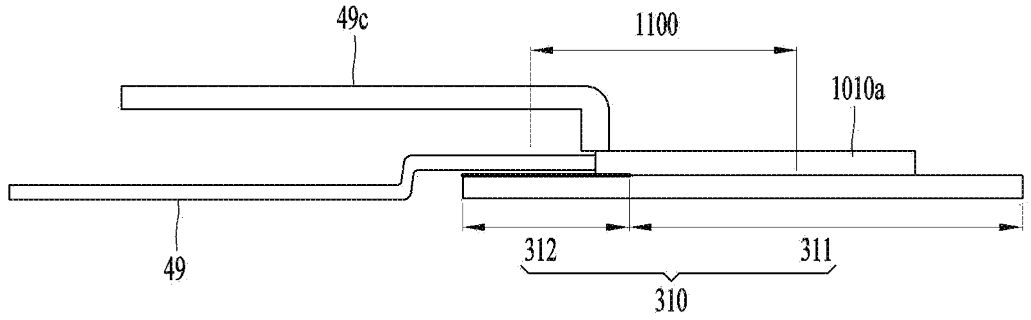

Meanwhile, the vehicle glass with the antenna assembly formed according to this specification can be combined with the vehicle body structure. In this regard, FIG. 9B is an enlarged front view of the area where the glass with the transparent antenna formed in FIG. 9A is combined with the vehicle body structure. FIG. 9C shows cross-sectional views of the bonding structure between the vehicle glass and the body structure of FIG. 9B viewed from different positions.

Referring to FIG. 9B, the first transparent dielectric substrate 1010a, with the transparent antenna formed in the transparent region 311 of the glass panel 310, may be placed in the transparent region 311. The second dielectric substrate 1010b may be placed in the opaque region 312 of the glass panel 310. The transmittance of the opaque region 312 may be lower than that of the transparent region 311, and the opaque region 312 may be referred to as a BM (Black Matrix) region. Part of the first transparent dielectric substrate 1010a, where the transparent antenna is formed, may extend into the BM region of the opaque region 312. The first transparent dielectric substrate 1010a and the opaque region 312 may be formed to overlap by an overlap length OL in one axial direction.

(a) of FIG. 9C shows a cross-sectional view of the antenna assembly cut along line AB in FIG. 9B. (b) of FIG. 9C shows a cross-sectional view of the antenna assembly cut along line CD in FIG. 9B.

Referring to FIG. 9B and (a) of FIG. 9C, the first transparent dielectric substrate 1010a with the transparent antenna formed in the transparent region 311 of the glass panel 310 may be placed in the transparent region 311. The second dielectric substrate 1010b may be placed in the opaque region 312 of the glass panel 310. Part of the first transparent dielectric substrate 1010a may extend into the opaque region 312, where it is bonded and connected to the feed pattern formed on the second dielectric substrate 1010b and the metal mesh layer of the transparent antenna.

An interior cover 49c may be configured to house the connector component 313 connected to the second dielectric substrate 1010b. The connector component 313 may be placed in the space between the metal body 49b and the interior cover 49c, and the connector component 313 may be combined with the in-vehicle cable. The interior cover 49c may be placed in the upper area of the metal body 49b. The interior cover 49c may be formed with a bent section at one end to combine with the metal body 49b.

The interior cover 49c may be formed of metal or dielectric material. When the interior cover 49c is formed of metal, the interior cover 49c and the metal body 49b may form a metal frame 49. In this regard, the vehicle may include a metal frame 49. The opaque region 312 of the glass panel 310 may be supported by part of the metal frame 49. For this purpose, part of the body 49b of the metal frame 49 may be bent to combine with the opaque region 312 of the glass panel 310.

When the interior cover 49c is made of metal, a metal region may be partially removed from the upper area of the second dielectric substrate 1010b inside the interior cover 49c. A recess portion 49R, where the metal region is removed, may be formed in the interior cover 49c. Accordingly, the metal frame 49 may include the recess portion 49R. The second dielectric substrate 1010b may be placed inside the recess portion 49R of the metal frame 49.

The recess portion 49R may also be referred to as the metal cut region. One side of the recess portion 49R may be spaced by a first length L1 from one side of the opaque substrate 1010b, exceeding a critical value. The lower boundary side of the recess portion 49R may be spaced by a second length L2 from the lower boundary side of the opaque substrate 1010b, exceeding a critical value. By removing part of the metal from the interior cover 49c, signal loss and antenna performance changes caused by the surrounding metal structure can be prevented.

Referring to FIG. 9B and (b) of FIG. 9C, no recess portion is formed in the area of the interior cover 49c where no connector components or opaque substrates are placed. In this regard, the interior cover 49c may protect the internal components of the antenna module 1100 while allowing heat generated inside to be discharged to the outside through the recess portion 49R of FIG. 9B and (a) of FIG. 9C. Furthermore, the recess portion 49R of the interior cover 49c allows for quick identification of whether a repair or replacement of the connection part is needed. Meanwhile, the absence of the recess portion in areas without connector components and second dielectric substrates prevents damage to the internal components of the antenna module 1100.

Meanwhile, the antenna assembly 1000 according to this specification may be formed in various shapes on the glass panel 310, and the glass panel 310 may be attached to the vehicle frame. In this regard, FIG. 10 shows the laminated structure of the antenna assembly and the attachment area between the vehicle glass and the vehicle frame according to various embodiments.

Figure 10:
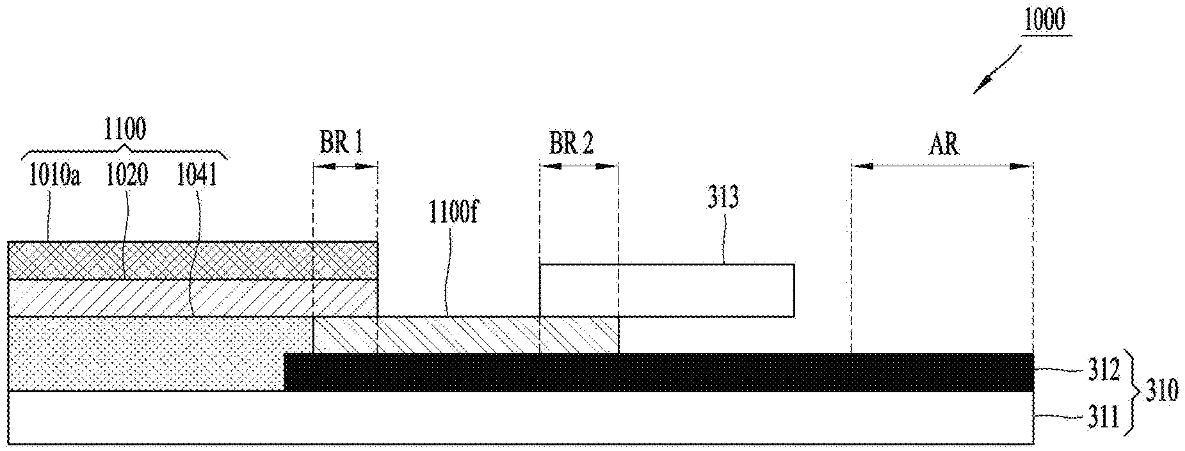
FIG. 10 illustrates the laminated structure of an antenna assembly according to various embodiments and the attachment area between vehicle glass and the vehicle frame.
Figure 10:
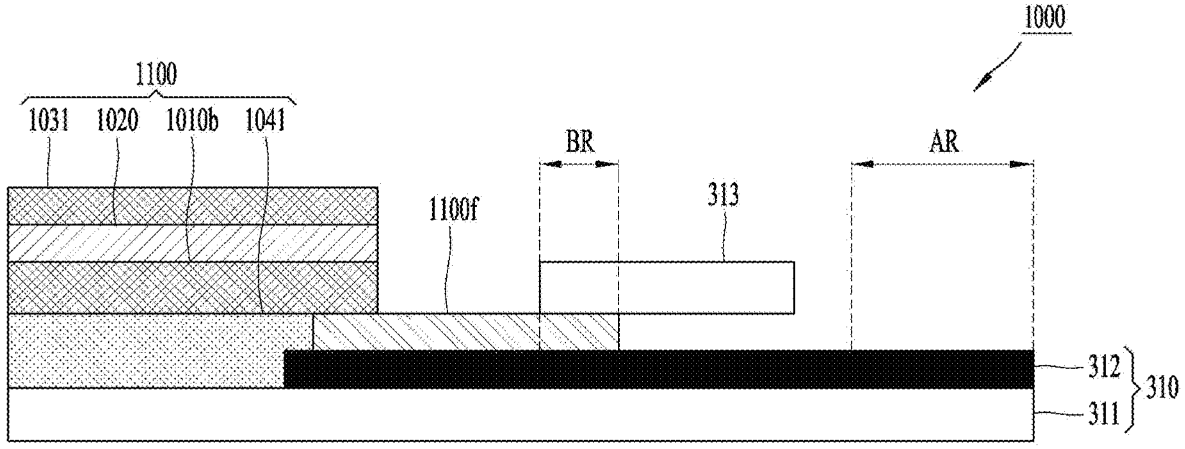

Referring to (a) of FIG. 10, the glass panel 310 may include a transparent region 311 and an opaque region 312. The antenna assembly 1000 may be configured to include the antenna module 1100 and the feed structure 1100*f*. The antenna module 1100 may include the first transparent dielectric substrate 1010*a*, a transparent electrode layer 1020, and an adhesive layer 1041. The transparent electrode layer 1020, implemented as a transparent substrate, may be electrically connected to the feed structure 1100*f*, implemented as an opaque substrate. The feed structure 1100*f* and the transparent electrode layer 1020 may be directly connected through the first bonding area BR1. The feed structure 1100*f* and the connector component 313 may be directly connected through the second bonding area BR2. Heat may be applied for bonding in the first and second bonding areas BR1, BR2. Accordingly, the bonding areas BR1, BR2 may be referred to as heating sections. An attachment area AR, corresponding to the sealant region for attaching the glass panel 310 to the vehicle frame, may be formed in the side end area of the opaque region 312 of the glass panel 310.

Referring to (b) of FIG. 10, the glass panel 310 may include the transparent region 311 and the opaque region 312. The antenna assembly 1000 may be configured to include the antenna module 1100 and the feed structure 1100*f*. The antenna module 1100 may include the protective layer 1031, the transparent electrode layer 1020, the first transparent dielectric substrate 1010*a*, and the adhesive layer 1041. Part of the feed structure 1100*f*, implemented as an opaque substrate, and part of the antenna module 1100, implemented as a transparent substrate, may overlap. The transparent electrode layer 1020 of the antenna module 1100 and the feed structure 1100*f* may be coupled for feeding. The feed structure 1100*f* and the connector component 313 may be directly connected through the bonding area BR. Heat may be applied for bonding in the bonding area BR1. Accordingly, the bonding area BR may be referred to as the heating section. An attachment area AR, corresponding to the sealant region for attaching the glass panel 310 to the vehicle frame, may be formed in the side end area of the opaque region 312 of the glass panel 310.

Referring to (a) and (b) of FIG. 10, a (hard) coating layer may be included on the transparent substrate 1010*a* to protect the transparent electrode layer 1020 from the external environment. Meanwhile, the adhesive layer 1041 may include UV-blocking components to prevent yellowing from sunlight.

Meanwhile, the broadband transparent antenna structure placed on the vehicle glass according to this specification can be implemented as a single dielectric substrate on the same plane as the CPW feed section. The broadband transparent antenna structure can also be implemented with a ground formed on both sides of the radiator, forming a broadband structure. The broadband transparent antenna for vehicles may include an antenna module configured to perform 4G and 5G wireless communications. Furthermore, the broadband transparent antenna for vehicles may include a GNSS (Global Navigation Satellite System) antenna configured to provide location services.

Below is a description of the antenna assembly associated with the broadband transparent antenna structure according to this specification. In this regard, FIG. 11A shows multiple frequency bands related to the GNSS antenna for vehicles, and FIG. 11B shows the polarization characteristics related to the GNSS antenna for vehicles.

Figure 11A:
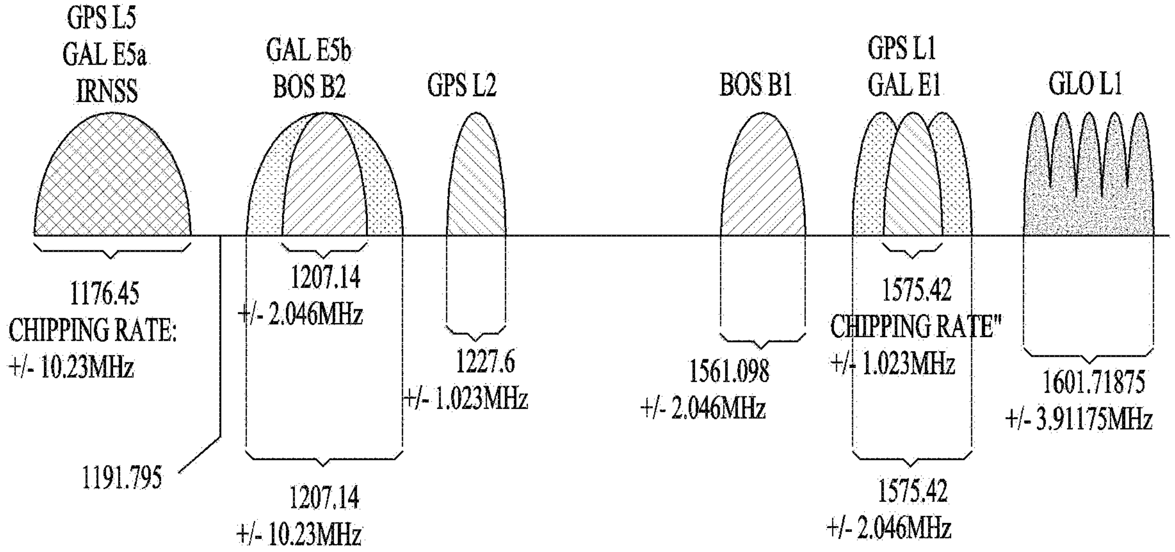
FIG. 11A shows multiple frequency bands related to a vehicle GNSS antenna.

Referring to FIG. 11A, the frequency bands in which the GNSS antenna for vehicles operates may include the first frequency band corresponding to the L1 band and the second frequency band corresponding to the L5 band. The first frequency band corresponding to the L1 band may be set to 1559.0 to 1605.9 MHz. The first frequency band may include the L1 band associated with GPS. The first frequency band may also include the L1 band associated with GLONASS. The second frequency band corresponding to the L5 band may be set to 1166.2 to 1186.7 MHz. The second frequency band may include the L5 band associated with GPS.

The antenna assembly implemented as a GNSS antenna for vehicles may be configured for dual-band resonance, operating in both the first and second frequency bands. The antenna assembly implemented as a GNSS antenna for vehicles may operate having circular polarization. The antenna assembly may be configured to operate with right-hand circular polarization (RHCP).

Figure 11B:
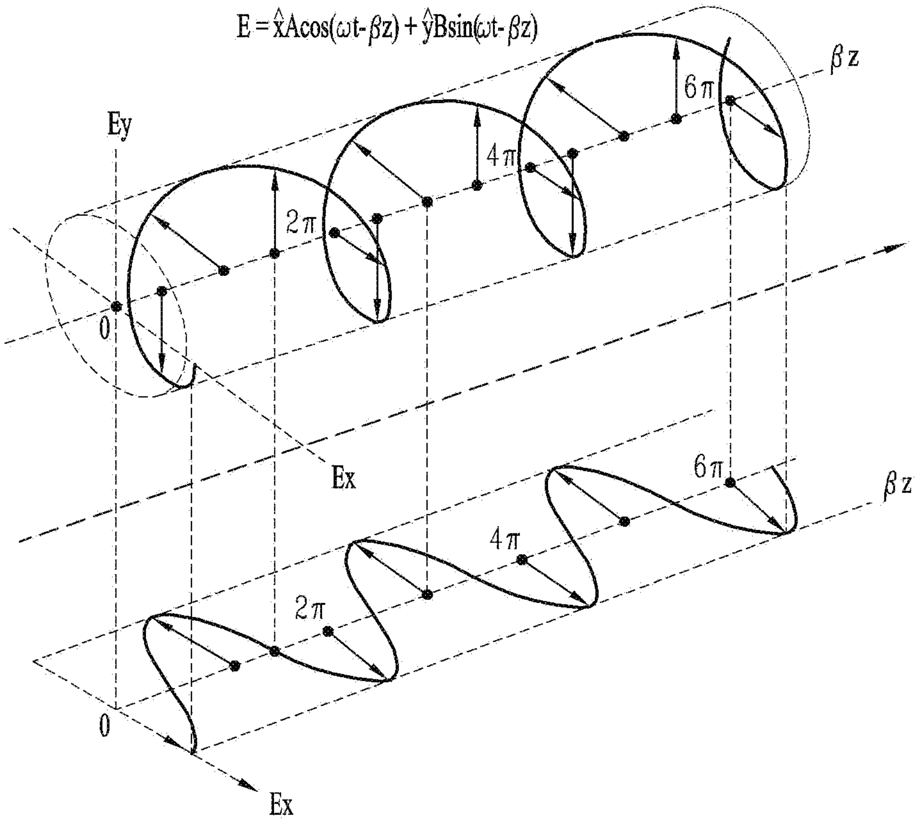
FIG. 11B depicts polarization characteristics related to a vehicle GNSS antenna.
Figure 11B:
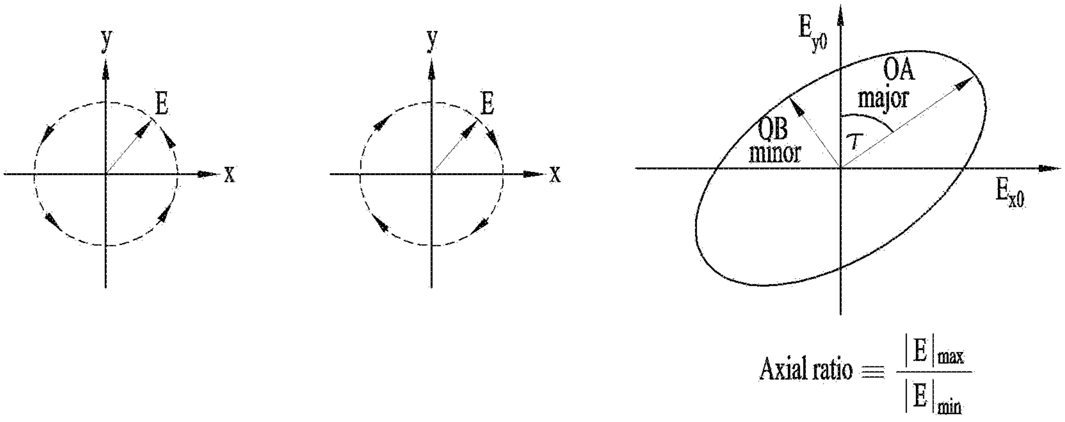

Referring to (a) of FIG. 11B, the signal formed in the GNSS antenna for vehicles may propagate in the z-axis direction. Referring to (a) to (c) of FIG. 11B, the signal formed in the GNSS antenna for vehicles may be configured to have circular polarization, where the electric field rotates along the x-axis and y-axis. Referring to (a) and (c) of FIG. 11B, the signal formed in the GNSS antenna for vehicles may propagate in the z-axis direction with right-hand circular polarization (RHCP) while maintaining circular polarization along the x-axis and y-axis. The signal formed in the GNSS antenna for vehicles may be expressed mathematically as Equation 1.

$$E = \vec{x}A\cos(\omega t - \beta z) + \vec{y}B\cos(\omega t - \beta z) \quad \text{[Equation 1]}$$

A signal with a superior circular polarization (RHCP) is A=B in the Equation 1 and can be formed with a phase difference of 90 degrees. A signal with a left-hand circular polarization (LHCP) is A=B in the Equation 1 and can be formed with a phase difference of −90 degrees. The ratio of the maximum value ($|E|_{max}$) and the minimum value ($|E|_{min}$) of $|E|$ in the Equation 1 can be defined as the axial ratio AR as shown in Equation 2.

$$\text{Axial ratio} = \frac{|E|_{min}}{|E|_{max}} \quad \text{[Equation 2]}$$

According to Equations 1 and 2, as well as (d) of FIG. 11B, when the values of A and B differ, the signal generated by the vehicle GNSS antenna can be configured to exhibit elliptical polarization. Circularly polarized signals must be maintained below a certain level, such as 3 dB or 6d B, towards the ceiling direction from the plane where the antenna is installed. The antenna gain should also be kept below a certain level, for instance, −3 dB, within a 45-degree range from the 0-degree ceiling direction.

Figure 12A:
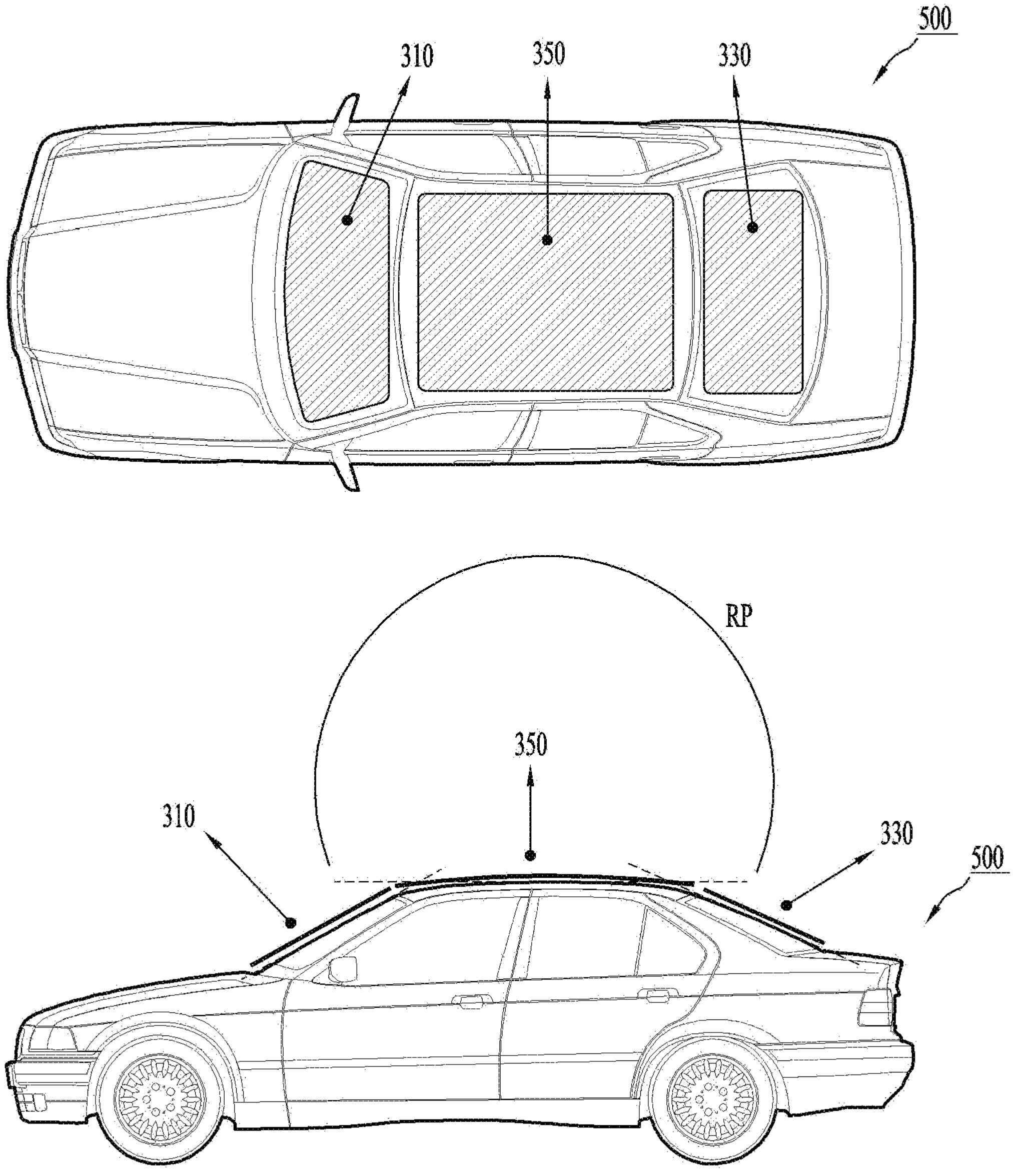
FIGS. 12A and 12B illustrate placement structures of vehicle GNSS antennas that can be formed at different locations on vehicle glass according to various embodiments.
Figure 12B:
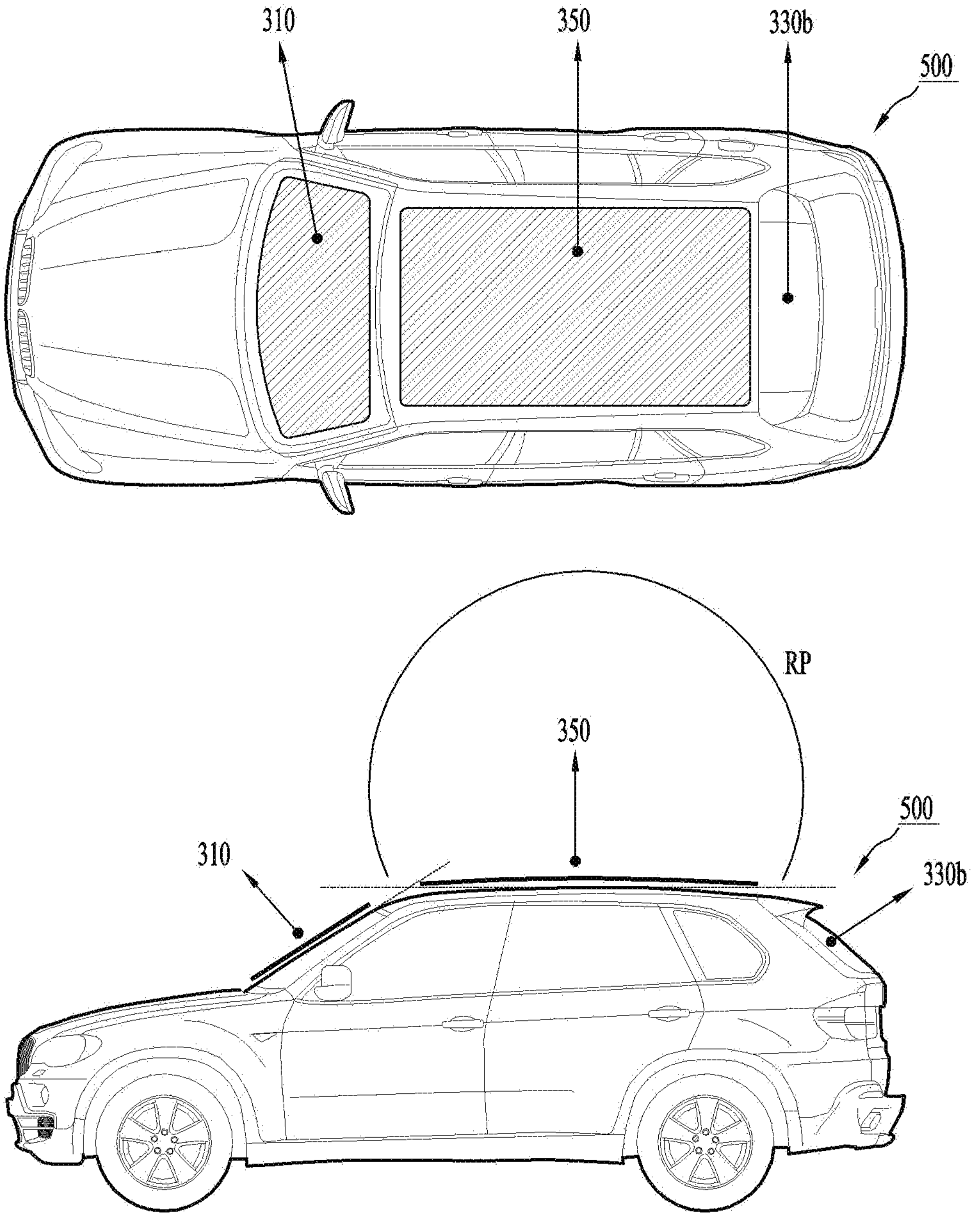

As mentioned earlier, a GNSS antenna generating circularly polarized signals can be placed in different positions on the vehicle glass. FIGS. 12A and 12B illustrate the arrangement of GNSS antennas in various positions on the vehicle glass based on the examples provided.

Referring to FIGS. 1 and 12A, a GNSS antenna can be placed on either the front glass 310, rear glass 330, or upper glass 350 of a sedan-type vehicle 500. The front glass 310 can be constructed with a two-layer laminated structure, about 5 to 5.5 mm thick, consisting of glass/anti-scattering film/glass layers. The rear glass 330 may also have a two-layer laminated structure, with a thickness ranging between 3.5 to 5.5 mm, or be made of single-layer tempered glass. The rear glass 330 may contain defroster wires and an AM/FM antenna, and the transparent GNSS antenna should be placed at a specified distance from these components.

The GNSS antenna should have a radiation pattern directed towards the ceiling. Therefore, it can be installed on the upper glass 350 of the vehicle 500. The upper glass 350 also has a two-layer laminated structure, 5 to 5.5 mm thick, formed from layers of glass and anti-scattering film.

In the case of an SUV-type vehicle 500, as shown in FIGS. 1 and 12B, the GNSS antenna can be placed on the front glass 310 or upper glass 350. The front glass 310 of the SUV can have a two-layer laminated structure similar to that of the sedan, with a thickness of 5 to 5.5 mm. Since the GNSS antenna needs to radiate towards the ceiling, it can be installed on the upper glass 350, which has the same laminated structure. The rear glass (330*b*) of the SUV may have a steeper angle compared to the rear glass 330 of the sedan in FIG. 12A, making it unsuitable for placing the GNSS antenna. The upper glass 350 in the SUV retains the same structure with layers of glass and film.

Referring to FIGS. 1, 12A, and 12B, a GNSS antenna placed on the front glass 310, rear glass 330, or upper glass 350 can be implemented as a transparent antenna. The sheet resistance of the transparent antenna can range between 0.5 and 1.0 Ω/sq, although this can vary depending on the transparency or type of metal mesh used. The vehicle GNSS antenna described in this specification is designed to minimize the impact of the vehicle glass on its performance. To achieve this, the design takes into account factors such as the type, size, thickness, and film attachment of the vehicle glass, which could affect the antenna's performance. The GNSS antenna is optimized accordingly to mitigate any negative impact caused by these variables.

Referring to FIGS. 12A and 12B, the radiation pattern of the vehicle GNSS antenna can be implemented in an upper hemisphere shape. In this context, the radiation pattern of the GNSS antenna is formed within the range of −45 degrees to +45 degrees, with respect to 0 degree, directed toward the ceiling of the vehicle. The radiation pattern RP is oriented toward the ceiling direction. The GNSS antenna can be installed on the front glass 310, rear glass 330, or upper glass 350 of the vehicle 500. The upper glass 350, located in the roof area, may also be referred to as the moonroof glass. The GNSS antenna, placed on any of these glass sections, can be designed using a monopole element or slot element to minimize the impact caused by the vehicle glass.

The physical properties and size of the vehicle glass may affect the performance of the antenna. The larger and thicker the glass, the greater the potential for performance degradation. Additionally, dielectric losses within the glass can lead to reduced antenna gain and altered radiation patterns. To minimize these effects, the vehicle GNSS antenna is designed to be compact and implemented as a single-layer structure. For optimal satellite communication radiation patterns, it is most advantageous to position the GNSS antenna on the upper glass 350, which is typically placed at a horizontal angle.

Figure 13A:
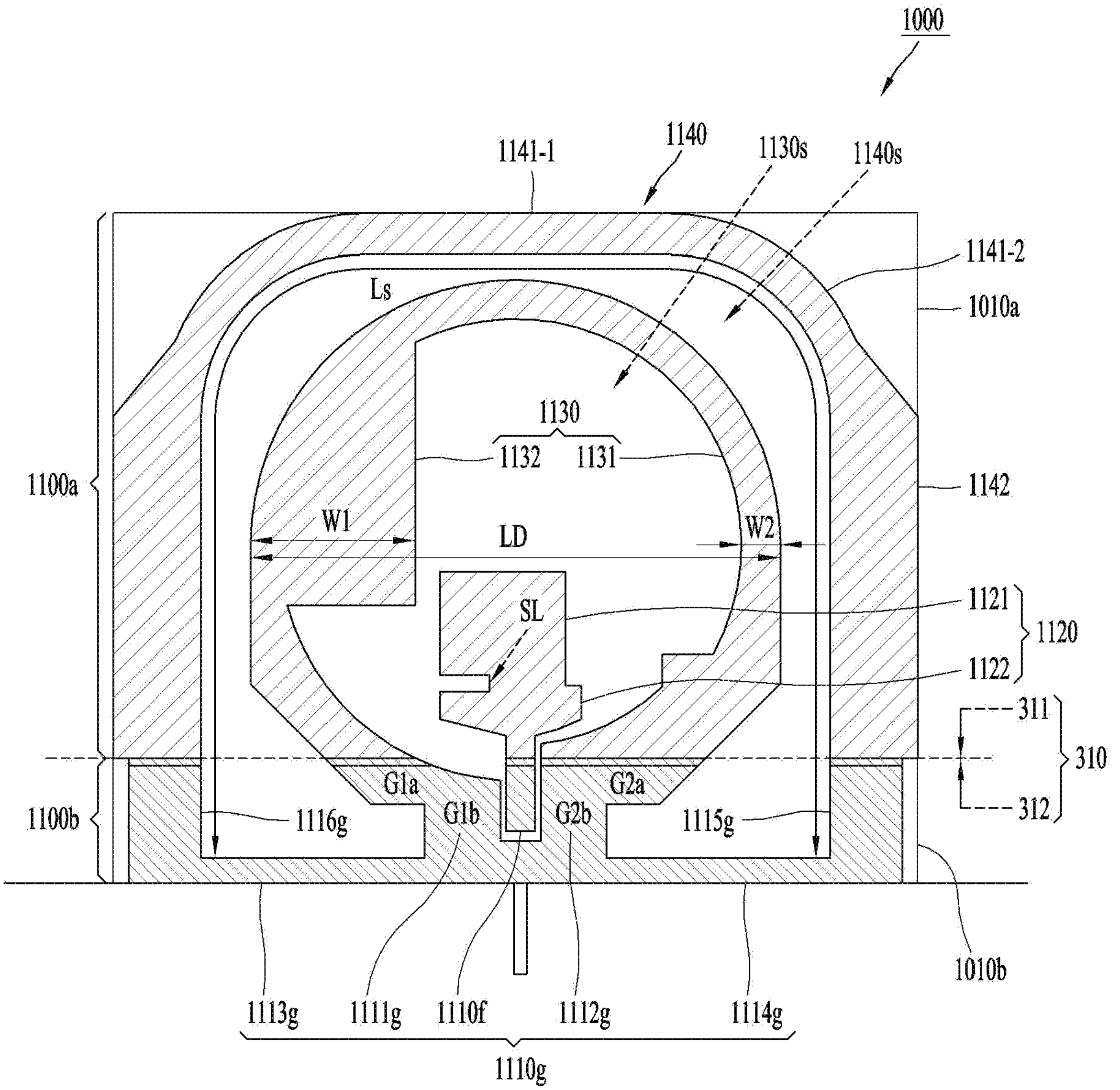
FIGS. 13A and 13B illustrate the structure of a vehicle GNSS antenna according to the present specification.
Figure 13B:
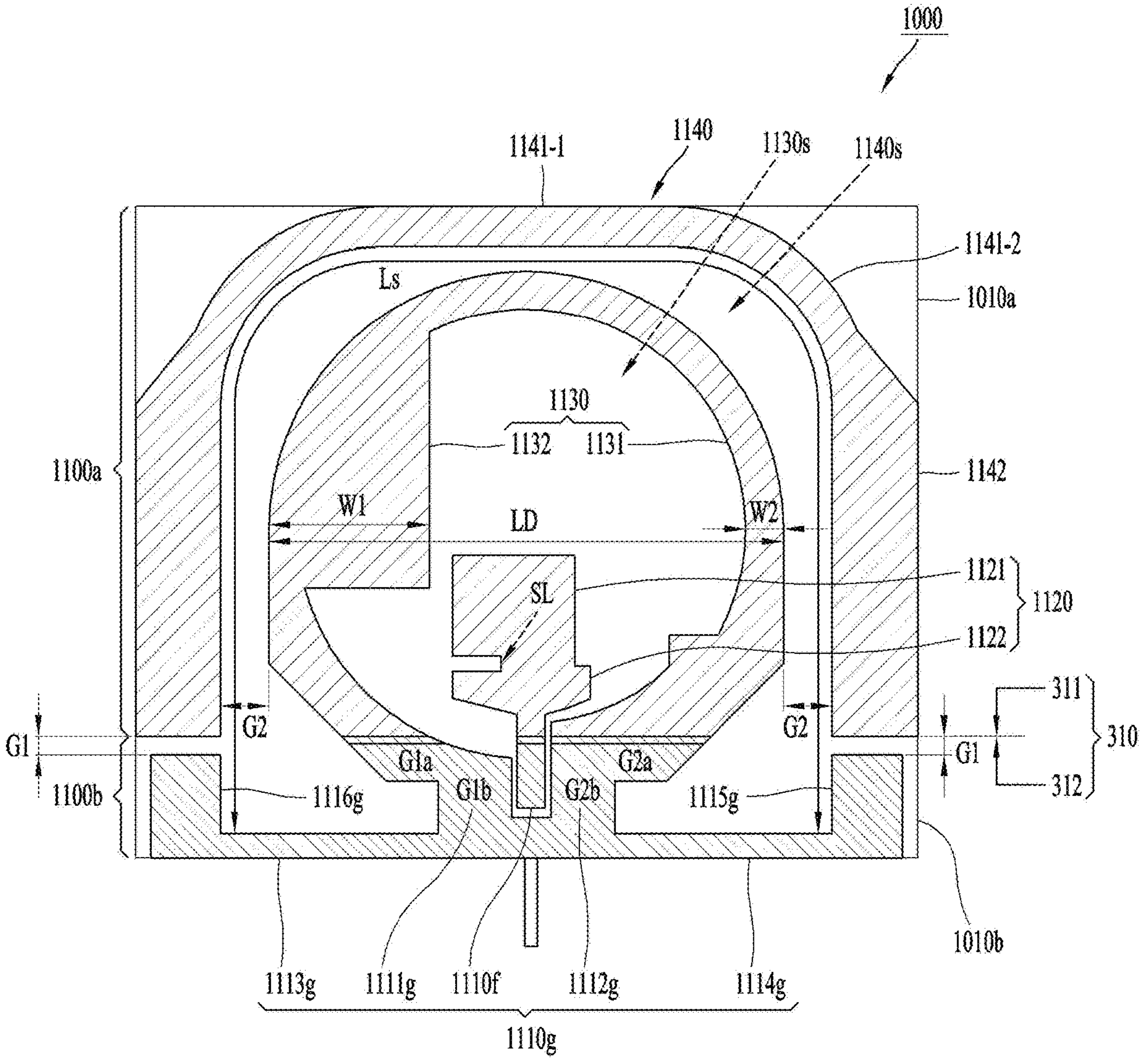

FIGS. 13A and 13B illustrate the vehicle GNSS antenna structures according to this specification. In FIG. 13A, the antenna assembly 1000 has an outer conductive pattern 1140 of the transparent antenna connected to the ground conductive pattern 1110*g* in the opaque area. In FIG. 13B, the outer conductive pattern 1140 of the transparent antenna is spaced apart by a gap G1 from the ground conductive pattern 1110*g* in the opaque area.

Referring to FIGS. 1 through 13B, the vehicle 500 includes a vehicle glass 310 and an antenna assembly 1000. The antenna assembly 1000 can be composed of a transparent dielectric substrate 1010*a*, a first region 1100*a*, and a second region 1100*b*.

The first region 1100*a* includes the antenna 1100 on one side of the transparent dielectric substrate 1010*a*. The second region 1100*b* comprises the grounded conductive pattern 1110*g* and a feeding pattern 1110*f*. The first and second regions may be referred to as the radiating area and the ground area (or feeding area), respectively. Since the antenna 1100 consists of multiple conductive patterns, it is also referred to as the antenna module 1100.

The antenna assembly 1000, designed as a transparent antenna, can adopt a single-layer CPW (coplanar waveguide) antenna structure. Referring to FIGS. 13A and 13B, the antenna 1100 includes a signal pattern 1120, a first ground pattern 1130, and a first slot 1130*s*. The antenna 1100 also includes a second ground pattern 1140 and a second slot 1140*s*.

The signal pattern 1120 connects to the feeding pattern 1110*f* in the second region 1100*b*. The first ground pattern 1130 connects to the first portion 1111*g* of the grounded conductive pattern 1110*g* in the second region 1100*b*. The first slot 1130*s* is formed between the signal pattern 1120 and the first ground pattern 1130. This first slot 1130*s* radiates a first signal having circular polarization in the first frequency band, which could be the L1 frequency band from 1559.0 to 1605.9 MHz. The first slot 1130*s* may also radiate a second signal having circular polarization in a lower frequency band, such as the L5 band from 1166.2 to 1186.7 MHz.

To optimize antenna characteristics in the first frequency band, the shape of the signal pattern 1120 and the first ground pattern 1130 can be fine-tuned. The signal pattern 1120 may consist of an upper first signal pattern 1121 and a lower second signal pattern 1122. A slit region SL without conductive material may be formed between the first and second signal patterns 1121 and 1122. The inner boundary of the first ground pattern 1130 can be circular in some areas, with protrusions in other areas for optimal configuration.

The first part 1131 of the inner boundary of the first ground pattern 1130 may have a circular shape. Protrusions 1132 can be formed on this boundary to match the contours of the signal patterns 1121 and 1122.

The second ground pattern 1140 is connected to the second portion 1112*g* of the grounded conductive pattern 1110*g* in the second region 1100*b*. The second ground pattern 1140 surrounds the first ground pattern 1130 and is designed to prevent radiation leakage into the vehicle glass at the L1 frequency band. Therefore, the second ground pattern 1140 helps form a radiation pattern directed towards the ceiling. The second slot 1140*s* is formed between the first and second ground patterns 1130, 1140 and radiates the second signal in the L5 frequency band.

Thus, the first slot 1130*s* radiates signals in both the L1 and L5 frequency bands. The second slot 1140*s*, located outside the first slot 1130*s*, radiates the second signal in the L5 band. The length Ls of the second slot 1140*s* is configured between ¾ of the wavelength and one full wavelength (3λ/4 to λ) of the operating frequency in the L5 band.

Meanwhile, the vehicle GNSS antenna according to the specification may optimize the shapes of the first and second ground patterns 1130, 1140 to enhance antenna performance in the first and second frequency bands. Referring to FIGS. 13A and 13B, the outer boundary of the first ground pattern 1120*g* may be at least partially circular in shape. The diameter L of the outer boundary of the first ground pattern 1130 may be configured within a range of 3λ/4 to λ, corresponding to the operating wavelength in the first frequency band.

The first portion 1131 of the inner boundary of the first ground pattern 1130 may be formed in a circular shape. The second portion 1132 of the inner boundary of the first ground pattern 1130 may be formed in a straight line along one axis and another straight line along a different axis. The first ground pattern 1130 may have a first width W1 along one axis and a second, narrower width W2 along the same axis.

Meanwhile, the second ground pattern 1140 may be formed to surround the first ground pattern 1130. Thus, the second ground pattern 1140 may prevent signals radiated by the first slot 1130*s* from leaking to the vehicle glass outside the second ground pattern 1140. The radiation patterns of the first signal in the first frequency band and the second signal in the second frequency band can be directed toward the vehicle's roof by the second ground pattern 1140 surrounding the first ground pattern 1130. In this context, the radiation pattern of the antenna 1100 may be formed in a direction perpendicular to the vehicle glass, i.e., toward the vehicle's roof.

Figure 14A:
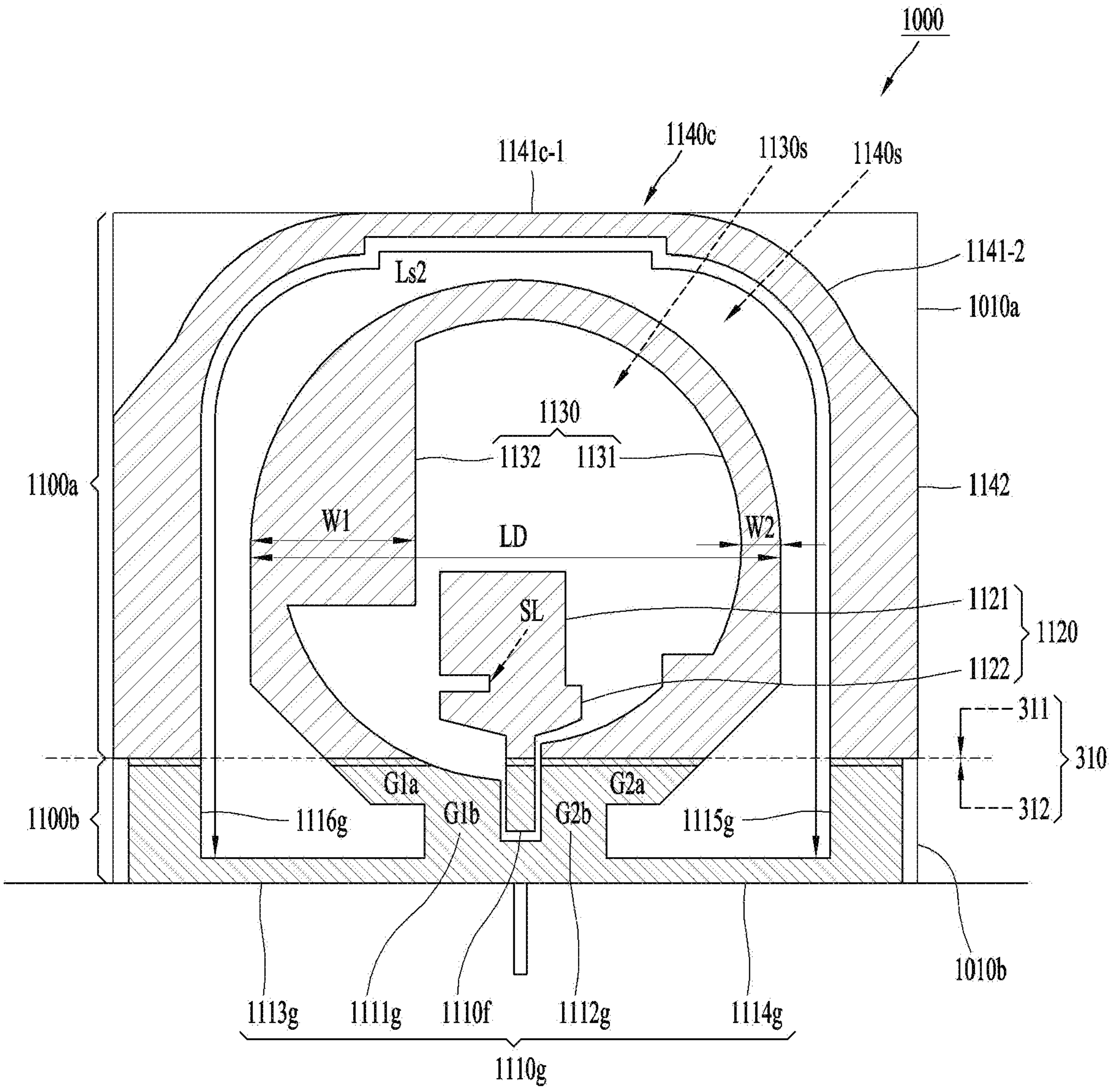
FIG. 14A shows an embodiment in which the inner area of the second ground pattern of the antenna assembly in FIG. 13A is partially modified.
Figure 14B:
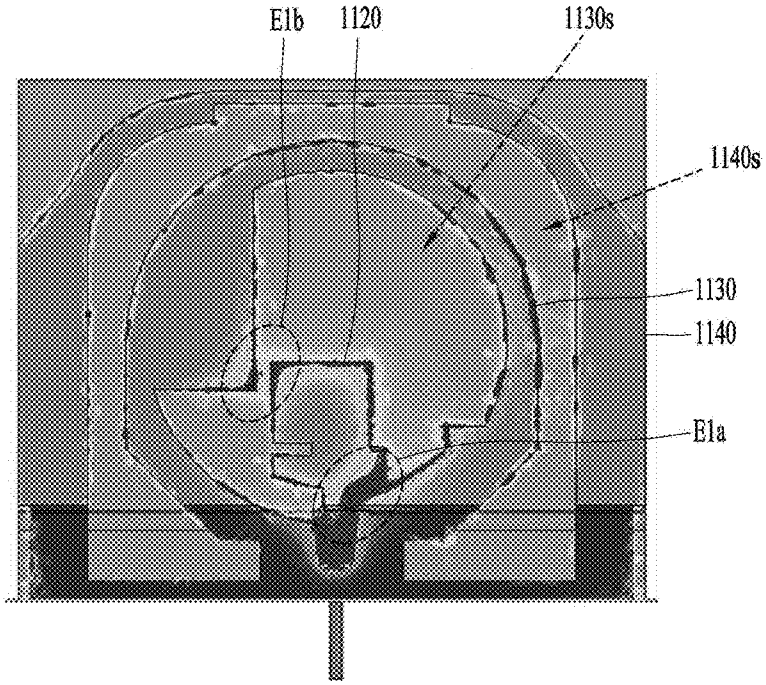
FIG. 14B illustrates the electric field distribution in the first and second frequency bands in the antenna assembly of FIG. 14A.

Meanwhile, the inner region of the second ground pattern in the antenna assembly of the present specification may be optimized to tune antenna performance. In this regard, FIG. 14A shows an embodiment in which the inner region of the second ground pattern in the antenna assembly of FIG. 13A is partially modified. FIG. 14B shows the electric field distribution in the first and second frequency bands in the antenna assembly of FIG. 14A.

As shown in FIG. 14A, the inner region of the second ground pattern 1140 may be recessed. The recessed shape of the inner region of the second ground pattern 1140 is not limited to the antenna assembly of FIG. 13A. For example, the inner region of the second ground pattern 1140 in the antenna assembly of FIG. 13B may also be recessed.

Referring to FIG. 14A, the antenna assembly 1000 may have a recessed shape in the inner region of the upper part 1141*c*-1 of the ground pattern 1140*c*. The first width of the inner region of the upper part 1141*c*-1 of the ground pattern 1140*c* may be narrower than the second width of the second part 1141-2 of the upper region 1141. Meanwhile, the recessed structure of the inner boundary of the upper part 1141*c*-1 of the ground pattern 1140*c* may maintain a certain distance from the outer boundary of the first ground pattern 1130. The recessed structure of the inner boundary of the upper part 1141*c*-1 of the ground pattern 1140*c* may maintain a certain distance from the outer boundary of the first ground pattern 1130 at a predetermined level or greater.

The length Ls2 of the second slot 1140*s* formed inside the second ground pattern 1140*c* may be configured between ¾ wavelength and one wavelength of the operating frequency in the second frequency band. As a result, the wavelength length of the second slot 1140*s* may be increased without increasing the overall size of the antenna assembly. This allows the resonance frequency of the antenna in the second frequency band (L5 band) to shift to a lower frequency band.

Figure 14B:
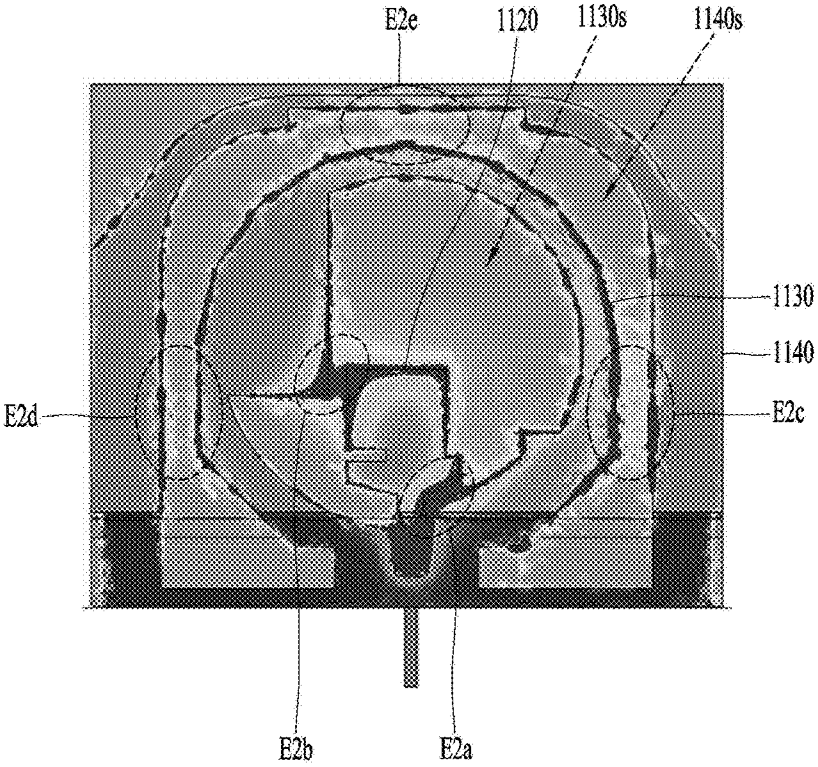

(a) of FIG. 14 shows the electric field distribution at 1.575 GHz in the first frequency band for the antenna assembly. (b) of FIG. 14 shows the electric field distribution at 1.176 GHz in the second frequency band for the antenna assembly.

Referring to (a) FIG. 14, the first signal in the first frequency band may be radiated through the first slot 1130*s* formed between the signal pattern 1120 and the first ground pattern 1130. Peak electric field areas may be formed in the first region E1*a* and the second region E1*b* of the first slot 1130*s*. The first region E1*a* and second region E1*b* of the first slot 1130*s* may be formed on one side of the upper part and the other side of the lower part of the signal pattern 1120. Accordingly, a current may be formed along the first slot 1130 corresponding to the inner region of the first ground pattern 1130.

Referring to (b) of FIG. 14, the first signal in the first frequency band may be radiated through the first slot 1130*s* formed between the signal pattern 1120 and the first ground pattern 1130. Peak electric field areas may be formed in the first region E2*a* and the second region E2*b* of the first slot 1130*s*. The first region E2*a* and the second region E2*b* of the first slot 1130*s* may be formed on one side of the upper part and the other side of the lower part of the signal pattern 1120. Accordingly, the first current in the first frequency band may be formed along the first slot 1130*s*, corresponding to the inner region of the first ground pattern 1130.

The second signal in the second frequency band may be radiated through the second slot 1140*s* formed between the first ground pattern 1130 and the second ground pattern 1140. Peak electric field areas may be formed in the third region E2*c*, the fourth region E2*d*, and the fifth region E2*e* of the second slot 1140*s*. The third region E2*c*, the fourth region E2*d*, and the fifth region E2*e* of the second slot 1140*s* may be formed along the inner region of the second ground pattern 1140. Accordingly, the second current in the second frequency band may be formed along the second slot 1140*s* corresponding to the inner region of the second ground pattern 1140.

Figure 15A:
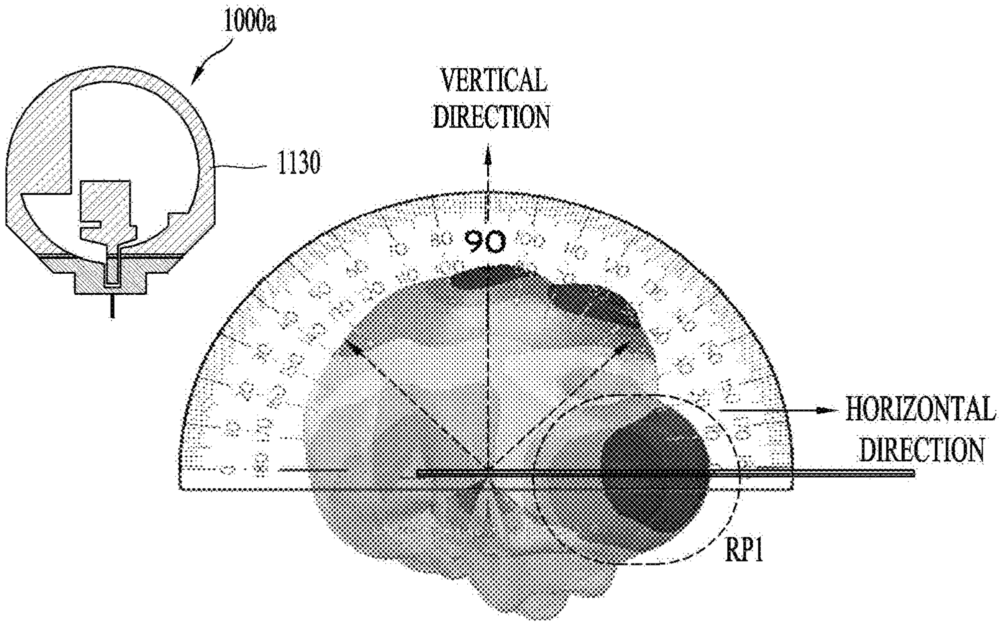
FIGS. 15A and 15B compare the radiation patterns of the antenna in the first frequency band, with and without the second ground pattern.
Figure 15A:
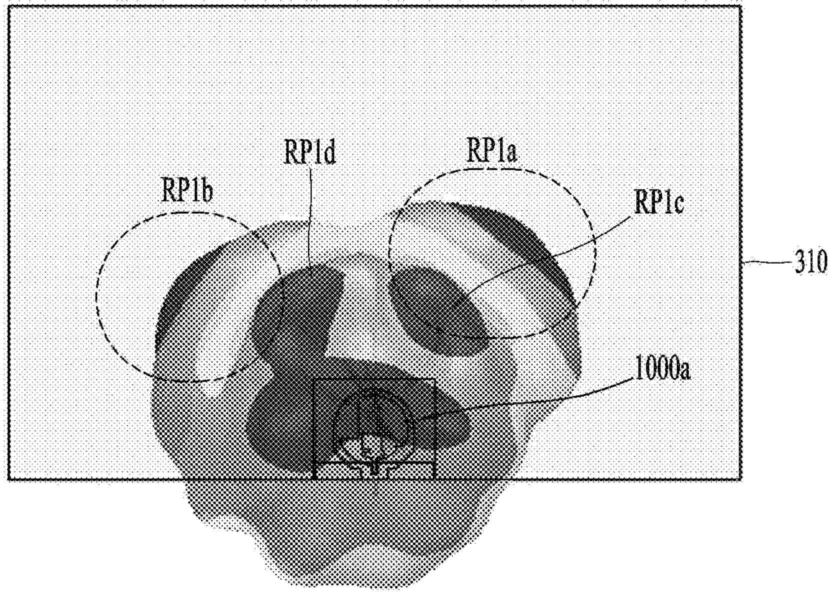
Figure 15B:
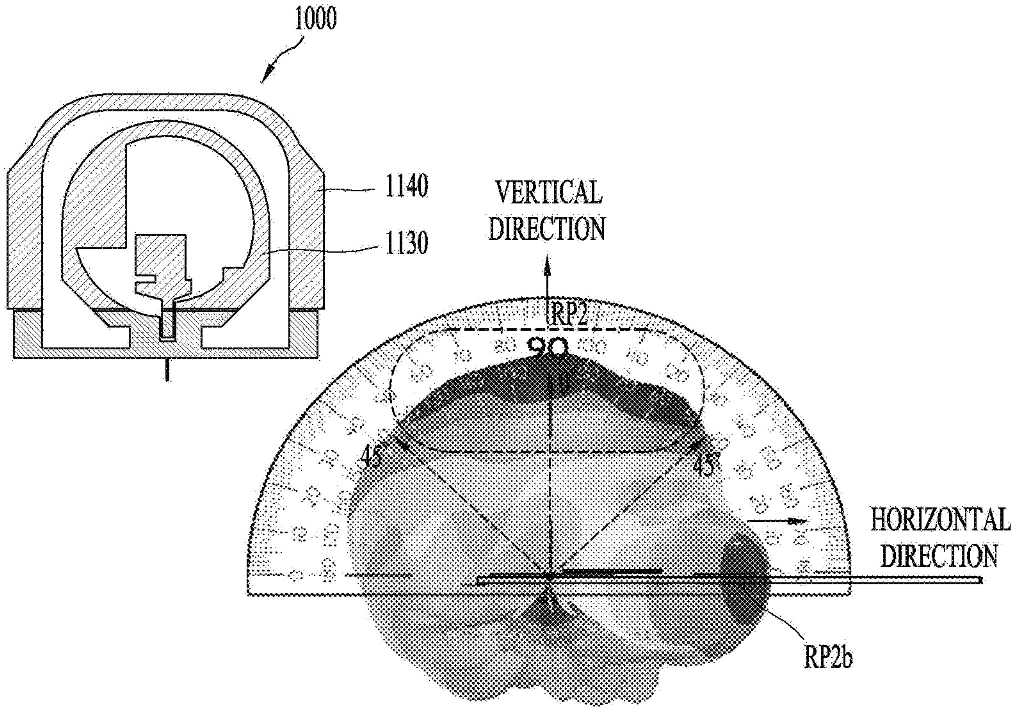
Figure 15B:
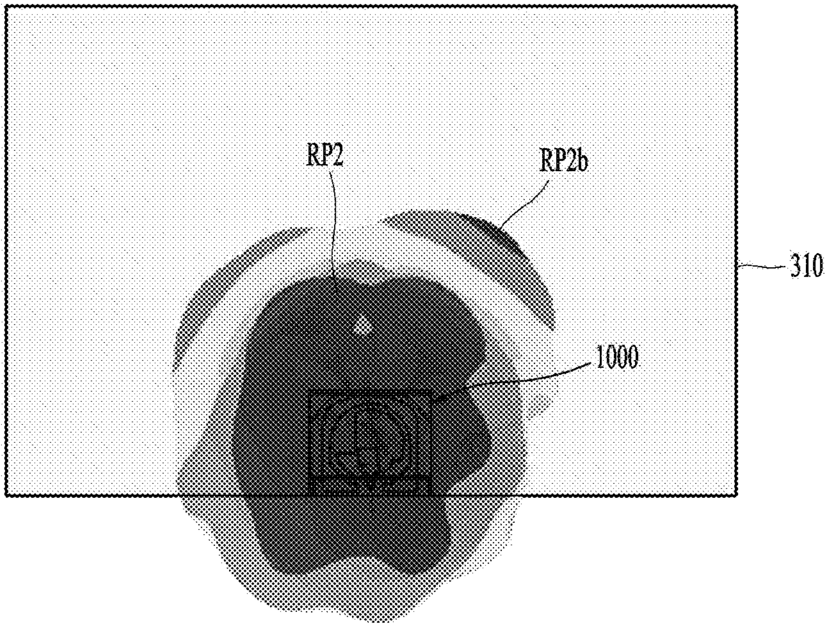
Figure 15C:
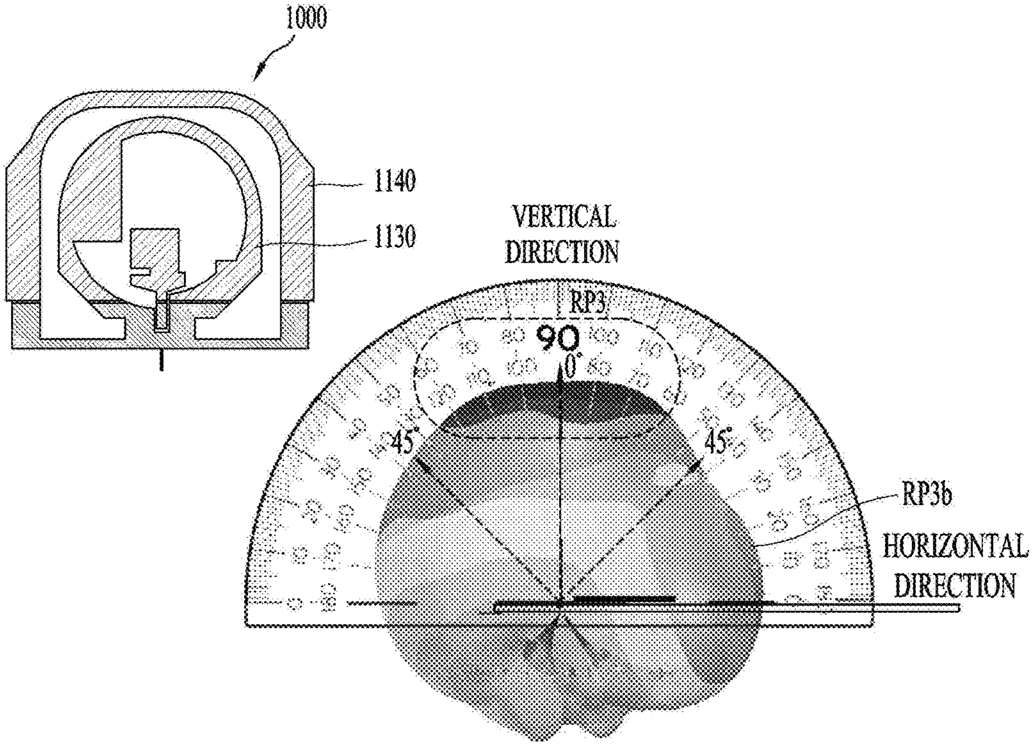
FIG. 15C shows the radiation pattern of the antenna in the second frequency band with the second ground pattern formed.
Figure 15C:
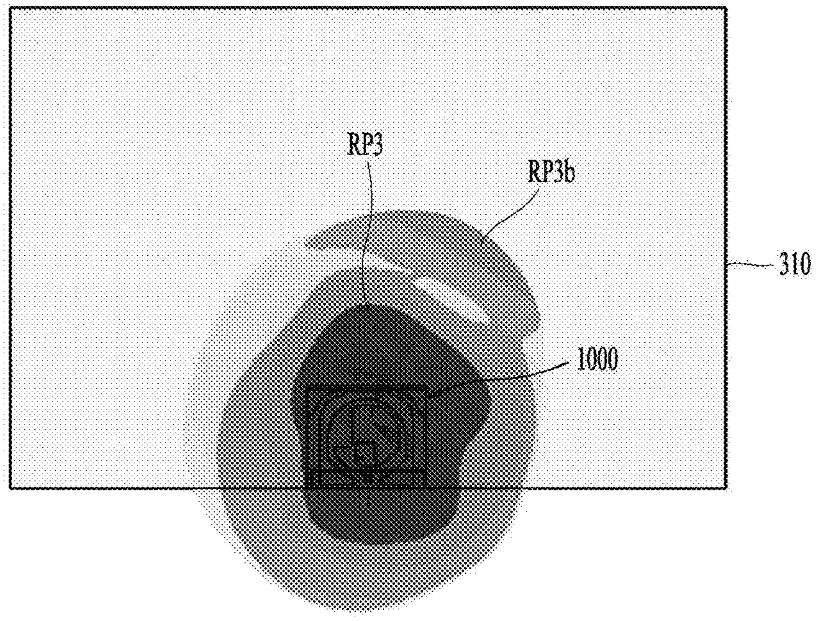

FIGS. 15A and 15B compare the radiation patterns of the antenna in the first frequency band depending on the presence of the second ground pattern. FIG. 15C shows the radiation pattern of the antenna in the second frequency band when the second ground pattern is present.

FIG. 15A shows the radiation pattern of the antenna assembly 1000*a* at 1.575 GHz in the first frequency band (L1 band). FIG. 15B shows the radiation pattern of the antenna assembly 1000 at 1.575 GHz in the first frequency band (L1 band). FIG. 15C shows the radiation pattern of the antenna assembly 1000 at 1.176 GHz in the second frequency band (L5 band).

Referring to (a) of FIG. 15A, the antenna assembly 1000*a*, having only the first ground pattern 1130, does not have a second ground pattern. The antenna assembly 1000*a*, which has only the first ground pattern 1130, may be referred to as a single-slot antenna. The radiation pattern peak RP1 of the antenna assembly 1000*a* may be formed at an angle greater than 45 degrees relative to the vertical direction of the vehicle roof, which is the 0-degree reference. The radiation pattern peak RP1 of the antenna assembly 1000*a*, which lacks the second ground pattern surrounding the first ground pattern 1130, may be formed in the horizontal direction toward the vehicle glass. As a result, the GNSS signal reception characteristics of the antenna assembly 1000*a*, which lacks the second ground pattern surrounding the first ground pattern 1130, may fall below the threshold.

(b) of FIG. 15A shows the radiation pattern of the antenna assembly 1000*a* of (a) of FIG. 15A as seen from the vehicle roof direction. The antenna assembly 1000 may be disposed on the glass panel 310. The radiation pattern peaks RP1*a*, RP1*b* of the antenna assembly 1000*a* toward the vehicle glass may have higher values than the radiation pattern peaks RP1*c*, RP1*d* toward the vehicle roof. The first region of the radiation pattern peaks RP1*a*, RP1*b* of the antenna assembly 1000*a* toward the vehicle glass may cover a larger area than the second and third regions of the radiation pattern peaks RP1*c*, RP1*d* toward the vehicle roof.

Referring to (a) of FIG. 15B, the antenna assembly 1000 includes the second ground pattern 1140 surrounding the first ground pattern 1130. The antenna assembly 1000, which includes the first and second ground patterns 1130, 1140, may be referred to as a dual-slot antenna because it includes both the first and second slots. The radiation pattern peak RP2 of the antenna assembly 1000 may be formed in a range of −45 degrees to +45 degrees relative to the vertical direction of the vehicle roof, which is the 0-degree reference. The radiation pattern peak RP2 of the antenna assembly 1000, where the second ground pattern 1140 is formed surrounding the first ground pattern 1130, is formed toward the vehicle roof. Accordingly, the GNSS signal reception characteristics of the antenna assembly 1000, where the second ground pattern 1140 surrounds the first ground pattern 1130, may meet or exceed the threshold.

(b) of FIG. 15B shows the radiation pattern of the antenna assembly 1000 of (a) of FIG. 15B as seen from the vehicle roof direction. The antenna assembly 1000 may be disposed on the glass panel 310. The radiation pattern peak RP2 of the antenna assembly 1000 toward the vehicle roof may have higher values than the radiation pattern peak RP2*b* toward the vehicle glass. The first region of the radiation pattern peak RP2*b* of the antenna assembly 1000 toward the vehicle glass may cover a smaller area than the second region of the radiation pattern peak RP2 toward the vehicle roof. As a result, the radiation pattern area toward the vehicle glass is reduced due to the second ground pattern 1140 surrounding the first ground pattern 1130, and the radiation pattern is formed primarily toward the vehicle roof.

Referring to (a) of FIG. 15C, even in the second frequency band (L5 band), the radiation pattern peak RP3 of the antenna assembly 1000 may be formed in a range of −45 degrees to +45 degrees relative to the vertical direction of the vehicle roof, which is the 0-degree reference. The radiation pattern peak RP3 of the antenna assembly 1000, where the second ground pattern 1140 surrounds the first ground pattern 1130, is formed toward the vehicle roof. Accordingly, the GNSS signal reception characteristics of the antenna assembly 1000, where the second ground pattern 1140 surrounds the first ground pattern 1130, may meet or exceed the threshold.

(b) of FIG. 15C illustrates the radiation pattern of the antenna assembly 1000 from (a) of FIG. 15C as viewed from the roof direction of the vehicle. The antenna assembly 1000 may be placed on the glass panel 310. The radiation pattern peak RP3 of the antenna assembly 1000 in the roof direction has a higher value than the radiation pattern peak RP3*b* in the glass direction. The first region of the radiation pattern peak RP3*b* in the glass direction is narrower than the second region of the radiation pattern peak RP3 in the roof direction. Accordingly, the second ground pattern 1140 surrounding the first ground pattern 1130 reduces the radiation pattern area in the glass direction and shifts the focus of the radiation pattern toward the roof.

Figure 16A:
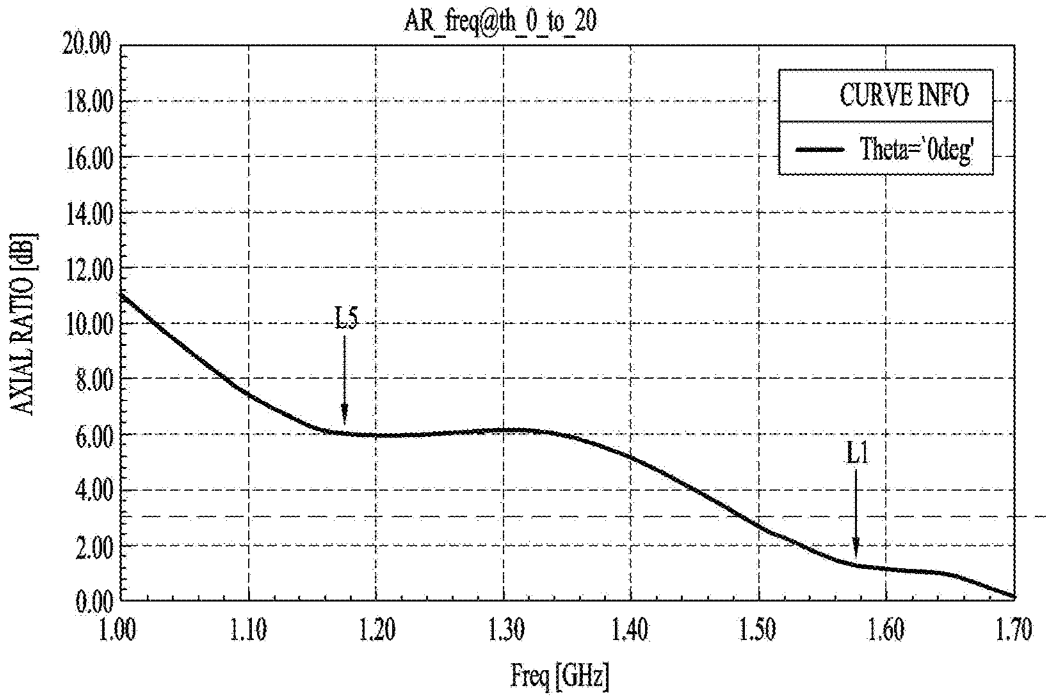
FIG. 16A illustrates the axial ratio depending on the presence or absence of the second ground pattern across different frequencies.
Figure 16A:
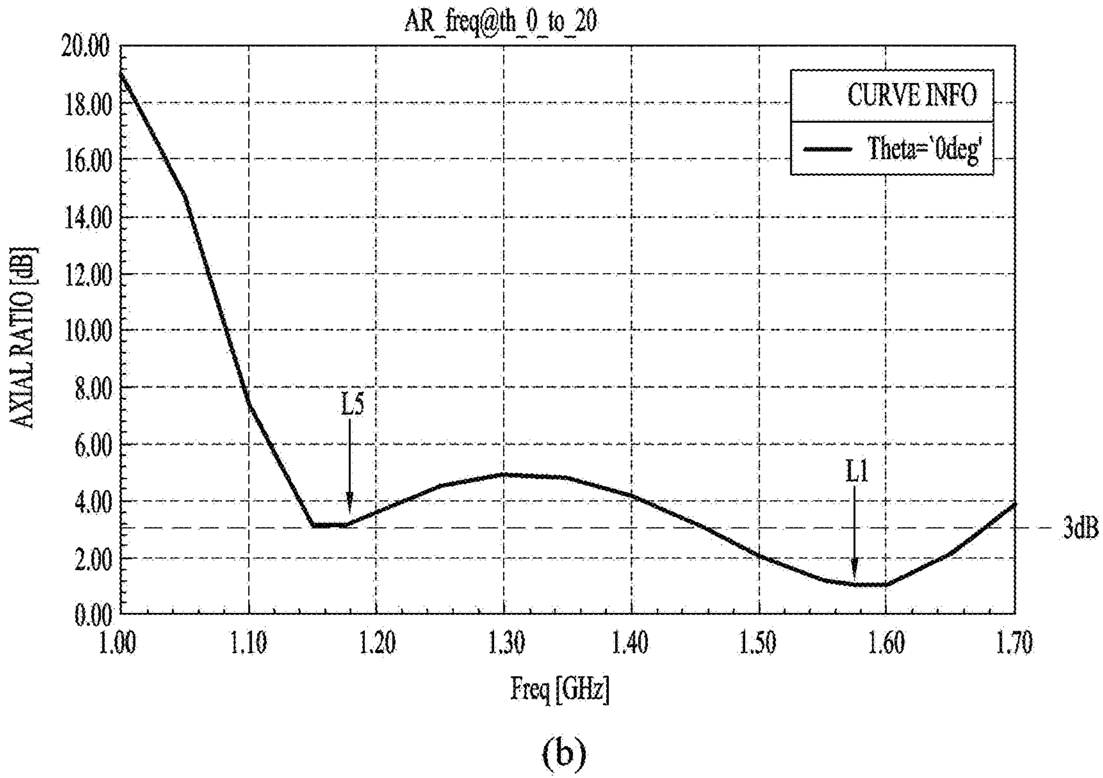
Figure 16B:
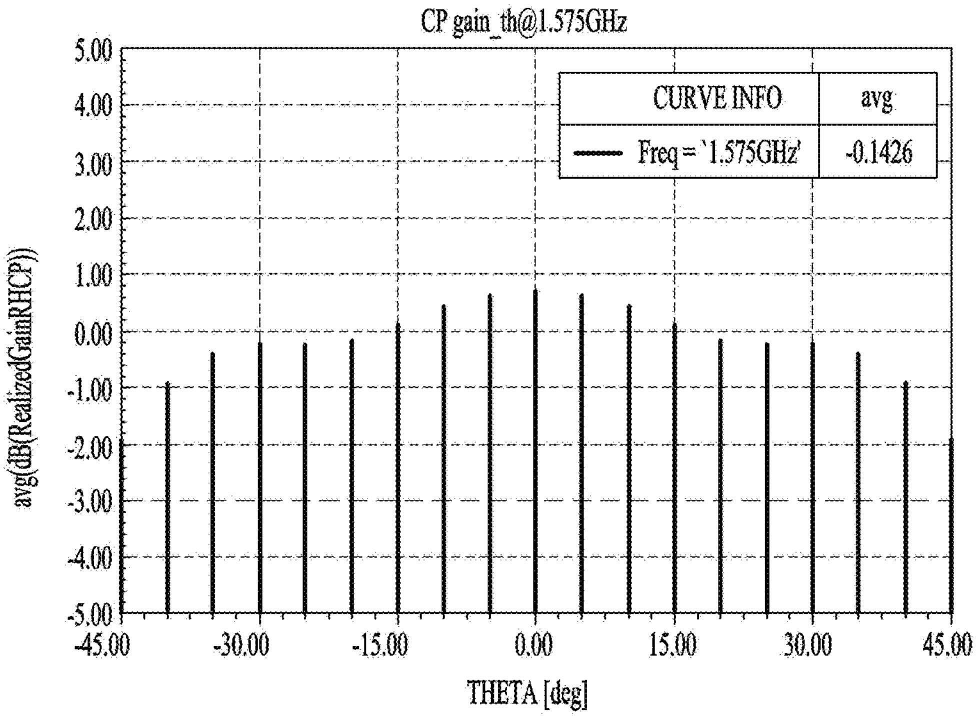
FIGS. 16B and 16C depict the gain characteristics at different angles in the first and second frequency bands, depending on whether the second ground pattern is present or not.
Figure 16B:
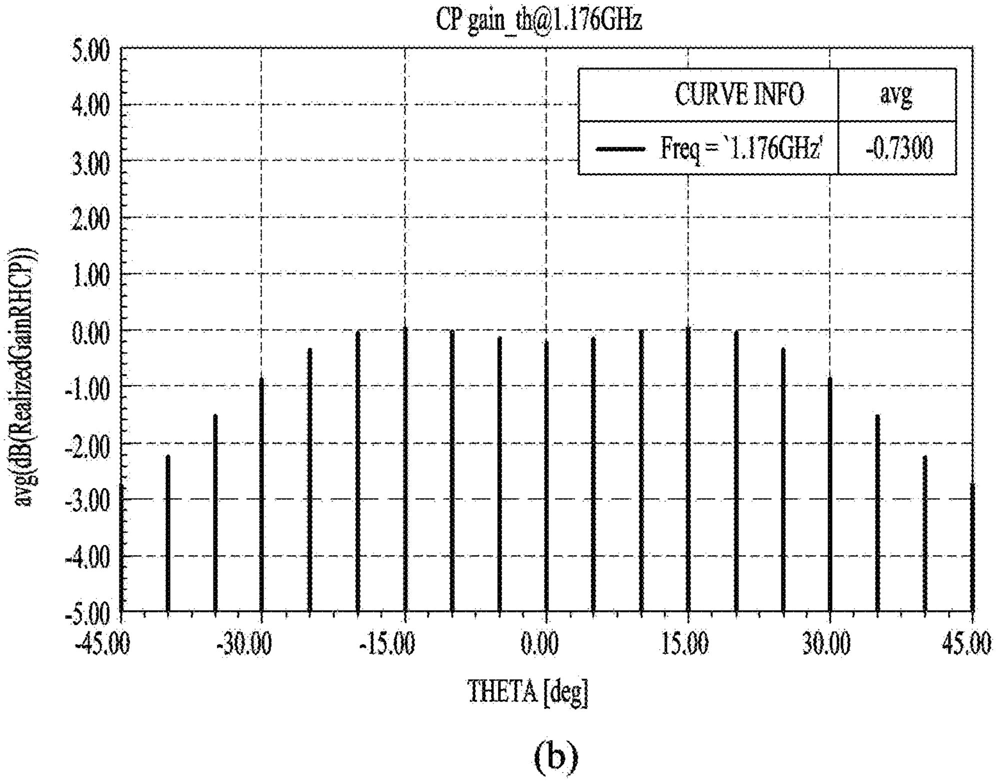
Figure 16C:
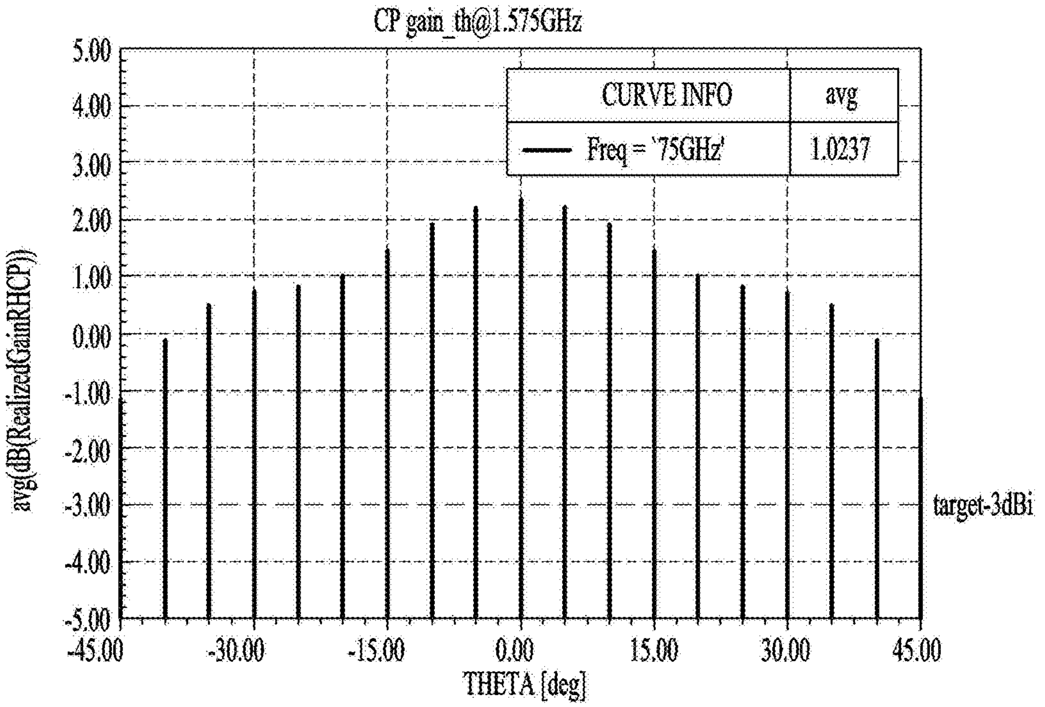
Figure 16C:
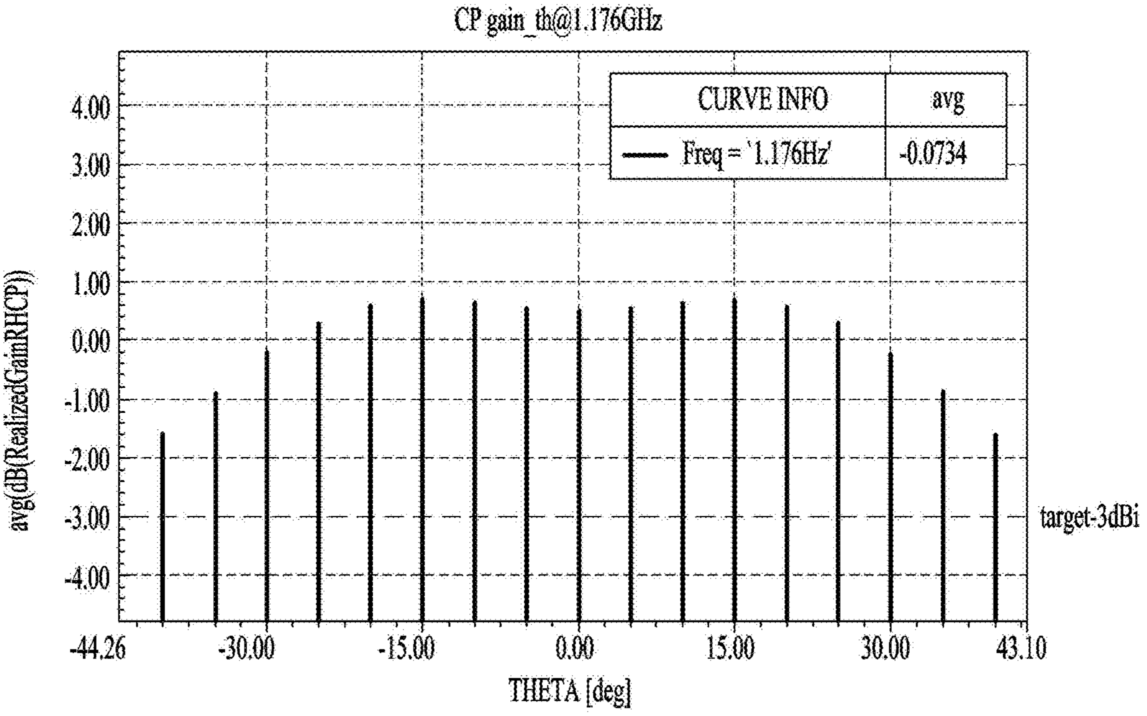

Meanwhile, the vehicle GNSS antenna with the second ground pattern according to this specification may have a radiation pattern directed toward the vehicle's roof and may maintain an axial ratio below a specific threshold in both the first and second frequency bands. In this regard, FIG. 16A illustrates the axial ratio for different frequencies depending on the presence or absence of the second ground pattern. FIGS. 16B and 16C show the gain characteristics for different angles in the first and second frequency bands depending on the presence or absence of the second ground pattern.

Referring to (a) of FIG. 15A and (a) of FIG. 16A, the axial ratio of the antenna assembly 1000*a*, which has only the first ground pattern 1130 and no second ground pattern, may be below the threshold, for example, 3 dB, only in the first frequency band (L1 band). In the second frequency band (L5 band), the axial ratio of the antenna assembly 1000*a* may exceed the threshold, for example, 3 dB, resulting in degraded circular polarization performance.

Referring to (a) of FIG. 15B, (a) of FIG. 15C, and (b) of FIG. 16A, the axial ratio of the antenna assembly 1000, with the second ground pattern 1140 surrounding the first ground pattern 1130, may be below the threshold, for example, 3 dB, in both the first frequency band (L1 band) and the second frequency band (L5 band). Therefore, the axial ratio of the antenna assembly 1000 may be improved in the second frequency band (L5 band) compared to the antenna assembly 1000*a* without the second ground pattern, resulting in enhanced circular polarization performance.

Referring to (a) of FIG. 15A and (a) of FIG. 16B, in the first frequency band (L1 band), the antenna gain of the antenna assembly 1000*a* may range from about −1 dB to 0.7 dB between −45 degrees and 45 degrees. The average antenna gain of the antenna assembly 1000*a* in the range of −45 degrees to 45 degrees in the first frequency band (L1 band) is approximately −0.14 dB. Referring to (a) of FIG. 14A and (b) of FIG. 15B, in the second frequency band (L5 band), the antenna gain of the antenna assembly 1000*a* may range from about −2.2 dB to 0 dB between −45 degrees and 45 degrees. The average antenna gain of the antenna assembly 1000*a* in the range of −45 degrees to 45 degrees in the second frequency band (L5 band) is approximately −0.73 dB.

Referring to (a) of FIG. 15B, (a) of FIG. 15C, and (a) of FIG. 16C, in the first frequency band (L1 band), the antenna gain of the antenna assembly 1000 may range from about −0.1 dB to 2.4 dB between −45 degrees and 45 degrees. The average antenna gain of the antenna assembly 1000 in the range of −45 degrees to 45 degrees in the first frequency band (L1 band) is approximately 1.02 dB. Therefore, the average antenna gain of the antenna assembly 1000 is improved by about 1.15 dB compared to the antenna assembly 1000*a* without the second ground pattern. Referring to (a) of FIG. 15B, (a) of FIG. 15C, and (b) of FIG. 16B, in the second frequency band (L5 band), the antenna gain of the antenna assembly 1000 may range from about −1.6 dB to 0.7 dB between −45 degrees and 45 degrees. The average antenna gain of the antenna assembly 1000 in the range of −45 degrees to 45 degrees in the second frequency band (L5 band) is approximately −0.07 dB. Therefore, the average antenna gain of the antenna assembly 1000 is improved by about 0.7 dB compared to the antenna assembly 1000*a* without the second ground pattern.

Figure 17A:
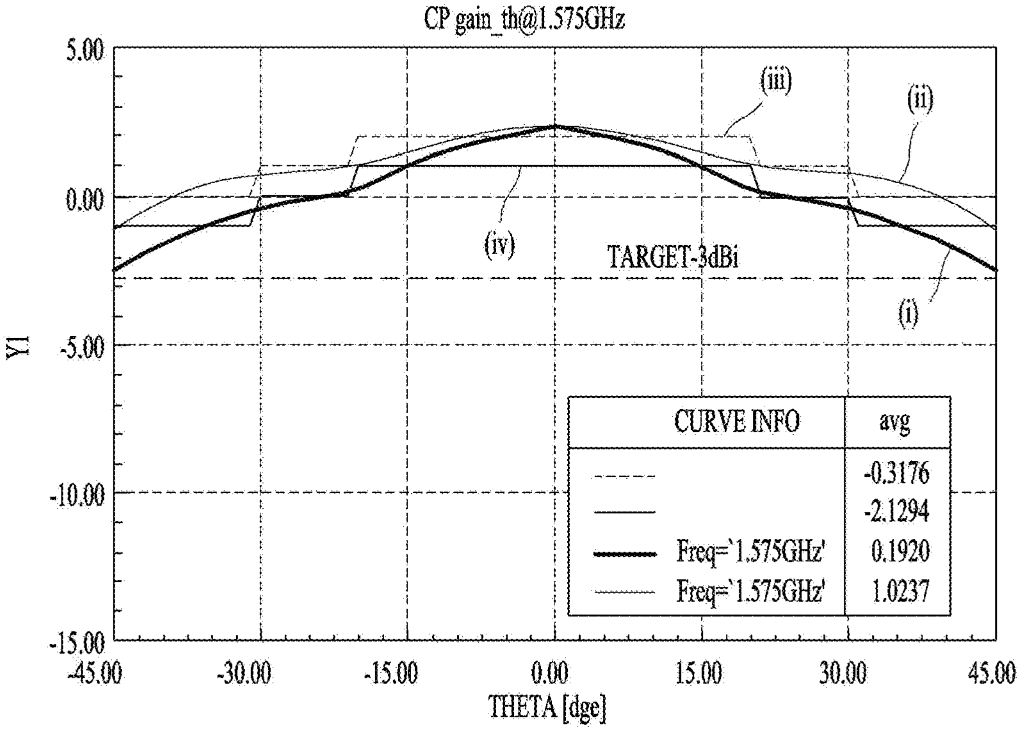
FIGS. 17A and 17B compare the antenna gain characteristics in the first and second frequency bands depending on the presence or absence of the second ground pattern.
Figure 17A:
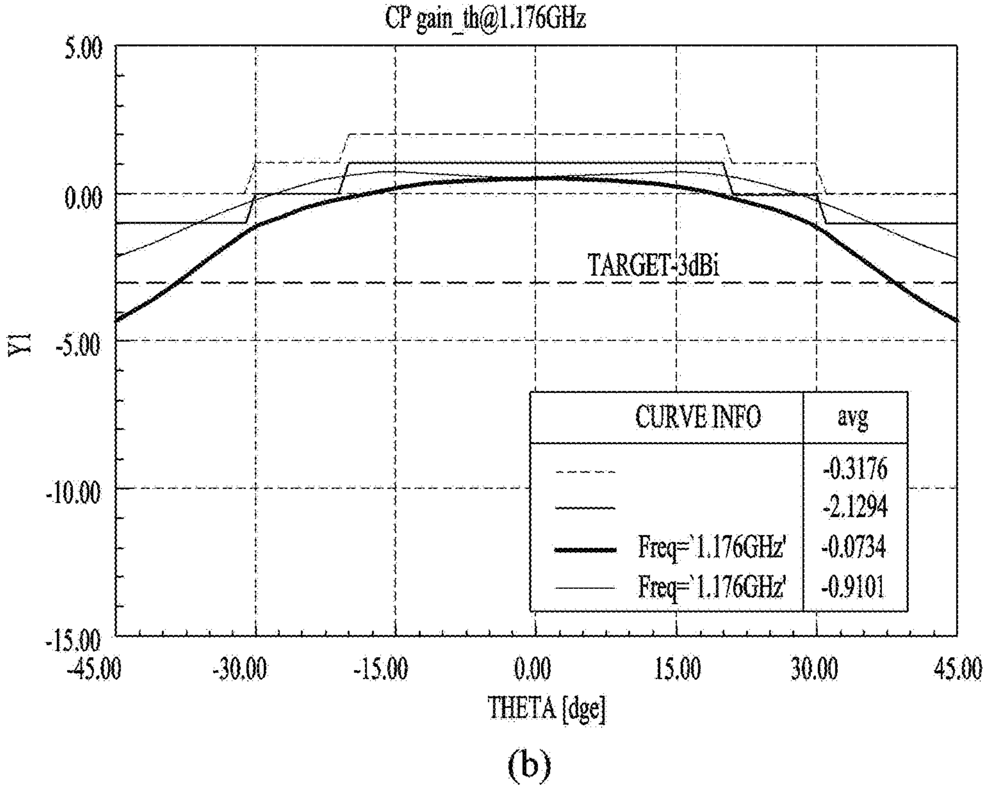
Figure 17B:
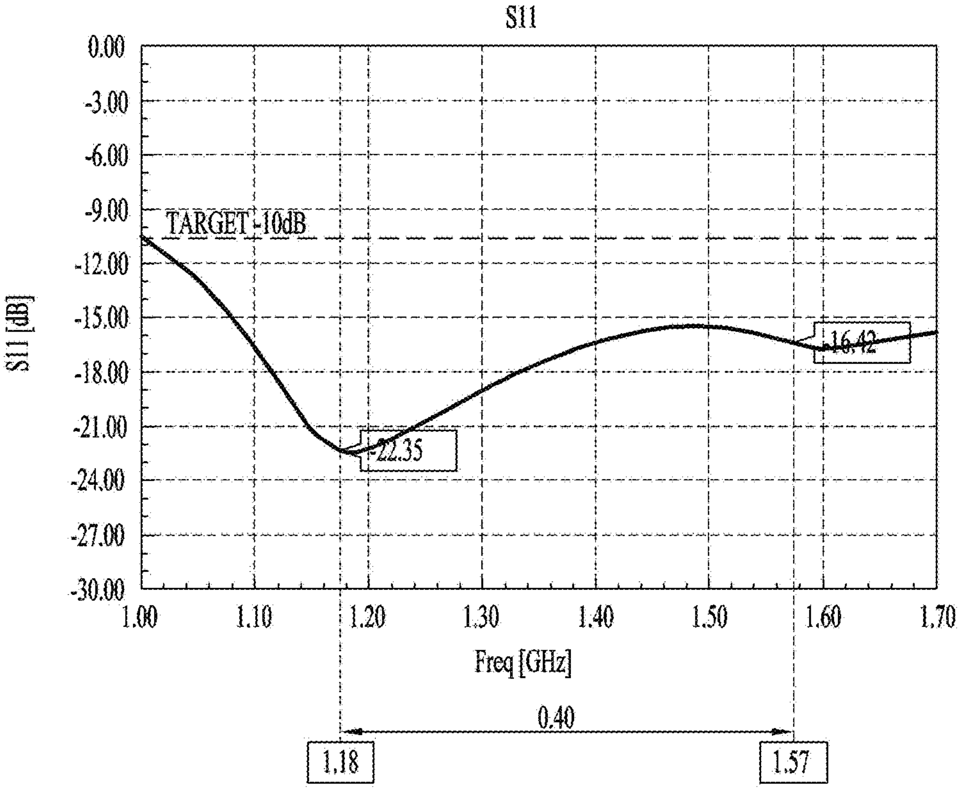
Figure 17B:
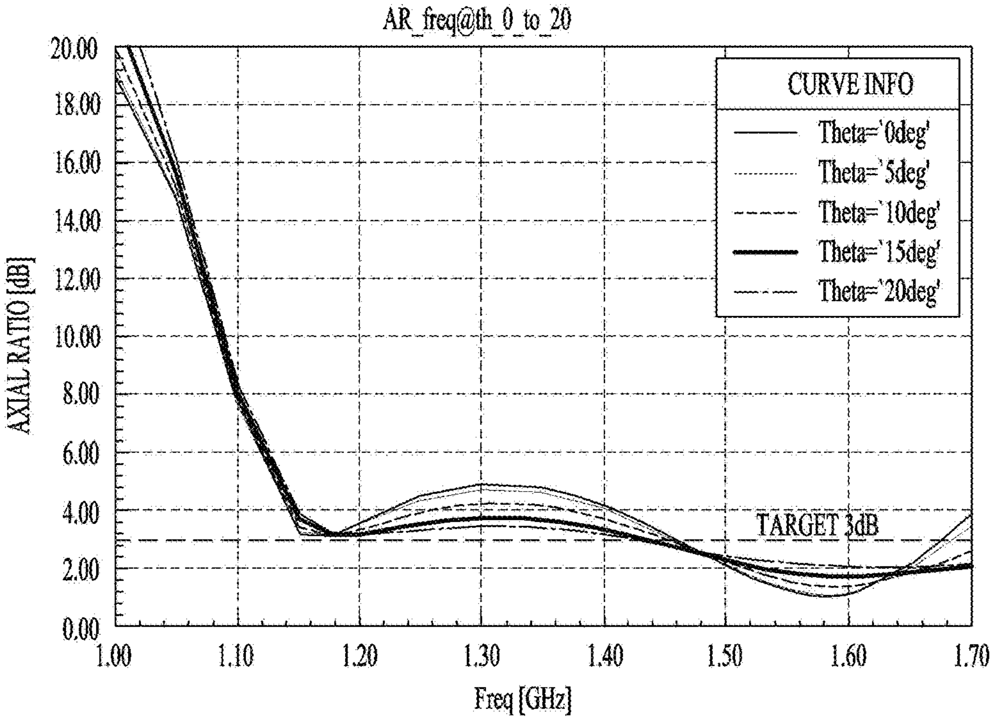

As described above, the second ground pattern formed in the vehicle GNSS antenna can improve the antenna gain characteristics. Accordingly, FIGS. 17A and 17B compare the antenna gain characteristics in the first and second frequency bands depending on the presence or absence of the second ground pattern. FIG. 17A illustrates the antenna gain characteristics at 1.575 GHz in the first frequency band depending on the presence or absence of the second ground pattern. FIG. 17B illustrates the antenna gain characteristics at 1.176 GHz in the second frequency band depending on the presence or absence of the second ground pattern. Referring to FIGS. 17A and 17B, the target antenna gain may be set to be −3 dBi or higher between −45 degrees and +45 degrees.

Referring to FIG. 15A, (a) of FIG. 16B, and (a) of FIG. 17A, (i) shows the normalized antenna gain value of the antenna assembly 1000*a* without the second ground pattern. Referring to FIG. 15A, (a) of FIG. 16C, and FIG. 17A, (ii) shows the normalized antenna gain value of the antenna assembly 1000 with the second ground pattern 1140. (iii) shows the angle-dependent antenna gain values of the antenna assembly 1000*a* without the second ground pattern. (iv) shows the angle-dependent antenna gain values of the antenna assembly 1000 with the second ground pattern 1140. Referring to (i) in (a) of FIG. 17A, the average gain of the antenna assembly 1000*a* without the second ground pattern is approximately 0.19 dB. Referring to (ii) in (a) of FIG. 17A, the average gain of the antenna assembly 1000 with the second ground pattern 1140 is approximately 1.02 dB. Therefore, the formation of the second ground pattern 1140 in the antenna assembly 1000 can improve the average gain by about 0.8 dB or more.

Referring to FIG. 15B, (b) of FIG. 16B, and (b) of FIG. 17A, (i) shows the normalized antenna gain value of the antenna assembly 1000*a* without the second ground pattern. Referring to FIG. 15A, (b) of FIG. 16C, and (b) of FIG. 17A, (ii) shows the normalized antenna gain value of the antenna assembly 1000 with the second ground pattern 1140. (iii) shows the angle-dependent antenna gain values of the antenna assembly 1000*a* without the second ground pattern. (iv) shows the angle-dependent antenna gain values of the antenna assembly 1000 with the second ground pattern 1140.

Referring to (i) in (b) of FIG. 17A, the average gain of the antenna assembly 1000*a* without the second ground pattern is approximately −0.91 dB. The antenna gain of the antenna assembly 1000*a* without the second ground pattern is below the target antenna gain of −3 dBi in the regions below −40 degrees and above +40 degrees. Therefore, the second ground pattern 1140 needs to be further formed to meet the target antenna gain of −3 dBi or higher. Referring to (ii) in (b) of FIG. 17A, the average gain of the antenna assembly 1000 with the second ground pattern 1140 is approximately −0.07 dB. Thus, forming the second ground pattern 1140 in the antenna assembly 1000 improves the average gain by about 0.8 dB or more.

FIG. 17B illustrates the reflection coefficient and axial ratio characteristics of the vehicle GNSS antenna in FIG. 13A.(a) of FIG. 17B shows the reflection coefficient characteristics of the vehicle GNSS antenna. (b) of FIG. 17B shows the axial ratio characteristics of the vehicle GNSS antenna at different vertical angles relative to the vehicle roof.

Referring to (a) of FIG. 17B, the antenna assembly exhibits dual resonance at the first frequency in the first frequency band and the second frequency in the second frequency band. The antenna assembly can exhibit dual resonance at 1.57 GHz in the first frequency band and 1.18 GHz in the second frequency band. The antenna assembly has a reflection coefficient below the target value of −10 dB in frequency bands above 1 GHz.

Referring to (b) of FIG. 17B, the axial ratio is shown at 0, 5, 10, 15, and 20 degrees relative to the vertical direction at 0 degrees toward the vehicle roof. The antenna assembly exhibits first and second minimum values of the axial ratio at the first frequency in the first frequency band and the second frequency in the second frequency band. The axial ratio of the antenna assembly is below 3 dB in the first frequency band and approximately 3 dB in the second frequency band. The antenna assembly can receive circularly polarized signals with a reception level above a certain threshold within a range of −20 degrees to 20 degrees relative to the vehicle roof. Accordingly, the antenna assembly can perform satellite communication within a specified angle range relative to the vehicle roof.

Figure 18A:
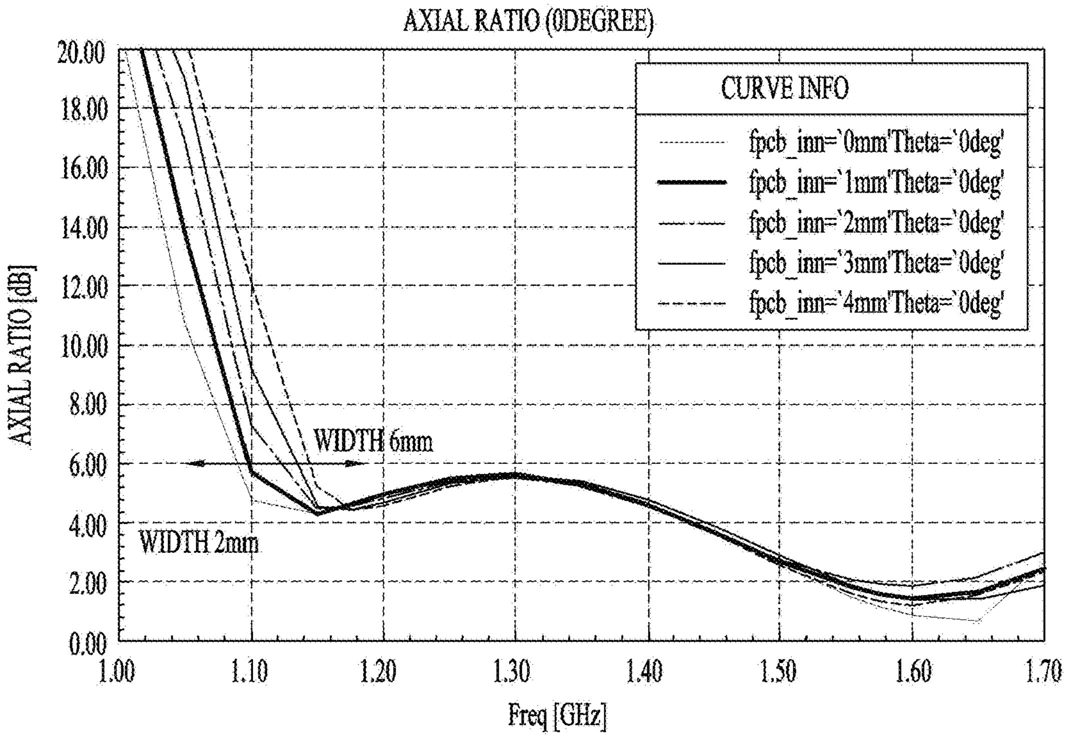
FIGS. 18A to 18C show the axial ratio, which represents the circular polarization performance, depending on the gap distance between the vertical/horizontal width of the second ground pattern and the first conductive pattern in the antenna structure of FIG. 13A.
Figure 18B:
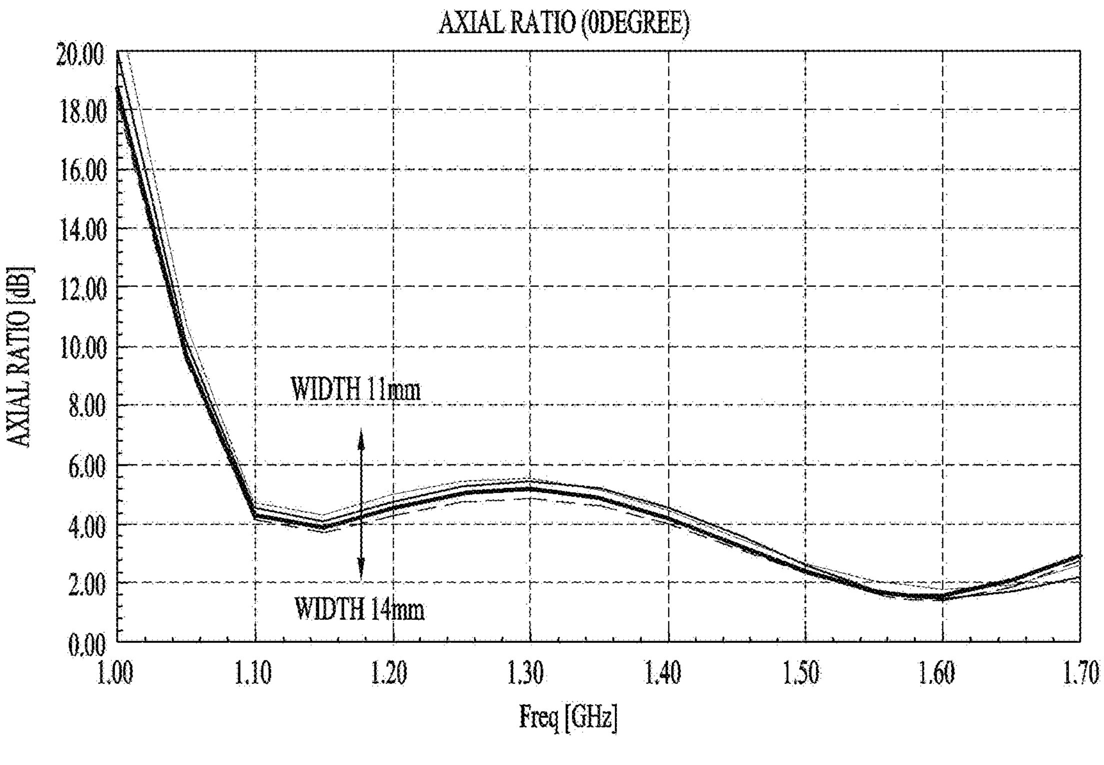
Figure 18C:
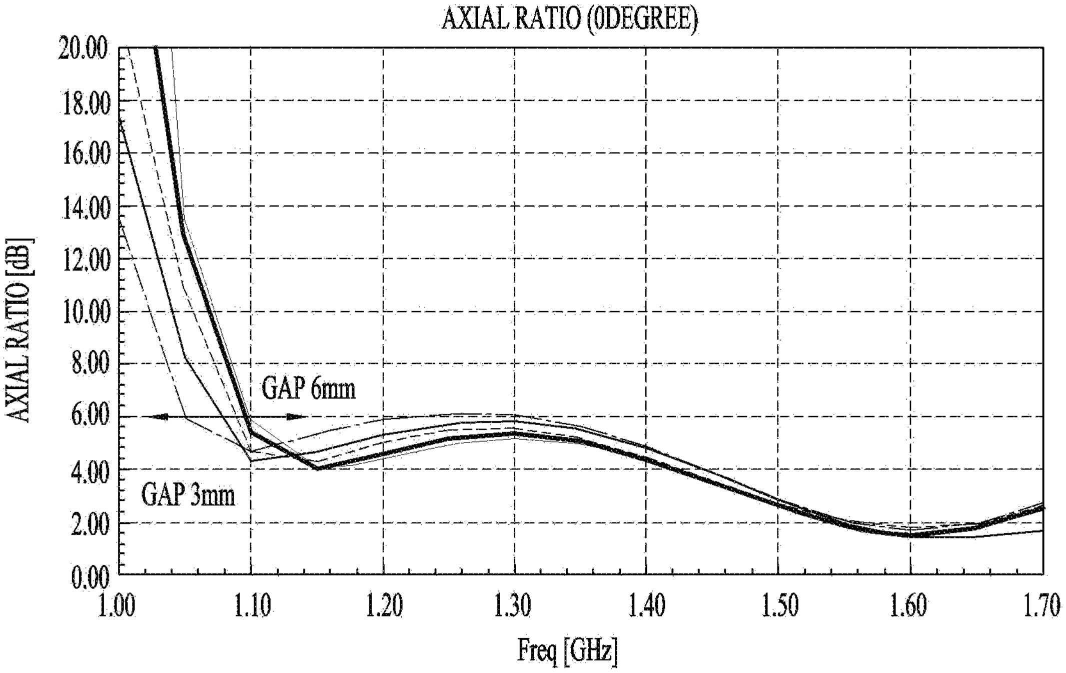
Figure 19A:
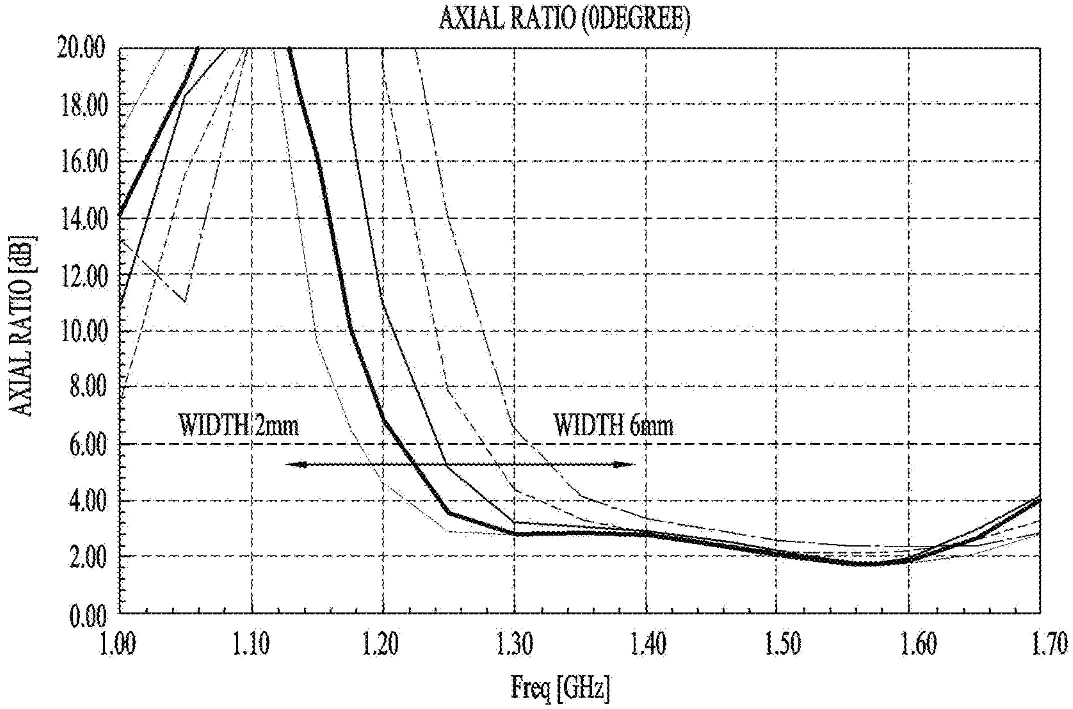
FIGS. 19A to 19C illustrate the axial ratio, representing circular polarization performance, depending on the vertical width of the second ground pattern, the gap distance between the first conductive pattern, and the gap distance between the ground conductive patterns in the antenna structure of FIG. 13B.
Figure 19B:
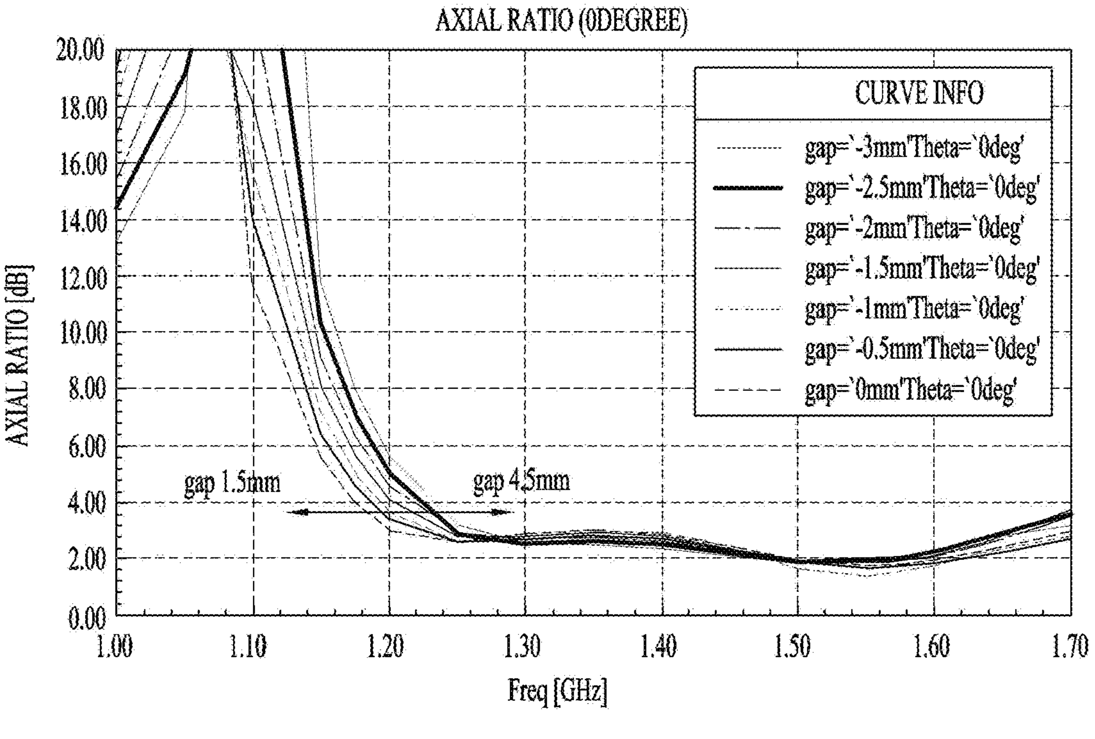
Figure 19C:
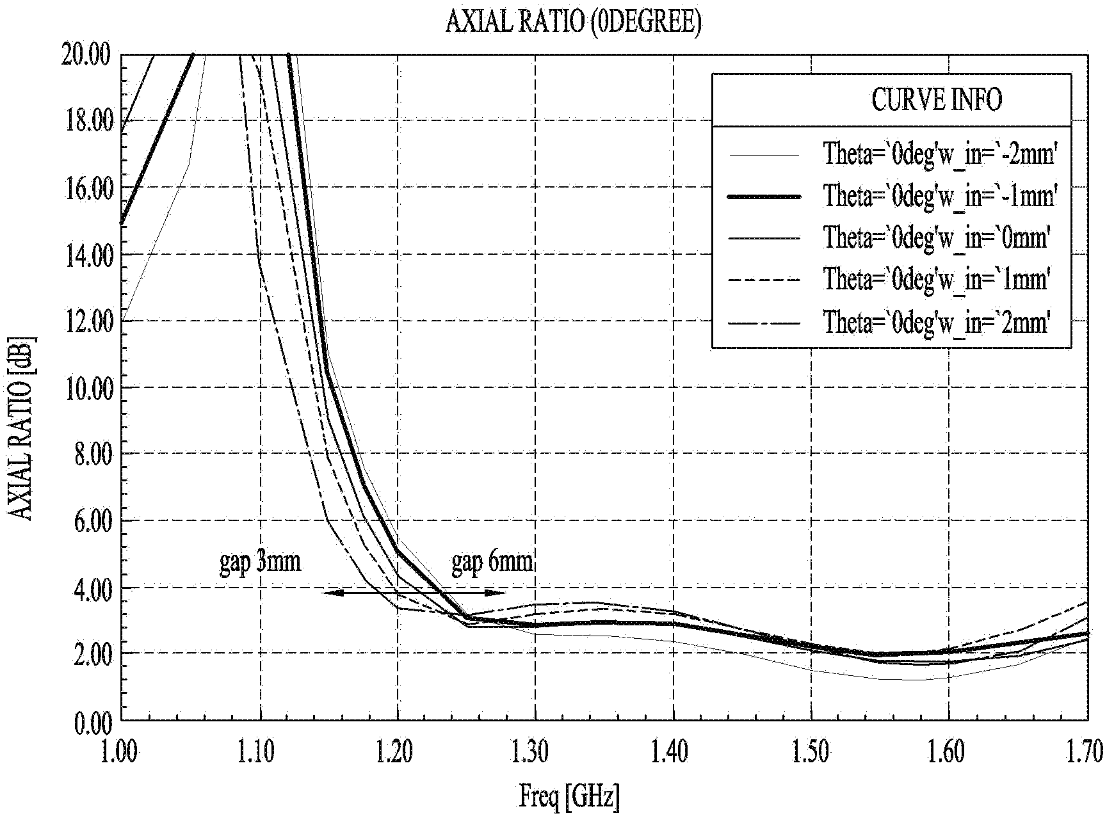

Meanwhile, the dimensions of the conductive patterns in the vehicle GNSS antenna according to this specification are optimized to enhance antenna performance, such as circular polarization performance. In this regard, FIGS. 18A to 18C illustrate the axial ratio AR characteristics of circular polarization based on the vertical/horizontal width of the second ground pattern and the gap distance between the first conductive pattern and the ground pattern in the antenna structure of FIG. 13A. FIGS. 19A to 19C illustrate the axial ratio AR characteristics of circular polarization based on the vertical width of the second ground pattern, the gap distance between the first conductive pattern and the ground conductive pattern in the antenna structure of FIG. 13B.

Meanwhile, the ground conductive pattern 1110*g* in the vehicle GNSS antenna according to this specification may be composed of multiple conductive parts. In this regard, referring to FIGS. 13A and 13B, the ground conductive pattern 1110*g* may include a first part 1111*g*, a second part 1112*g*, a third part 1113*g*, and a fourth part 1114*g*.

The first part 1111*g* may be configured to connect to the first ground pattern 1130. The first part 1111*g* may be configured to connect to one end of the first ground pattern 1130 formed on one side of the signal pattern 1120. The first part 1111*g* may include an upper region G1*a* and a lower region G1*b*.

The second part 1112*g* may be configured to connect to the second ground pattern 1140. The second part 1112*g* may be configured to connect to the other end of the first ground pattern 1130 formed on the other side of the signal pattern 1120. The second part 1112*g* may include an upper region G2*a* and a lower region G2*b*. A feeding pattern 1110*f* may be formed between the first part 1111*g* and the second part 1112*g* of the ground conductive pattern 1110*g*.

The third part 1113*g* may be configured to connect to the lower region G1*b* of the first part 1111*g* of the ground conductive pattern 1110*g*. The third part 1113*g* may be configured to be spaced apart from the upper region G1*a* of the first part 1111*g* of the ground conductive pattern 1110*g* by a predetermined distance.

The fourth part 1114*g* may be configured to connect to the lower region G2*b* of the second part 1112*g* of the ground conductive pattern 1110*g*. The fourth part 1114*g* may be configured to be spaced apart from the upper region G2*a* of the second part 1112*g* of the ground conductive pattern 1110*g* by a predetermined distance.

Meanwhile, the width of the third part 1113*g* and the fourth part 1114*g* of the ground conductive pattern 1110*g* may be formed within a predetermined range to maintain a specific gap distance from the adjacent conductive parts. Referring to FIGS. 13A and 18A, the width of the third part 1113*g* and the fourth part 1114*g*, which are spaced apart from the upper regions Gla, G2*a* of the first part 1111*g* and the second part 1112*g* of the conductive pattern, may range from 2 mm to 6 mm. In this regard, as the thickness of the lower region of the ground conductive pattern 1110*g*, implemented as FPCB, increases, the overall slot length becomes shorter, causing the lower operating frequency of the axial ratio band to increase. Therefore, in the antenna assembly structure where the ground conductive pattern 1110*g* is connected to the second ground pattern 1130, the axial ratio in the second frequency band of 1166.2 to 1186.7 MHz can be below the threshold. Accordingly, the axial ratio of the first signal in the first frequency band and the second signal in the second frequency band, both having circular polarization, can be maintained below the threshold, for example, below 6 dB.

Referring to FIG. 13B and FIG. 19A, the width of the third part 1113*g* and the fourth part 1114*g*, which are spaced apart from the upper regions G1*a*, G2*a* of the first part 1111*g* and the second part 1112*g*, may be formed to be less than 2 mm. In this context, as the thickness of the lower region of the ground conductive pattern 1110*g* implemented as FPCB increases, the total slot length shortens, which increases the lower frequency of the operating band based on the axial ratio. As a result, in the antenna assembly structure where the ground conductive pattern 1110*g* is separated from the second ground pattern 1130, the axial ratio in the second frequency band of 1166.2 to 1186.7 MHz can be maintained below the threshold. Therefore, the axial ratio of the first signal in the first frequency band and the second signal in the second frequency band, both having circular polarization, can be maintained below the threshold, for example, below 6 dB.

Meanwhile, the ground conductive pattern 1110*g* may be configured to extend from the lower region to the upper regions on one side and the other side and either connect to the second ground pattern 1140 or be spaced by a certain gap. Referring to FIGS. 13A and 13B, the ground conductive pattern 1110*g* may further include a fifth part 1115*g* and a sixth part 1116*g*.

Referring to FIG. 13A, the fifth part 1115*g* may be configured such that one end connects to the third part 1130*g* of the ground conductive pattern 1110*g*. The other end of the fifth part 1115*g* may connect to the second ground pattern 1140. The other end of the fifth part 1115*g* may be configured to connect to one end of the second ground pattern 1140 formed on one side of the signal pattern 1120. The sixth part 1116*g* may be configured to connect one end to the fourth part 1114*g* of the ground conductive pattern 1110*g*. The other end of the sixth part 1116*g* may connect to the second ground pattern 1140. The sixth part 1116*g* may be configured such that its other end connects to the other end of the second ground pattern 1140 formed on the other side of the signal pattern 1120.

Referring to FIG. 13B the fifth part 1115*g* may be configured such that one end connects to the third part 1130*g* of the ground conductive pattern 1110*g*. The other end of the fifth part 1115*g* may be spaced by a first gap G1 in the vertical direction from the second ground pattern 1140 in the other axial direction. The other end of the fifth part 1115*g* may be spaced by a first gap G1 from one end of the second ground pattern 1140 formed on one side of the signal pattern 1120. The sixth part 1116*g* may be configured such that one end connects to the fourth part 1114*g* of the ground conductive pattern 1110*g*. The other end of the sixth part 1116*g* may be spaced by a first gap G1 from the second ground pattern 1140 in the vertical direction in the other axial direction. The other end of the sixth part 1116*g* may be spaced by a first gap G1 from the other end of the second ground pattern 1140 formed on the other side of the signal pattern 1120.

Referring to FIGS. 13A, 13B, and 18B, the width of the second ground pattern 1140 in one axial direction may be formed in the range of 11 mm to 14 mm. This allows the axial ratio of the first signal in the first frequency band and the second signal in the second frequency band, both having circular polarization, to be maintained below the threshold, for example, below 6 dB. Referring to FIG. 13B and FIG. 19B, the first gap G1 may be formed in the range of 1.5 mm to 4.5 mm. In another example, the first gap G1 may be formed to be less than 1.5 mm. In this context, when the first gap G1 is 1.5 mm in the antenna structure of FIG. 13B, the axial ratio can be below 5 dB, and the lower frequency can include 1166.2 MHz. As a result, the axial ratio of the second signal having circular polarization in the second frequency band can be maintained below the threshold, for example, below 6 dB.

Meanwhile, the inner boundary of the second ground pattern 1140 and the outer boundary of the first ground pattern 1130 may be spaced by a second gap G2 in a horizontal axial direction. Referring to FIG. 13A and FIG. 18C, the second gap G2 may be formed in the range of 3 mm to 6 mm. Meanwhile, referring to FIG. 13B and FIG. 19C, the second gap G2 may be formed to be less than 3 mm. In this regard, as the width of the second ground pattern 1140 increases inward and the second gap G2 narrows, the lower frequency of the operating band in the second frequency band, based on the axial ratio, decreases.

In the antenna structure of FIG. 13A, where the ground conductive pattern 1110*g* is connected to the second ground pattern 1130, if the second gap G2 is less than 3 mm, the lower frequency decreases, but the axial ratio at the upper frequency increases slightly, up to about 6 dB. Accordingly, referring to FIGS. 13A and 16C, the second gap G2 may be formed in the range of 3 mm to 6 mm. Meanwhile, in the antenna structure of FIG. 13B, where the ground conductive pattern 1110*g* is separated from the second ground pattern 1130, if the second gap G2 is 3 mm, the axial ratio can be below 4 dB, and the lower frequency can include 1166.2 MHz. As a result, referring to FIGS. 13B and 17C, the second gap G2 may be formed to be less than 3 mm.

The second ground pattern 1140 with the second gap G2 may prevent the first signal radiated by the first slot 1130*s* from leaking to the vehicle glass 310 outside the second ground pattern 1140. Furthermore, the second ground pattern 1140 with the second gap G2 may maintain the axial ratio of the second signal having circular polarization in the second frequency band below the threshold, for example, below 6 dB.

Figure 20A:
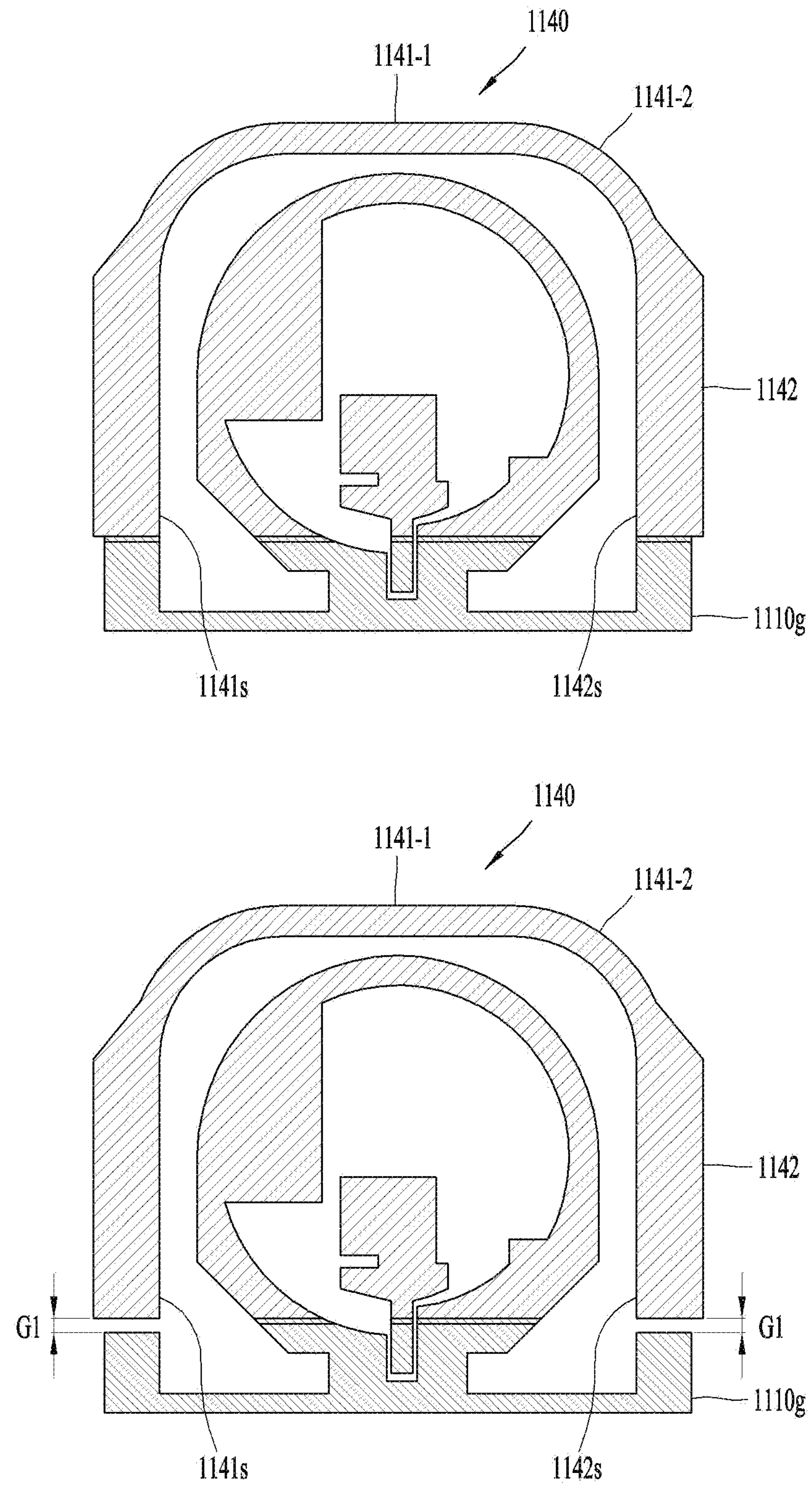
FIGS. 20A and 20B show embodiments where at least part of the second ground pattern is segmented.
Figure 20B:
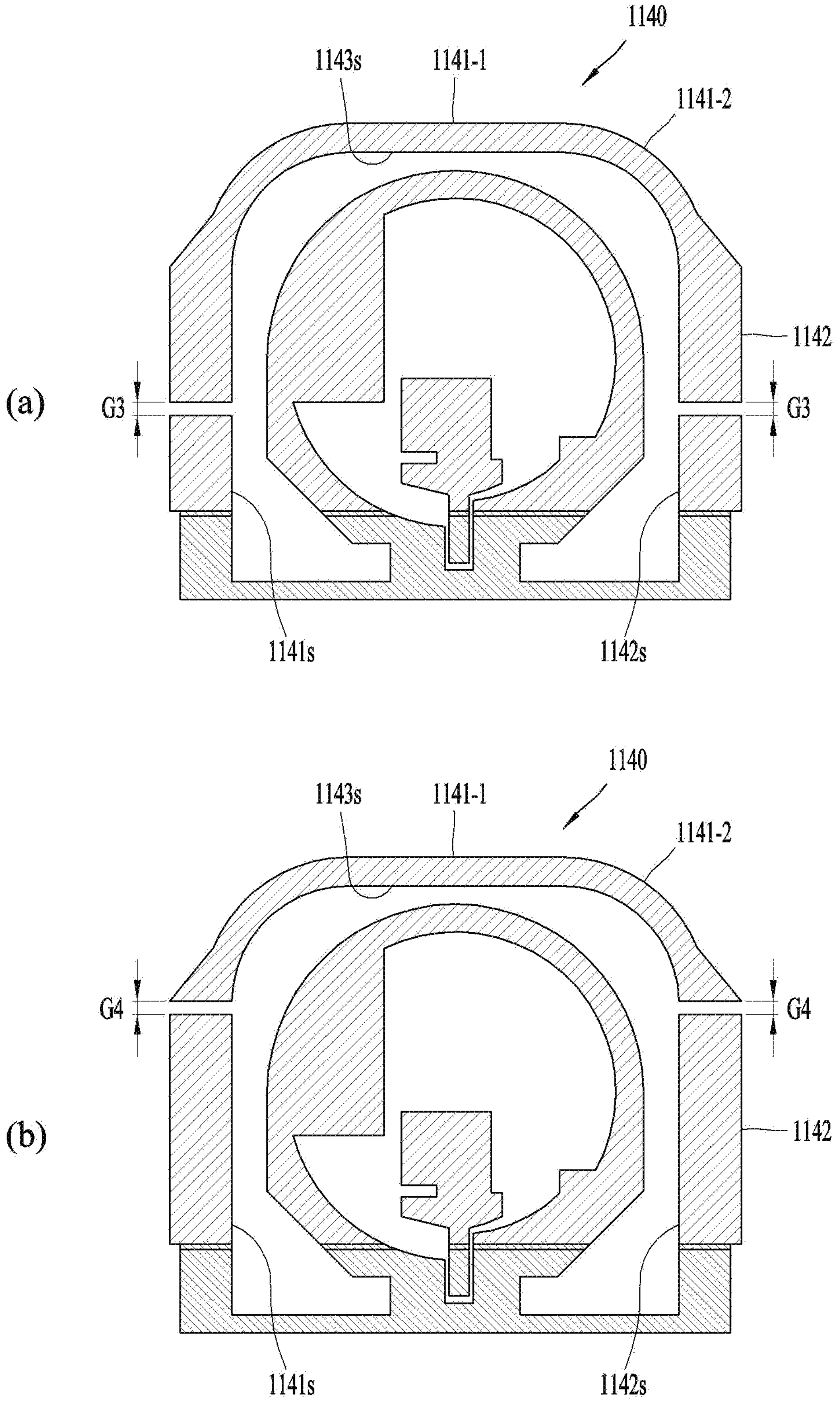
Figure 21A:
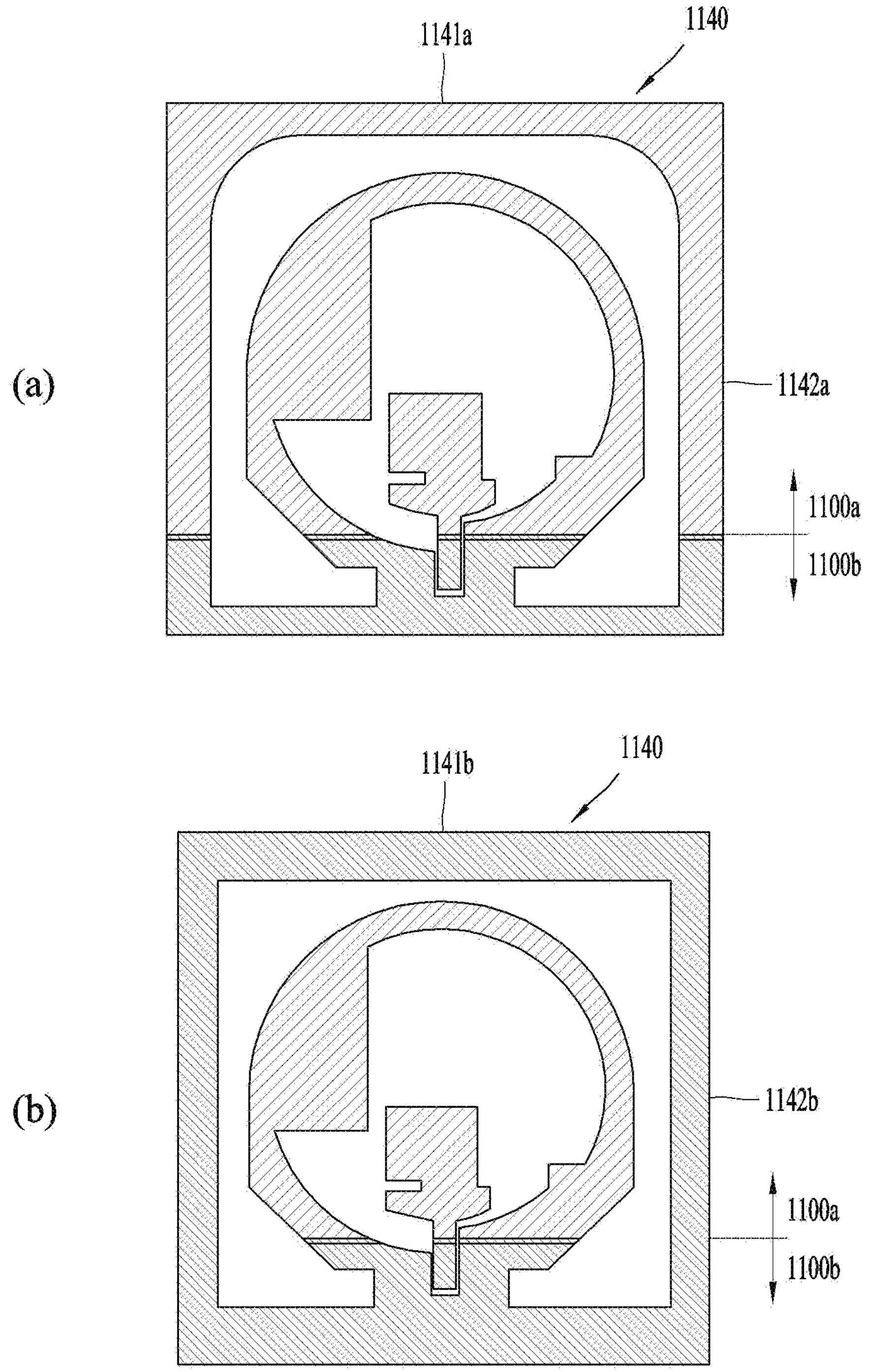
FIGS. 21A and 21B illustrate configurations where the second ground pattern is transformed into various shapes, such as rectangular, circular, or curved, according to the embodiments.
Figure 21B:
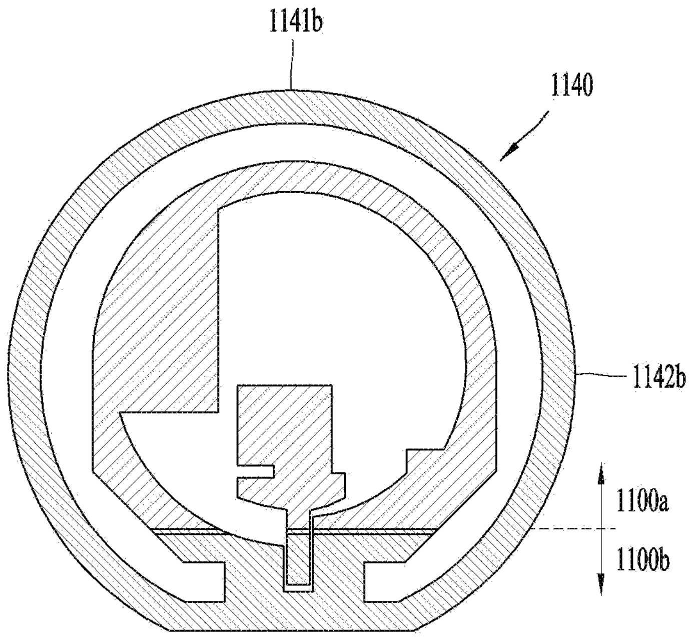
Figure 21B:
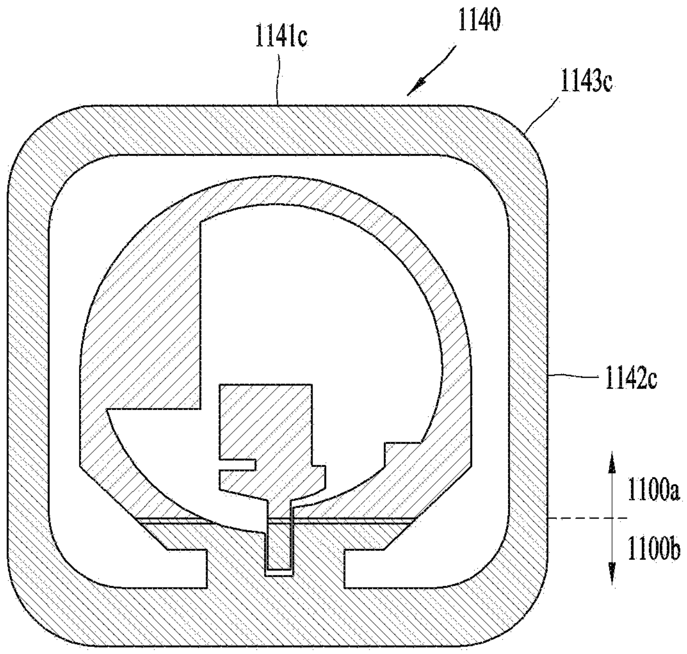

Meanwhile, the shapes of the first and second ground patterns 1130, 1140 of the vehicle GNSS antenna according to this specification may be configured in various ways. In this regard, FIGS. 20A and 20B illustrate configurations in which at least a portion of the second ground pattern is segmented. FIGS. 21A and 21B show configurations where the second ground pattern is modified into various shapes, such as rectangular, circular, or curved forms.

Referring to FIGS. 13A, 13B, 20A, and 20B, the upper region of the outer boundary of the first ground pattern 1130 may be configured in a circular shape. Meanwhile, a portion 1141-1 of the upper region and the side region 1142 of the second ground pattern 1140 may be configured as straight lines. In this regard, the inner and outer boundaries of the first portion 1141-1 of the upper region 1141 and the side region 1142 of the second ground pattern 1140 may be configured as straight lines. The inner and outer boundaries of the second portion 1141-2, the remaining part of the upper region 1141 of the second ground pattern 1140, may be configured in a curved shape. The second portion 1141-2 of the upper region of the second ground pattern 1140 may be formed to connect the first portion 1141-1 of the upper region and the side region 1142.

Referring to FIG. 13A and (a) of FIG. 20A, the end of the second ground pattern 1140 may be configured to connect to the end of the ground conductive pattern 1110*g*. Meanwhile, referring to FIG. 13B and (b) of FIG. 20A, the end of the second ground pattern 1140 may be configured to be spaced from the end of the ground conductive pattern 1110*g*. The end of the second ground pattern 1140 may be configured to be spaced by a first gap G1 from the end of the ground conductive pattern 1110*g*. Referring to (a) of FIG. 18B, the side region 1142 of the second ground pattern 1140 may be configured to be spaced by a third gap G3. Referring to (b) of FIG. 18B, the second portion 1141-2 of the upper region of the second ground pattern 1140 may be configured to be spaced by a fourth gap G4 from the side region 1142.

Referring to FIGS. 21A and 21B, the outer boundary of the upper region 1131 of the first ground pattern 1130 may be configured in a circular shape, as shown in FIGS. 13A, 13B, 20A, and 20B. Referring to (a) and (b) of FIG. 21A, the outer boundaries of the upper region 1141*a* and the side region 1142*a* of the second ground pattern 1140 may be configured as straight lines in the first region 1100*a*.

Referring to (a) of FIG. 21A, a portion of the inner boundary of the upper region 1141*a* of the second ground pattern 1140 may be formed in a circular shape corresponding to the outer boundary of the first ground pattern 1130. Referring to (b) of FIG. 21A, the inner boundaries of the upper region 1141*a* and the side region 1141*a* of the second ground pattern 1140 may be formed as straight lines in the first region 1100*a*. Referring to (a) of FIG. 21B, the outer boundaries of the upper region 1141*b* and the side region 1142*b* of the second ground pattern 1140 may be configured in a circular shape in the first region 1100*a*. Referring to (a) of FIG. 21B, the outer boundaries of the upper region 1141*c* and the side region 1142*c* of the second ground pattern 1140 may be configured as straight lines in the first region 1100*a*. The middle region 1143*c* of the upper region 1141*c* and the side region 1142*c* may be configured as curves.

Referring to FIGS. 13B, 20A, and 20B, the second ground pattern 1130 of the vehicle GNSS antenna according to this specification may be configured to include multiple sub-patterns with at least a portion separated. The second ground pattern 1140 may be configured to include a first sub-pattern 1141*s*, a second sub-pattern 1142*s*, and a third sub-pattern 1143*s*.

Referring to FIGS. 13A, 13B, and 20A, the first sub-pattern 1141*s* may be configured to either connect to the first ground conductive pattern 1110*g* or be spaced by a first gap G1. The second sub-pattern 1142*s* may be configured to either connect to the first ground conductive pattern 1110*g* or be spaced by a first gap G1.

Referring to FIG. 20B, the third sub-pattern 1143*s* of the second ground pattern 1140 may be configured to be spaced by a predetermined gap G3 from the end of the first sub-pattern 1141*s* and the end of the second sub-pattern 1142*s*. The third sub-pattern 1143*s* of the second ground pattern 1140 may form the upper region of the second ground pattern 1140. The first sub-pattern 1141*s* and the second sub-pattern 1142*s* may form the side regions of the second ground pattern 1140 and may be configured as straight lines.

Figure 22:
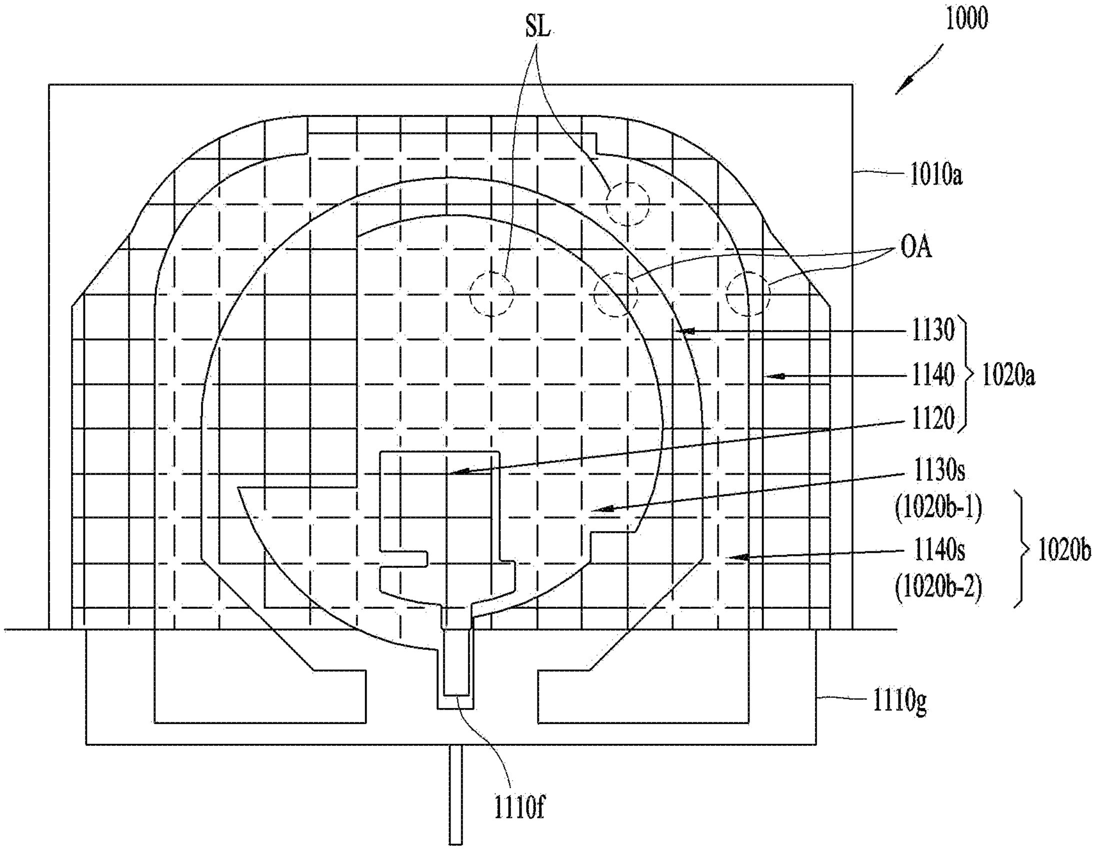
FIG. 22 shows the structure of the antenna assembly in FIGS. 13A and 13B, implemented with a metal mesh shape and dummy mesh lattice patterns.

Meanwhile, the vehicle GNSS antenna according to this specification may be implemented as a transparent antenna. Additionally, the vehicle GNSS antenna according to this specification may be implemented as a CPW (Coplanar Waveguide) antenna structure with a single-layer configuration. In this regard, FIG. 22 illustrates a structure in which the antenna assembly of FIGS. 13A and 13B is implemented with a metal mesh pattern and dummy mesh grid patterns.

Referring to FIGS. 7A, 13A, 13B, and 22, the signal pattern 1120, the first ground pattern 1130, and the second ground pattern 1140 may be formed as a metal mesh pattern 1020*a* on the transparent dielectric substrate 1010*a*, with the inner regions of the mesh interconnected. The metal mesh pattern 1020*a* may be configured to have multiple open areas OA at the inner and outer boundaries. Additionally, the signal pattern 1120, the first ground pattern 1130, and the second ground pattern 1140 may be formed as a coplanar waveguide (CPW) structure implemented with a single metal layer on the transparent dielectric substrate 1010*a*.

The antenna assembly 1000 may further include multiple dummy mesh grid patterns 1020*b* in addition to the metal mesh pattern 1020*a*, which forms the radiating element region. The antenna assembly 1000 formed in the first region 1100*a* and the second region 1100*b* may include multiple dummy mesh grid patterns 1020*b*. The dummy mesh grid patterns 1020*b* may be placed on the outer portion of the metal mesh pattern 1020*a* on the transparent dielectric substrate 1010*a*. The multiple dummy mesh grid patterns 1020*b* may be configured not to connect to the feeding pattern 1110*f* or the ground conductive pattern 1110*g*. The multiple dummy mesh grid patterns 1020*b* may be configured to be separated from each other by slits SL.

The multiple dummy mesh grid patterns 1020*b* may be configured to include the first and second dummy grid patterns 1020*b*-1, 1020*b*-2 placed in the regions where the first and second slots 1130*s*, 1140*s* are formed. The first dummy grid patterns 1020*b*-1 may be placed in the first slot 1130*s*, which is the outer portion of the signal pattern 1120. The first dummy grid patterns 1020*b*-1 may be configured to be separated from each other in the horizontal axial direction and the vertical axial direction. The first dummy grid patterns 1020*b*-1 may be configured to be separated from the boundaries of the signal pattern 1110*f* formed inside and the first ground pattern 1130 formed outside.

The second dummy grid patterns 1020*b*-2 may be placed in the second slot 1140*s*, which is the outer portion of the first ground pattern 1130. The second dummy grid patterns 1020*b*-2 may be configured to be separated from each other in both the horizontal axial direction and the vertical axial direction. The second dummy grid patterns 1020*b*-2 may be configured to be separated from the boundaries of the first ground conductive pattern 1130 formed inside and the second ground conductive pattern 1140 formed outside.

The above describes an antenna assembly of a transparent antenna structure according to one aspect of this specification. The following will describe a vehicle equipped with a GNSS antenna for vehicles according to another aspect of this specification.

In this context, the conductive patterns of the antenna region forming the antenna assembly in a vehicle equipped with the GNSS antenna according to this specification may be connected in the overlapping areas with the conductive patterns of the feeding structure. In this regard, FIG. 23A shows the stacked structure of the antenna assembly in FIG. 13A and FIG. 13B.

Figure 23A:
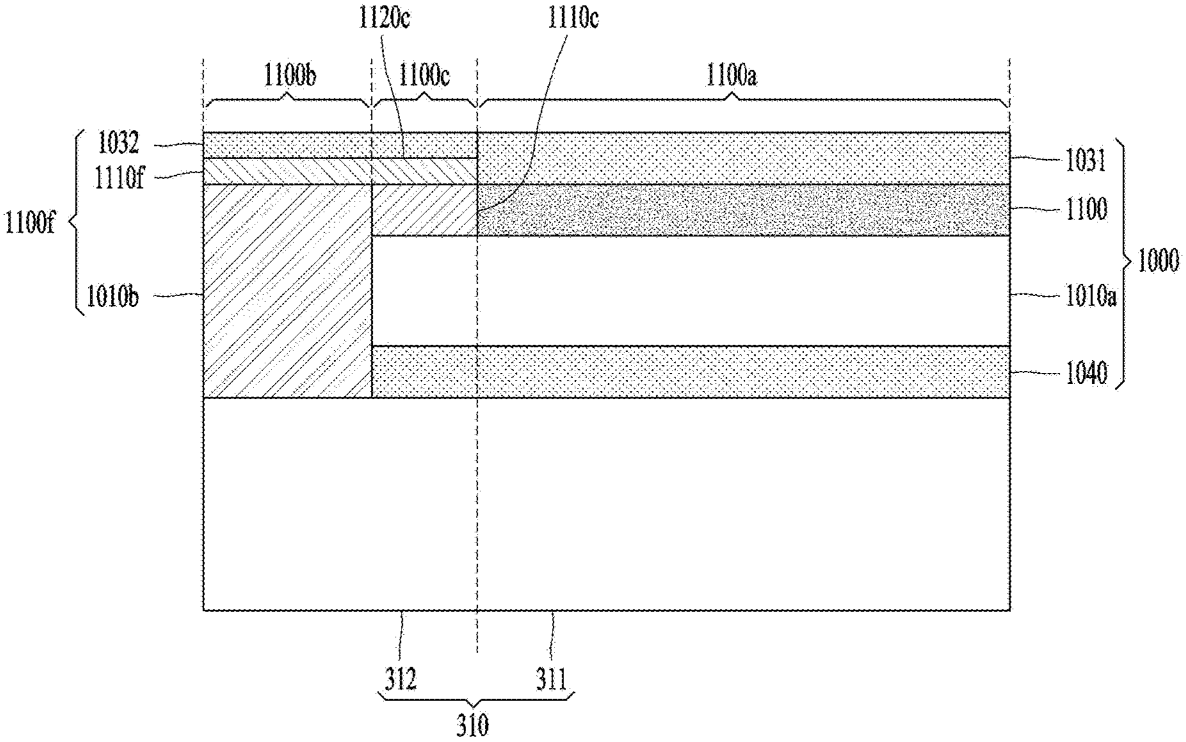
FIG. 23A shows the laminated structure of the antenna assembly in FIGS. 13A and 13B.

Referring to FIG. 23A, the antenna assembly of FIG. 13A and FIG. 13B may be placed on the vehicle's glass panel 310. For ease of explanation, the stacked structure of FIG. 21C is described based on the antenna assembly of FIG. 13A, but it is not limited to this and can also apply to the antenna assembly of FIG. 13B.

The glass panel 310 may include a transparent area 311 and an opaque area 312. The first area 1100a, corresponding to the antenna region of the antenna assembly 1000, may be formed in the transparent area 311. The second area 1100b, corresponding to the feeding region of the antenna assembly 1000, may be formed in the opaque area 312. The portion of the first area 1100a that connects to the feeding pattern 1110f of the second area 1100b may be placed in the opaque area 312.

The antenna assembly 1000 may have conductive patterns 1100 formed as a metal mesh layer on a transparent dielectric substrate 1010a. The transparent antenna element may be implemented by the conductive patterns 1100 formed in the metal mesh layer. Dummy metal mesh grids, separated from the transparent antenna element, may be placed on the metal mesh layer 1020. A first protective layer 1031 may be formed over the metal mesh layer 1020. An adhesive layer (1040) may be formed below the transparent dielectric substrate 1010a.

The conductive pattern, including the feeding pattern 1110f and the ground pattern, may be formed on the second dielectric substrate 1010b. The second dielectric substrate 1010b may be implemented as FPCB but is not limited to this. A second protective layer 1032 may be formed over the feeding pattern 1110f. The second dielectric substrate 1010b, the conductive pattern including the feeding pattern 1110f and the ground pattern, and the second protective layer (1032) may form the feeding structure 1100f. The feeding pattern 1110f may be connected to the conductive patterns 1100 formed in the metal mesh layer in the bonding area, corresponding to the third area 1100c. In the third area 1100c, the first connection pattern 1110c among the conductive patterns 1100 may be connected to the second connection pattern 1120c, which is the end of the feeding pattern 1110f.

Meanwhile, the antenna assembly according to this specification may include a first transparent dielectric substrate with a transparent electrode layer and a second dielectric substrate. In this regard, FIG. 23B shows the process flow for producing an antenna assembly in FIG. 13A or FIG. 13B, which is bonded to a glass panel.

Figure 23B:
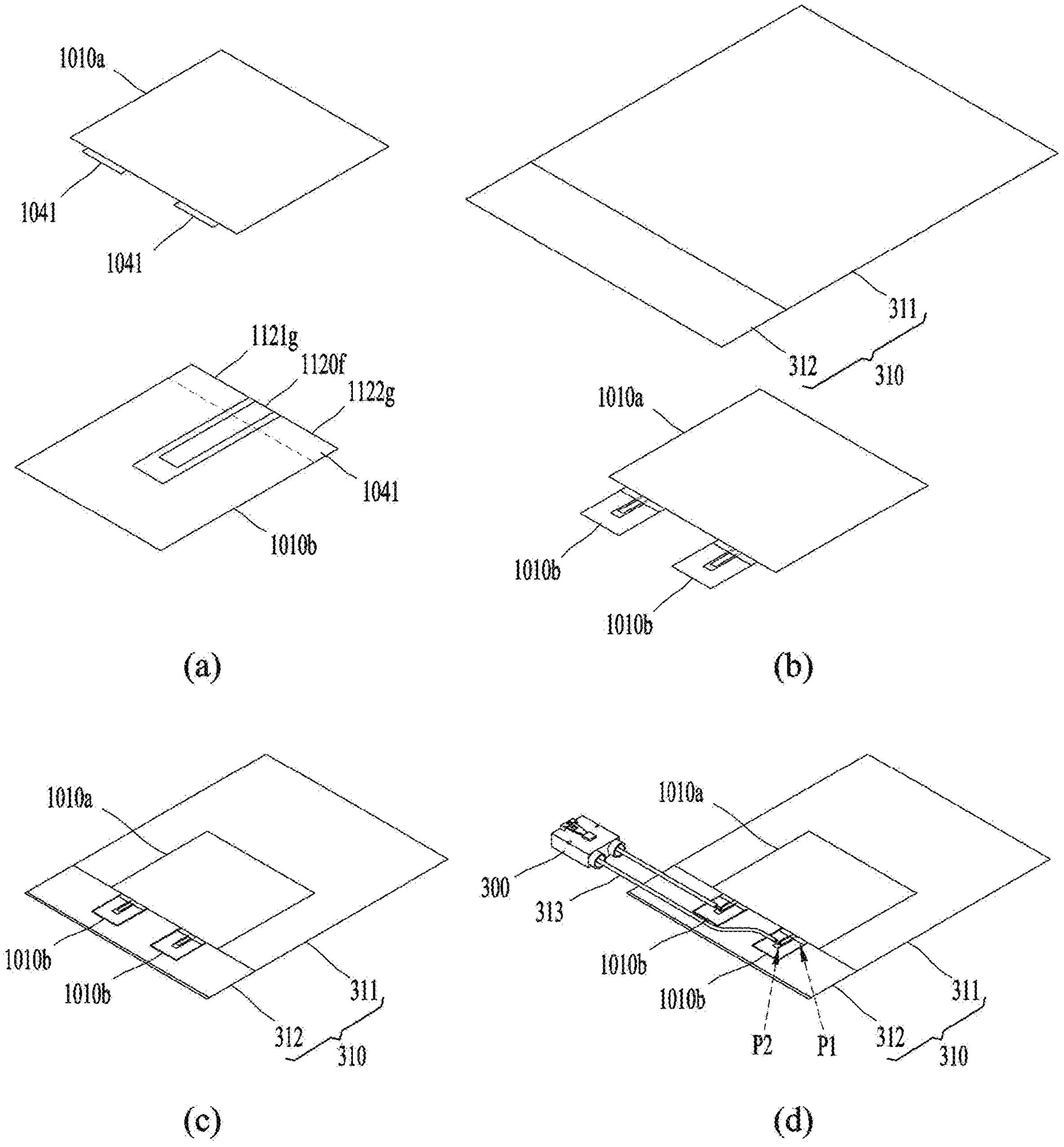
FIG. 23B depicts the process flow for manufacturing the antenna assembly in FIG. 13A or 13B, where it is bonded to a glass panel.

Referring to (a) of FIG. 23B, a first transparent dielectric substrate 1000a with a transparent electrode layer may be produced. Also, a second dielectric substrate 1000b with a feeding pattern 1120f and ground patterns 1121g, 1122g formed on both sides of the feeding pattern 1120f may be produced. The second dielectric substrate 1000b may be implemented as FPCB but is not limited to this. Adhesive areas corresponding to the adhesive layer 1041 may be formed on both the first transparent dielectric substrate 1000a and the second dielectric substrate 1000b. The antenna pattern 1100 of the antenna region 1100a in the antenna assembly 1000 of FIG. 13A or FIG. 13B may be formed on the first transparent dielectric substrate 1000a. The feeding pattern 1100f and the ground conductive pattern 1100g of the feeding region 1100b in the antenna assembly 1000 of FIG. 13A or FIG. 13B may be formed on the second dielectric substrate 1000b.

Referring to (b) of FIG. 23B, a glass panel 310 with a transparent area 311 and an opaque area 312 may be produced. Also, the antenna assembly 1000 may be produced by bonding at least one second dielectric substrate 1000b to the lower region of the first transparent dielectric substrate 1000a. The first transparent dielectric substrate 1000a and the second dielectric substrate 1000b may be bonded through ACF bonding or low-temperature soldering to form a transparent antenna assembly. This electrically connects the conductive pattern formed on the first transparent dielectric substrate 1000a to the conductive pattern formed on the second dielectric substrate 1000b. When multiple antenna elements are implemented on the glass panel 310, the feeding structure 1100f, produced with the second dielectric substrate 1000b, can also be implemented with multiple feeding structures.

Referring to (c) of FIG. 23B, the transparent antenna assembly 1000 may be attached to the glass panel 310. In this regard, the first transparent dielectric substrate 1000a with the transparent electrode layer may be placed in the transparent area 311 of the glass panel 310. Meanwhile, the second dielectric substrate 1000b, which is opaque, may be placed in the opaque area 312 of the glass panel 310.

Referring to (d) of FIG. 23B, the first transparent dielectric substrate 1000a and the second dielectric substrate 1000b may be bonded at the first position P1. Connector components 313, such as Fakra cables, may be bonded to the second dielectric substrate 1000b at the second position P2. The transparent antenna assembly 1000 may be connected to the telematics control unit (TCU) 300 through the connector components 313. For this purpose, the second conductive pattern formed on the second dielectric substrate 1010b may be electrically connected to one connector end of the connector component 313. The other connector end of the connector component 313 may be electrically connected to the telematics control unit (TCU) 300.

Meanwhile, the feeding structure 1110f of the antenna assembly according to this specification may be placed in an area where the frit pattern 312 of the glass panel 310 is removed. In this regard, FIG. 23C shows the process flow of the feeding structure of the antenna assembly in FIG. 13A or FIG. 13B, which is placed in the opaque area of the glass panel.

Figure 23C:
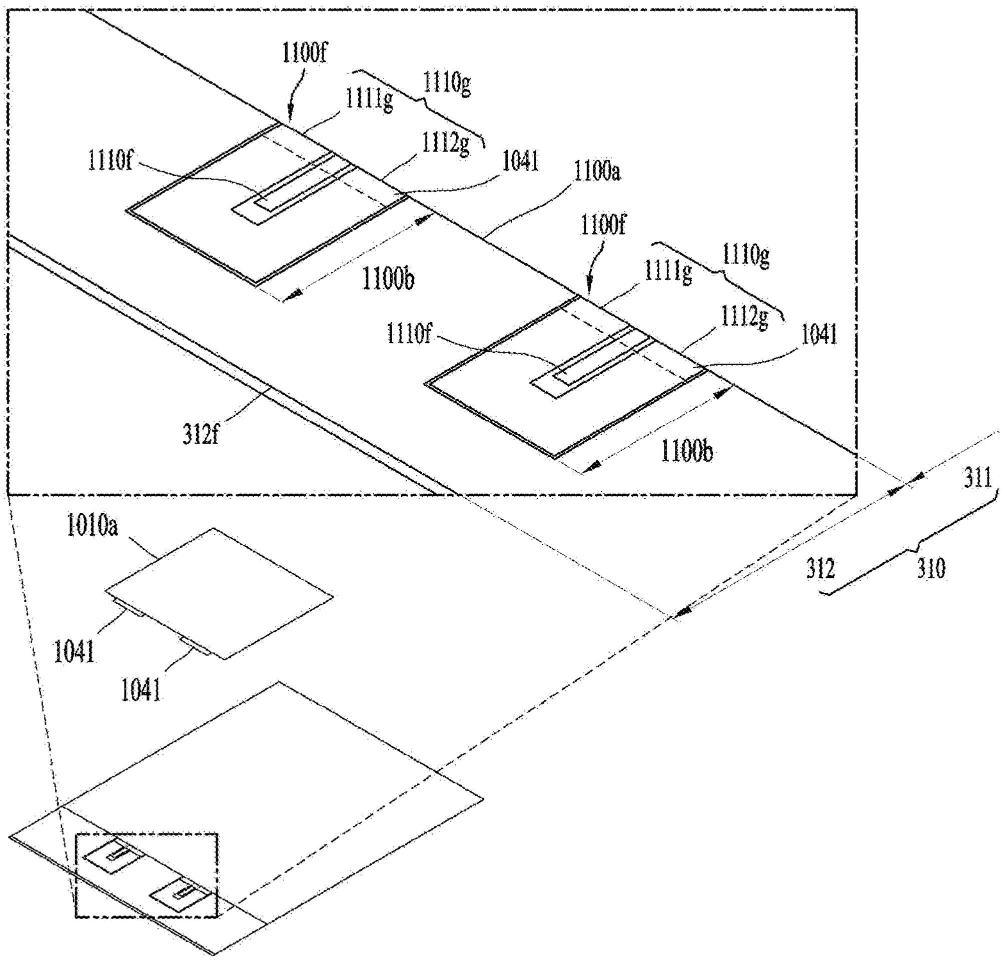
FIG. 23C illustrates the process flow of the feed structure of the antenna assembly in FIG. 13A or 13B, placed in the opaque region of the glass panel.
Figure 23C:
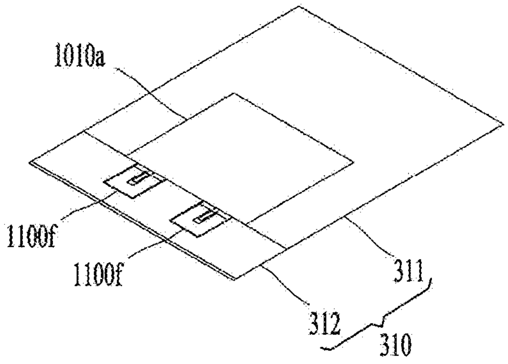
Figure 23C:
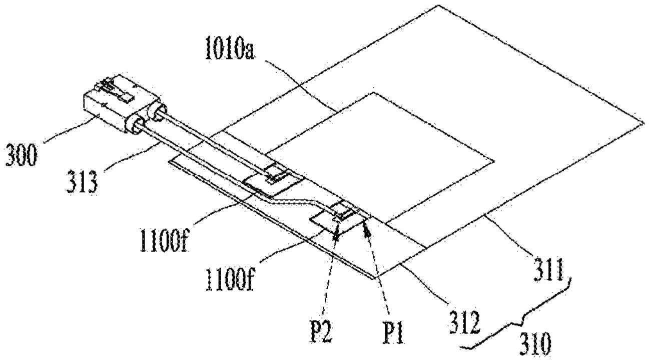

The antenna assembly in FIG. 23C differs structurally from the antenna assembly in FIG. 23B because the opaque substrate is not produced separately but is integrated into the glass panel 310. In FIG. 23C, the feeding structure, implemented as an opaque substrate, is not separately produced as an FPCB but is implemented directly by printing on the glass panel 310.

Referring to (a) of FIG. 23C, a first transparent dielectric substrate 1000a with a transparent electrode layer may be produced. Also, a glass panel 310 with a transparent area 311 and an opaque area 312 may be produced. During the vehicle glass panel manufacturing process, metal wires/pads may be implemented (fired) for connector connections. A transparent antenna mounting part may be implemented in metal form on the glass panel 310, similar to the defroster implemented on the vehicle glass. In this regard, a second conductive pattern may be implemented in the area where the adhesive layer 1041 is formed to electrically connect the first conductive pattern of the first transparent dielectric substrate 1000a. The antenna pattern 1100 of the antenna region 1100a in the antenna assembly 1000 of FIG. 13A or FIG. 13B may be formed on the first transparent dielectric substrate 1000a. The feeding pattern 1100f and the ground conductive pattern 1100g of the feeding region 1100b in the antenna assembly 1000 of FIG. 13A or FIG. 13B may be formed on the second dielectric substrate 1000b.

In this regard, the second dielectric substrate 1000b, on which the second conductive pattern is formed, may be integrally produced with the glass panel 310. The second dielectric substrate 1000*b* may be integrally formed with the glass panel 310 in the opaque area 312 of the glass panel 310. The frit pattern 312 may be removed from the opaque area 312 where the second dielectric substrate 1000*b* is formed. The second conductive pattern may be implemented by forming the feeding pattern 1120*f* and the ground patterns 1121*g*, 1122*g* on both sides of the feeding pattern 1120*f* on the second dielectric substrate 1000*b*.

Referring to (b) of FIG. 23C, the transparent antenna assembly 1000 may be attached to the glass panel 310. In this regard, the first transparent dielectric substrate 1000*a* with the transparent electrode layer may be placed in the transparent area 311 of the glass panel 310. At least one second dielectric substrate 1000*b* may be bonded to the lower region of the first transparent dielectric substrate 1000*a*, forming the antenna assembly 1000. The first transparent dielectric substrate 1000*a* and the second dielectric substrate 1000*b* may be bonded through ACF bonding or low-temperature soldering to form the transparent antenna assembly. This electrically connects the first conductive pattern formed on the first transparent dielectric substrate 1000*a* to the second conductive pattern formed on the second dielectric substrate 1000*b*. When multiple antenna elements are implemented on the glass panel 310, the feeding structure 1100*f* produced from the second dielectric substrate 1000*b* can also be implemented with multiple feeding structures.

Referring to (c) of FIG. 23C, the first transparent dielectric substrate 1000*a* and the second dielectric substrate 1000*b* may be bonded at the first position P1. Connector components 313, such as Fakra cables, may be bonded to the second dielectric substrate 1000*b* at the second position P2. The transparent antenna assembly 1000 may be connected to the telematics control unit (TCU) 300 through the connector components 313. For this purpose, the second conductive pattern formed on the second dielectric substrate 1010*b* may be electrically connected to one connector end of the connector component 313. The other connector end of the connector component 313 may be electrically connected to the telematics control unit (TCU) 300.

Referring to FIGS. 1 to 23C, a vehicle equipped with an antenna assembly of a transparent antenna structure according to this specification is described. The antenna assembly 1000 may be a vehicle GNSS antenna. The vehicle may include a glass panel 310 and the antenna assembly 1000. The glass panel 310 may include a transparent area 311 and an opaque area 312. The antenna assembly 1000 may be placed on the glass panel 310.

The antenna assembly 1000 may include a first transparent dielectric substrate 1010*a*, an antenna pattern 1100, a connection pattern 1100*c*, and a second dielectric substrate 1010*b*. The antenna assembly 1000 may further include the ground conductive pattern 1110*g* and feeding pattern 1110*f* formed on the second dielectric substrate 1010*b*.

The first transparent dielectric substrate 1010*a* may be placed in the transparent area 311 of the glass panel 310. The antenna pattern 1100 may be placed in the first area on one side of the first transparent dielectric substrate 1010*a* and may be configured to radiate a wireless signal in the GNSS or GPS band. The first area 1100*a* on one side of the first transparent dielectric substrate 1010*a* may be placed in the transparent area 311 of the glass panel 310.

The connection pattern 1100*c* may be configured to connect the antenna pattern 1100 to the feeding pattern 1110*f*. The connection pattern 1100*c* may include the first connection pattern 1110*c*, which is the end of the antenna pattern 1100, and the second connection pattern (1120*c*), which is the end of the feeding pattern 1110*f*. The connection pattern 1100*c* may be placed in the second area 1100*b* on one side of the first transparent dielectric substrate 1010*a* or the second dielectric substrate 1010*b*. The second area 1100*b* on one side of the first transparent dielectric substrate 1010*a* may be placed in the opaque area 312 of the glass panel 310.

The second dielectric substrate 1010*b* may be placed in the opaque area 312 of the glass panel 310. The ground conductive pattern 1110*g* and the feeding pattern 1110*f* may be placed in the second area 1100*b* on one side of the second dielectric substrate 1010*b*.

The antenna pattern 1100 may include the signal pattern 1120, the first ground pattern 1130, the first slot 1130*s*, the second ground pattern 1140, and the second slot 1140*s*. The signal pattern 1120 may be connected to the feeding pattern 1110*f* in the second area 1100*b*. The first ground pattern 1130 may be connected to the ground conductive pattern 1110*g* in the second area 1100*b*. The first slot 1130*s* may be formed between the signal pattern 1120 and the first ground pattern 1130. The first slot 1130*s* may be configured to radiate a first signal having circular polarization in the first frequency band.

The second ground pattern 1140 may be connected to the ground conductive pattern 1110*g* in the second area 1100*a* and may be configured to surround the first ground pattern 1130. The second slot 1140*s* may be formed between the first ground pattern 1130 and the second ground pattern 1140. The second slot 1140*s* may be configured to radiate a second signal having circular polarization in a second frequency band lower than the first frequency band. The length of the second slot 1140*s*, formed inside the second ground pattern 1140, may be configured to be between ¾ and one wavelength corresponding to the operating frequency within the second frequency band. The second ground pattern 1140 may be formed to surround the first ground pattern 1130, preventing the first signal radiated by the first slot 1130*s* from leaking through the vehicle's glass 310 outside the second ground pattern 1140. Additionally, the second ground pattern 1140, formed to surround the first ground pattern 1130, may allow the radiation patterns of the first signal in the first frequency band and the second signal in the second frequency band to be directed toward the vehicle's roof.

The first ground pattern 1130 may have at least part of its outer boundary formed in a circular shape. The diameter of the outer boundary of the first ground pattern 1130 may be configured between ¼ and ½ of the wavelength corresponding to the operating frequency in the first frequency band. The first portion 1131 of the inner boundary of the first ground pattern 1130 may be formed in a circular shape. The second portion 1132 of the inner boundary of the first ground pattern 1130 may be formed with straight lines in both axial directions. The first ground pattern 1130 may be formed with a first width Wi in one axial direction and a second width W2 narrower than the first width W1.

The ground conductive pattern 1110*f* may be configured to include the first portion 1111*g*, the second portion 1112*g*, the third portion 1113*g*, and the fourth portion 1114*g*.

The first portion 1111*g* may be configured to connect to the first ground pattern 1130. The first portion 1111*g* may be configured to connect to one end of the first ground pattern 1130 formed on one side of the signal pattern 1120. The first portion 1111*g* may be configured to have an upper region G1*a* and a lower region G1*b*.

The second portion 1112*g* may be configured to connect to the second ground pattern 110. The second portion 1112*g* may be configured to connect to the other end of the first ground pattern 1130 formed on the other side of the signal pattern 1120. The second portion 1112*g* may be configured to have an upper region G2*a* and a lower region G2*b*. The feeding pattern 1110*f* may be formed between the first portion 1111*g* and the second portion 1112*g* of the ground conductive pattern 1110*g*.

The third portion 1113*g* may be configured to connect to the lower region G1*b* of the first portion 1111*g* of the ground conductive pattern 1110*g*. The third portion 1113*g* may be configured to be spaced from the upper region G1*a* of the first portion 1111*g* of the ground conductive pattern 1110*g* by a predetermined distance.

The fourth portion 1114*g* may be configured to connect to the lower region G2*b* of the second portion 1112*g* of the ground conductive pattern 1110*g*. The fourth portion 1114*g* may be configured to be spaced from the upper region G2*a* of the second portion 1112*g* of the ground conductive pattern 1110*g* by a predetermined distance. The width of the third portion 1113*g* and the fourth portion 1114*g*, spaced from the upper regions G1*a*, G2*a* of the first portion 1111*g* and the second portion 1112*g*, respectively, may be configured to be in the range of 2 mm to 6 mm. Accordingly, the axial ratio of the first signal in the first frequency band having circular polarization and the second signal in the second frequency band may be maintained below a threshold, for example, 6 dB.

The ground conductive pattern 1110*g* may be configured to further include the fifth portion 1115*g* and the sixth portion 1116*g*. The fifth portion 1115*g* may be configured to connect one end to the third portion 1130*g* of the ground conductive pattern 1110*g*. The fifth portion 1115*g* may be configured to connect the other end to the second ground pattern 1140 or to be spaced apart by the first gap G1. The fifth portion 1115*g* may be configured to connect the other end to one end of the second ground pattern 1140 formed on one side of the signal pattern 1120 or to be spaced apart by the first gap G1. The sixth portion 1116*g* may be configured to connect one end to the fourth portion 1114*g* of the ground conductive pattern 1110*g*. The sixth portion 1116*g* may be configured to connect the other end to the second ground pattern 1140 or to be spaced apart by the first gap G1. The sixth portion 1116*g* may be configured to connect the other end to the other end of the second ground pattern 1140 formed on the other side of the signal pattern 1120 or to be spaced apart by the first gap G1. The first gap may be configured to be in the range of 1.5 mm to 4.5 mm. Accordingly, the axial ratio of the second signal in the second frequency band having circular polarization may be maintained below a threshold, for example, 6 dB.

Meanwhile, the width of the second ground pattern 1140 in one axial direction may be configured to be in the range of 11 mm to 14 mm. Accordingly, the axial ratio of the first signal in the first frequency band having circular polarization and the second signal in the second frequency band may be maintained below a threshold, for example, 6 dB. The inner boundary of the second ground pattern 1140 and the outer boundary of the first ground pattern 1130 may be configured to be spaced apart by the second gap G2 in the horizontal axial direction. The second gap G2 may be configured to be in the range of 3 mm to 6 mm. The second ground pattern 1140, with the second gap G2, may prevent the first signal radiated by the first slot 1130*s* from leaking outside the second ground pattern 1140 through the vehicle's glass 310. Additionally, the second ground pattern 1140, with the second gap G2, may maintain the axial ratio of the second signal having circular polarization in the second frequency band below a threshold, for example, 6 dB.

Figure 24:
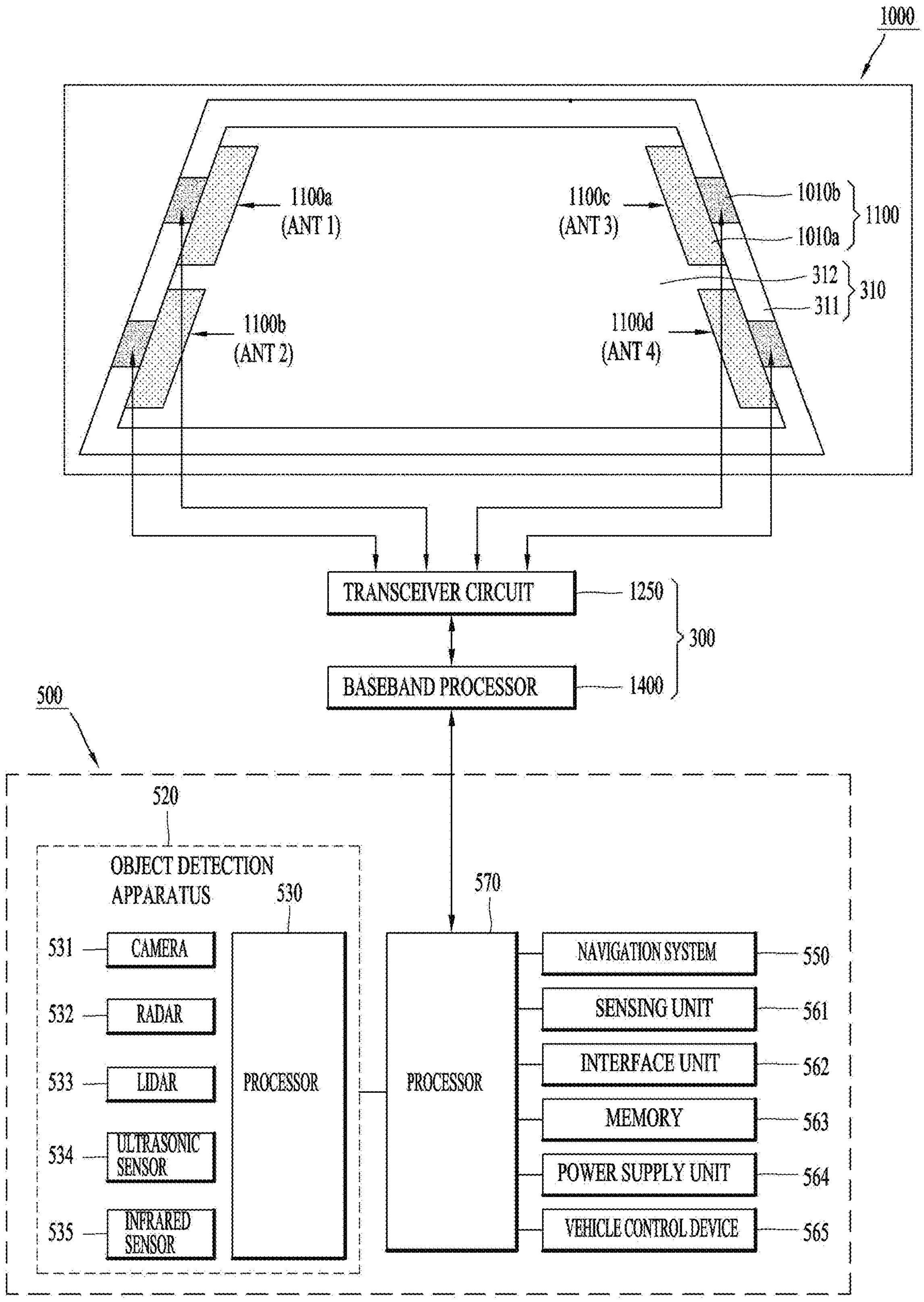
FIG. 24 shows multiple antenna modules placed in different locations of a vehicle and combined with other vehicle components according to the present specification.

The following describes a vehicle equipped with an antenna module according to one aspect of this specification. In this regard, FIG. 24 shows a configuration in which multiple antenna modules are placed in different positions of the vehicle and combined with other components of the vehicle.

Referring to FIGS. 1 to 24, the vehicle 500 may be equipped with a conductive vehicle body that operates as an electrical ground. The vehicle 500 may be equipped with multiple antennas 1100*a* to 1100*d*, which may be placed in different locations on the glass panel 310. The antenna assembly 1000 may be configured to include a communication module 300 along with the multiple antennas 1100*a* to 1100*d*. The communication module 300 may include a transceiver circuit 1250 and a processor 1400. The communication module 300 may correspond to the TCU of the vehicle or form at least part of the TCU.

The vehicle 500 may include an object detection device 520 and a navigation system 550. The vehicle 500 may also include a separate processor 570 in addition to the processor 1400 included in the communication module 300. The processor 1400 and the separate processor 570 may be physically or functionally separated and implemented on a single substrate. The processor 1400 may be implemented as a TCU, and the processor 570 may be implemented as an ECU (Electronic Control Unit).

If the vehicle 500 is an autonomous vehicle, the processor 570 may be an Autonomous Driving Control Unit (ADCU), which integrates the ECU. Based on information detected by the camera 531, radar 532, and/or lidar 533, the processor 570 may navigate the route and control the acceleration or deceleration of the vehicle 500. For this purpose, the processor 570 may interact with the processor 530, corresponding to the MCU in the object detection device 520, and/or the communication module 300, corresponding to the TCU.

The vehicle 500 may include the first transparent dielectric substrate 1010*a* and the second dielectric substrate 1010*b* placed on the glass panel 310. The first transparent dielectric substrate 1010*a* may be formed inside the vehicle's glass panel 310 or attached to the surface of the glass panel 310. The first transparent dielectric substrate 1010*a* may be configured to form conductive patterns in the shape of a metal mesh grid. The vehicle 500 may include an antenna module 1100 with conductive patterns formed in the shape of a metal mesh to radiate wireless signals on one side of the dielectric substrate 1010.

The antenna assembly 1000 may include the first antenna module 1100*a* to the fourth antenna module 1100*d* to perform multiple-input and multiple-output (MIMO). The first antenna module 1100*a*, the second antenna module 1100*b*, the third antenna module 1100*c*, and the fourth antenna module 1100*d* may be placed at the upper left, lower left, upper right, and lower right of the glass panel 310, respectively. The first antenna module 1100*a* to the fourth antenna module 1100*d* may be referred to as the first antenna ANT1 to the fourth antenna ANT4, respectively. The first antenna ANT1 to the fourth antenna ANT4 may be configured to radiate signals in the 4G and 5G frequency bands to perform 4G wireless communication and 5G wireless communication. At least one of the first antenna ANT1 to the fourth antenna ANT4 may be configured as a GNSS antenna for vehicles to radiate signals in the first frequency band (L1 band) and the second frequency band (L5 band).

As described above, the vehicle 500 may include a telematics control unit (TCU) 300 as the communication module. The TCU 300 may control the reception and transmission of signals through at least one of the first to fourth antenna modules 1100*a* to 1100*d*. The TCU 300 may be configured to include a transceiver circuit 1250 and a baseband processor 1400.

Accordingly, the vehicle may be configured to include a transceiver circuit 1250 and a processor 1400. Part of the transceiver circuit 1250 may be placed in the antenna module or a combination of these units. The transceiver circuit 1250 may control the wireless signals in at least one of the first frequency band to the third frequency band to be radiated through the antenna modules ANT1 to ANT4. The first to third frequency bands may be the low band (LB), mid band (MB), and high band (HB) for 4G/5G wireless communication, but they are not limited to this.

The processor 1400 may be operably coupled to the transceiver circuit 1250 and configured as a modem operating in the baseband. The processor 1400 may be configured to receive or transmit signals through at least one of the first antenna module ANT1 and the second antenna module ANT2. The processor 1400 may perform diversity operation or MIMO operation using the first antenna module ANT1 and the second antenna module ANT2 to deliver signals inside the vehicle.

The antenna modules may be placed in different areas on one side and the other side of the glass panel 310. The antenna modules may simultaneously receive signals from the vehicle's front direction to perform multiple-input and multiple-output (MIMO). In this regard, the antenna modules may include the third antenna module ANT3 and the fourth antenna module ANT4 in addition to the first antenna module ANT1 and the second antenna module ANT2 to perform 4×4 MIMO.

The processor 1400 may be configured to select the antenna module to communicate with the corresponding entity based on the driving route of the vehicle and the communication route with the entity communicating with the vehicle. The processor 1400 may perform MIMO operation using the first antenna module ANT1 and the second antenna module ANT2 based on the driving direction of the vehicle. Alternatively, the processor 1400 may perform MIMO operation using the third antenna module ANT3 and the second antenna module ANT4 based on the driving direction of the vehicle.

The processor 1400 may perform multiple-input and multiple-output (MIMO) in the first band through at least two antennas among the first antenna ANT1 to the fourth antenna ANT4. The processor 1400 may perform MIMO in the second and third bands through at least two antennas among the first antenna ANT1 to the fourth antenna ANT4.

Accordingly, if signal transmission/reception performance in the vehicle is degraded in one band, signal transmission/reception in the vehicle may be enabled through another band. For example, the vehicle may preferentially perform communication connections in the low band, the first band, for wide communication coverage and connection reliability, and then perform communication connections in the second and third bands.

The processor 1400 may control the transceiver circuit 1250 to perform carrier aggregation (CA) or dual connectivity (DC) through at least one of the first antenna ANT1 to the fourth antenna ANT4. In this regard, communication capacity may be expanded through the aggregation of the second and third bands, which are wider than the first band. Additionally, communication reliability may be improved through dual connectivity with surrounding vehicles or entities using multiple antenna elements placed in different areas of the vehicle.

The above describes a broadband transparent antenna assembly that can be placed on vehicle glass and a vehicle equipped with it. The technical effects of such a broadband transparent antenna assembly that can be placed on vehicle glass and the vehicle are as follows.

According to this specification, the GNSS antenna, placed in a specific area of the vehicle glass, can operate in dual bands by forming a dual-slot structure.

According to this specification, the circular polarization characteristics in dual bands can be improved through the dual-slot structure and optimization of the conductive patterns of the GNSS antenna placed in a specific area of the vehicle glass.

According to this specification, the conductive pattern functioning as a radiator of the GNSS antenna operating in circular polarization in dual bands and the ground conductive pattern can be implemented on a single layer.

According to this specification, when a GNSS antenna implemented as a transparent antenna is attached to the vehicle glass, the transparent substrate and the opaque substrate can be placed in the transparent and opaque areas of the vehicle glass, respectively, to minimize changes in the antenna characteristics caused by the vehicle glass.

According to this specification, when a GNSS antenna implemented as a transparent antenna is attached to the vehicle glass, the dummy metal mesh lattice structure can enhance invisibility, making the antenna pattern indistinguishable to the naked eye.

According to this specification, a GNSS antenna structure can be provided that reduces the influence of vehicle glass through a transparent material while also operating in circular polarization in dual bands with a single-layer structure to perform satellite communication.

The additional scope of applicability of this specification will become apparent from the detailed description provided below. However, various modifications and changes within the spirit and scope of this specification will be readily apparent to those skilled in the art, and thus, specific embodiments such as the detailed description and preferred embodiments of this specification should be understood as illustrative rather than limiting.

With respect to this specification, the design and operation of a vehicle equipped with an antenna assembly that includes a transparent antenna, as well as its control, can be implemented as computer-readable code on a recorded medium. The computer-readable medium includes any type of storage device in which data readable by a computer system is stored. Examples of computer-readable media include HDD (Hard Disk Drive), SSD (Solid State Disk), SDD (Silicon Disk Drive), ROM, RAM, CD-ROM, magnetic tape, floppy disk, optical data storage devices, and also forms implemented as carrier waves (such as transmissions over the internet). Additionally, the computer may include a control unit of the terminal. Therefore, the above detailed description should be considered illustrative rather than restrictive in all respects. The scope of this specification should be determined by reasonable interpretation of the appended claims, and all modifications within the equivalent scope of this specification are included in its scope.

The invention claimed is:

1. A glass assembly comprising:

a transparent area;

an opaque area formed outer to the transparent area; and an antenna assembly disposed at the glass assembly, wherein the antenna assembly comprises:

a first transparent dielectric substrate;

an antenna pattern disposed in a first area of the first transparent dielectric substrate that is disposed in the transparent area of the glass assembly;

a connection pattern connected to the antenna pattern and disposed in a second area of the first transparent dielectric substrate that is disposed in the opaque area of the glass assembly; and a second dielectric substrate disposed in the opaque area of the glass assembly, wherein the second dielectric substrate comprises a ground conductive pattern and a feed pattern, wherein the antenna pattern comprises:

a signal pattern connected to the feed pattern of the second dielectric substrate and a first ground pattern connected to the ground conductive pattern of the second dielectric substrate, to form a first slot between the signal pattern and the first ground pattern, the first slot configured to radiate a first signal having circular polarization in a first frequency band; and a second ground pattern connected to the ground conductive pattern of the second dielectric substrate to form a second slot between the first ground pattern and the second ground pattern, the second slot configured to radiate a second signal having circular polarization in a second frequency band lower than the first frequency band, wherein the second ground pattern is configured to surround the first ground pattern.

2. The glass assembly of claim 1, wherein at least a portion of an outer boundary of the first ground pattern is formed in a circular shape, and wherein a diameter of the outer boundary of the first ground pattern is in a range between ¼ and ½ of a wavelength corresponding to the first frequency band.

3. The glass assembly of claim 1, wherein a first portion of an inner boundary of the first ground pattern is formed in a circular shape, wherein a second portion of the inner boundary of the first ground pattern is formed with straight lines in a first direction and a second direction, and wherein the first ground pattern is formed with a first width in the first direction and a second width in the first direction narrower than the first width.

4. The glass assembly of claim 1, wherein a width of the second ground pattern in one direction is in a range of 11 mm to 14 mm.

5. The glass assembly of claim 1, wherein a second gap between an inner boundary of the second ground pattern and an outer boundary of the first ground pattern is in a range of 3 mm to 6 mm.

6. The glass assembly of claim 1, wherein a portion of an outer boundary of the first ground pattern is formed in a circular shape, and wherein a portion of an inner boundary of the second ground pattern is formed with straight lines.

7. The glass assembly of claim 6, wherein a portion of an outer boundary of the second ground pattern is formed with straight lines.

8. The glass assembly of claim 1, wherein the ground conductive pattern comprises:

a first portion connected to a first end of the first ground pattern; and a second portion connected to a second end of the first ground pattern, wherein the feed pattern is formed between the first portion and the second portion of the ground conductive pattern.

9. The glass assembly of claim 8, wherein the ground conductive pattern further comprises:

a third portion connected to the first portion of the ground conductive pattern; and a fourth portion connected to the second portion of the ground conductive pattern, wherein the third portion and the fourth portion of the ground conductive pattern form an outer boundary of the antenna assembly.

10. The glass assembly of claim 9, wherein the ground conductive pattern further comprises:

a fifth portion connected to the fourth portion of the ground conductive pattern and a first end of the second ground pattern; and a sixth portion connected to the third portion of the ground conductive pattern and a second end of the second ground pattern, wherein the fifth portion and the sixth portion of the ground conductive pattern further form the outer boundary of the antenna assembly.

11. The glass assembly of claim 1, wherein the antenna pattern is formed as a metal mesh structure, wherein the antenna assembly further comprises dummy mesh grid patterns, wherein the dummy mesh grid patterns are disposed in the first area of the first transparent dielectric substrate, and wherein the dummy mesh grid patterns include:

first dummy mesh grid patterns disposed in the first slot; and second dummy mesh grid patterns disposed in the second slot.

12. A glass assembly comprising:

a transparent area;

an opaque area formed outer to the transparent area; and an antenna assembly disposed at the glass assembly, wherein the antenna assembly comprises:

a first transparent dielectric substrate disposed at the transparent area of the glass assembly;

an antenna pattern disposed in a first area of the first transparent dielectric substrate that is disposed in the transparent area of the glass assembly;

a connection pattern connected to the antenna pattern and disposed in a second area of the first transparent dielectric substrate that is disposed in the opaque area of the glass assembly; and a second dielectric substrate disposed in the opaque area of the glass assembly, wherein the second dielectric substrate comprises a ground conductive pattern and a feed pattern, wherein the antenna pattern comprises:

a signal pattern connected to the feed pattern of the second dielectric substrate and a first ground pattern connected to the ground conductive pattern of the second dielectric substrate to form a first slot between the signal pattern and the first ground pattern, the first slot configured to radiate a first signal having circular polarization in a first frequency band;

a second ground pattern electrically connected to the ground conductive pattern and spaced apart from the ground conductive pattern of the second dielectric substrate to form a second slot between the first ground pattern and second ground pattern, the second slot configured to radiate a second signal having circular polarization in a second frequency band lower than the first frequency band, wherein the second ground pattern is configured to surround the first ground pattern.

13. The glass assembly of claim 12, wherein the ground conductive pattern comprises:

a first portion connected to a first end of the first ground pattern; and a second portion connected to a second end of the first ground pattern, wherein feed pattern is formed between the first portion and the second portion of the ground conductive pattern.

14. The glass assembly of claim 13, wherein the ground conductive pattern comprises:

a third portion connected to the first portion of the ground conductive pattern; and a fourth portion connected to the second portion of the ground conductive pattern, wherein the third portion and the fourth portion of the ground conductive pattern form an outer boundary of the antenna assembly.

15. The glass assembly of claim 14, wherein the ground conductive pattern further comprises:

a fifth portion connected to the fourth portion of the ground conductive pattern and spaced apart from a first end of the second ground pattern by a first gap; and a sixth portion connected to the third portion of the ground conductive pattern and spaced apart from a second end of the second ground pattern by another first gap, wherein the first gap is formed within a range of 1.5 mm or less.

16. The glass assembly of claim 15, wherein both sides of the second ground pattern each comprises a third gap.

17. The glass assembly of claim 12, wherein at least a portion of an outer boundary of the first ground pattern is formed in a circular shape, and wherein a diameter of the outer boundary of the first ground pattern is in a range between ¼ and ½ of a wavelength corresponding to the first frequency band.

18. The glass assembly of claim 12, wherein a first portion of an inner boundary of the first ground pattern is formed in a circular shape, wherein a second portion of the inner boundary of the first ground pattern is formed with straight lines, and wherein the first ground pattern is formed with a first width and a second width that is narrower than the first width.

19. The glass assembly of claim 12, wherein a width of the second ground pattern is formed within a range of 11 mm to 14 mm.

20. The glass assembly of claim 12, wherein the antenna pattern is formed as a metal mesh structure, wherein the antenna assembly further comprises dummy mesh grid patterns, wherein the dummy mesh grid patterns are disposed in the first area of the first transparent dielectric substrate, and wherein the dummy mesh grid patterns include:

first dummy mesh grid patterns disposed in the first slot and second dummy mesh grid patterns disposed in the second slot.

* * * * *